(12) United States Patent
Lee et al.

(10) Patent No.: US 11,109,361 B2
(45) Date of Patent: Aug. 31, 2021

(54) METHOD BY WHICH TERMINAL PERFORMS V2X CONTROL INFORMATION PIGGYBACK IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/495,084

(22) PCT Filed: Mar. 17, 2017

(86) PCT No.: PCT/KR2017/002956
§ 371 (c)(1),
(2) Date: Sep. 17, 2019

(87) PCT Pub. No.: WO2018/169113
PCT Pub. Date: Sep. 20, 2018

(65) Prior Publication Data
US 2020/0107311 A1 Apr. 2, 2020

Related U.S. Application Data

(60) Provisional application No. 62/472,596, filed on Mar. 17, 2017.

(51) Int. Cl.
*H04W 72/04* (2009.01)
*H04W 4/40* (2018.01)
(Continued)

(52) U.S. Cl.
CPC ......... *H04W 72/0406* (2013.01); *H04L 1/001* (2013.01); *H04L 5/0048* (2013.01); *H04W 4/40* (2018.02); *H04W 72/0453* (2013.01)

(58) Field of Classification Search
CPC ............... H04W 72/0406; H04W 4/40; H04W 72/0453; H04L 1/001; H04L 5/0048
See application file for complete search history.

(56) References Cited

U.S. PATENT DOCUMENTS

2012/0113831 A1* 5/2012 Pelletier ................ H04L 5/0058
370/252
2017/0048905 A1* 2/2017 Yun ........................ H04L 5/0091

FOREIGN PATENT DOCUMENTS

WO 2016195411 12/2016
WO 2016209056 12/2016

OTHER PUBLICATIONS

Huawei, HiSilicon ("Discussion of transmission parameters range of PSSCH", 3GPP TSG RAN WG1 Meeting #86, R1-167151, Aug. 22-26, 2016) (Year: 2016).*

(Continued)

*Primary Examiner* — Chi H Pham
*Assistant Examiner* — Ji-Hae Yea
(74) *Attorney, Agent, or Firm* — Lee Hong Degerman Kang Waimey

(57) ABSTRACT

The present invention provides a method by which a terminal performs vehicle-to-everything (V2X) transmission resource selection in a wireless communication system, the method mapping, onto a subframe, a coded symbol related to control information and transmitting the control information by using the mapped coded symbol, wherein the control information is piggybacked and transmitted together with data, and the coded symbol related to the control information is mapped before the data.

9 Claims, 84 Drawing Sheets

(51) Int. Cl.
*H04L 1/00* (2006.01)
*H04L 5/00* (2006.01)

(56) References Cited

OTHER PUBLICATIONS

Intel Corporation ("On PSBCH physical layer design for V2V communication", 3GPP TSG RAN WG1 Meeting #86bis, R1-1609461, Oct. 10-14, 2016) (Year: 2016).*

Huawei, HiSilicon ("DMRS enhancement of V2V", 3GPP TSG RAN WG1 Meeting #84, R1-160284, Feb. 15-19, 2016) (Year: 2016).*

Intel Corporation ("Sidelink DMRS enhancements for V2V communication", 3GPP TSG RAN WG1 Meeting #84, R1-160430, Feb. 15-19, 2016) (Year: 2016).*

Intel Corporation ("UCI embedding onto UL data channels", 3GPP TSG RAN WG1 Meeting #87, R1-1611999, Nov. 14-18, 2016) (Year: 2016).*

Huawei, HiSilicon ("sUCI on sPUSCH", 3GPP TSG RAN WG1 Meeting #87, R1-1611162, Nov. 14-18, 2016) (Year: 2016).*

Ericsson ("UCI on SPUSCH with short TTI", 3GPP TSG RAN WG1 Meeting #87, R1-1611516, Nov. 14-18, 2016) (Year: 2016).*

Huawei, HiSilicon ("Physical channel design for D2D communication", 3GPP TSG RAN WG1 Meeting #76, R1-140053, Feb. 10-14, 2014) (Year: 2014).*

Huawei, HiSilicon, "Discussion of transmission parameters range of PSSCH," 3GPP TSG-RAN WG1 #86, R1-167151, Aug. 2016, 9 pages.

Intel Corporation, "On PSBCH physical layer design for V2V communication," 3GPP TSG-RAN WG1 #86bis, R1-1609461, Oct. 2016, 6 pages.

Intel Corporation, "Sidelink DMRS enhancements for V2V communication," 3GPP TSG-RAN WG1 #84, R1-160430, Feb. 2016, 10 pages.

Huawei, HiSilicon, "DMRS enhancement of V2V," 3GPP TSG-RAN WG1 #84, R1-160284, Feb. 2016, 13 pages.

PCT International Application No. PCT/KR2017/002956, International Search Report dated Dec. 15, 2017, 4 pages.

Huawei, HiSilicon, "Physical channel design for D2D communication", R1-140053, 3GPP TSG RAN WG1 Meeting #76, Feb. 2014, 6 pages.

* cited by examiner

METHOD BY WHICH TERMINAL PERFORMS V2X CONTROL INFORMATION PIGGYBACK IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2017/002956, filed on Mar. 17, 2017, which claims the benefit of U.S. Provisional Application No. 62/472,596 filed on Mar. 17, 2017, the contents of which are all hereby incorporated by reference herein in their entirety.

BACKGROUND

Field

The present document relates to wireless communication and, more specifically, to a V2X control information piggyback method performed by a terminal in a wireless communication system, and a terminal using the same.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

Public safety networks have higher service requirements (reliability and security) than commercial communication networks and require direct signal transmission and reception, or D2D operation, between devices, especially when the coverage of cellular communications is insufficient or unavailable.

For example, D2D operation in general can have a variety of advantages in that it transmits and receives signals between nearby devices. For example, the D2D UE has high data rate and low delay and is capable of data communication. Also, the D2D operation can disperse the traffic to the base station, and can also expand the coverage of the base station if the UE performing the D2D operation acts as a repeater.

The D2D communication may expand and be applicable for signal transmission and reception between vehicles, and vehicle-related communication is referred to as Vehicle-To-Everything (V2X) communication.

The term "x" in V2X means pedestrian (communication between a vehicle and a device carried by an individual (e.g.,) handheld terminal carried by a pedestrian, cyclist, driver or passenger)) (V2P), vehicle (communication between vehicles) (V2V), infrastructure/network (communication between a vehicle and a roadside unit (RSU)/network (e.g.,) RSU is a transportation infrastructure entity (e.g.,) an entity transmitting speed notifications) implemented in an eNB or a stationary UE)) (V2I/N)

Detailed mapping methods when V2X UE(s) piggyback and transmit control (/scheduling) information (e.g., "MCS INDEX(/MODULATION ORDER)" and/or "TBS INDEX (/TRANSPORT BLOCK SIZE)") (along with "data") on a channel (e.g., a PSSCH) designated in advance are proposed in the following.

SUMMARY

An object of the present document is to provide a V2X transmission resource selection method performed by a UE in a wireless communication system and a UE using the same.

In an aspect, a method for selecting vehicle-to-everything (V2X) transmission resources by a UE in a wireless communication system is provided. The method may comprise mapping coded symbols related to control information on a subframe and transmitting the control information using the mapped coded symbols, wherein the control information is piggybacked along with data and transmitted, and the coded symbols related to the control information are mapped prior to the data.

The coded symbols related to the control information may be mapped to regions adjacent to reference signal symbols.

The coded symbols related to the control information may be mapped between a plurality of reference signal symbols.

The coded symbols related to the control information may be not mapped on symbols before the first reference signal symbol and symbols after the last reference signal symbol on the subframe.

A spacing between the coded symbols related to the control information which are consecutively mapped on the same frequency of the subframe may be maximized.

The subframe may be defined by a single carrier frequency division multiplex access (SC-FDMA) symbol axis and a virtual subframe axis.

The subframe includes 14 symbols on the SC-FDMA symbol axis and may include 12 virtual subframes on the virtual subcarrier axis.

The subframe may include a plurality of reference signal symbols.

The reference signal symbols may be demodulation reference signal (DMRS) symbols.

The control information may be a modulation and coding scheme (MCS) index.

Resources in which the control information is transmitted may be fixed.

In another aspect, a user equipment (UE) is provided. The UE may comprise a transceiver for transmitting and receiving RF signals and a processor operating in connection with the Transceiver, wherein, in a method for selecting vehicle-to-everything (V2X) transmission resources by the UE in a wireless communication system, the processor is configured to map coded symbols related to control information on a subframe; and to transmit the control information using the mapped coded symbols, wherein the control information is piggybacked along with data and transmitted, and the coded symbols related to the control information are mapped prior to the data.

According to the present document, a UE can transmit control information with stability by mapping coded symbols related to the control information to a region adjacent to a reference signal and transmitting the control information through the coded symbols. Particularly, the present document may improve "phase offset" correction and channel estimation performance by increasing a reference signal density. Accordingly, "V2X message(s) with variable sizes" can be transmitted with high reliability according to the present document.

DESCRIPTION OF EXEMPLARY EMBODIMENTS

Figure 1:
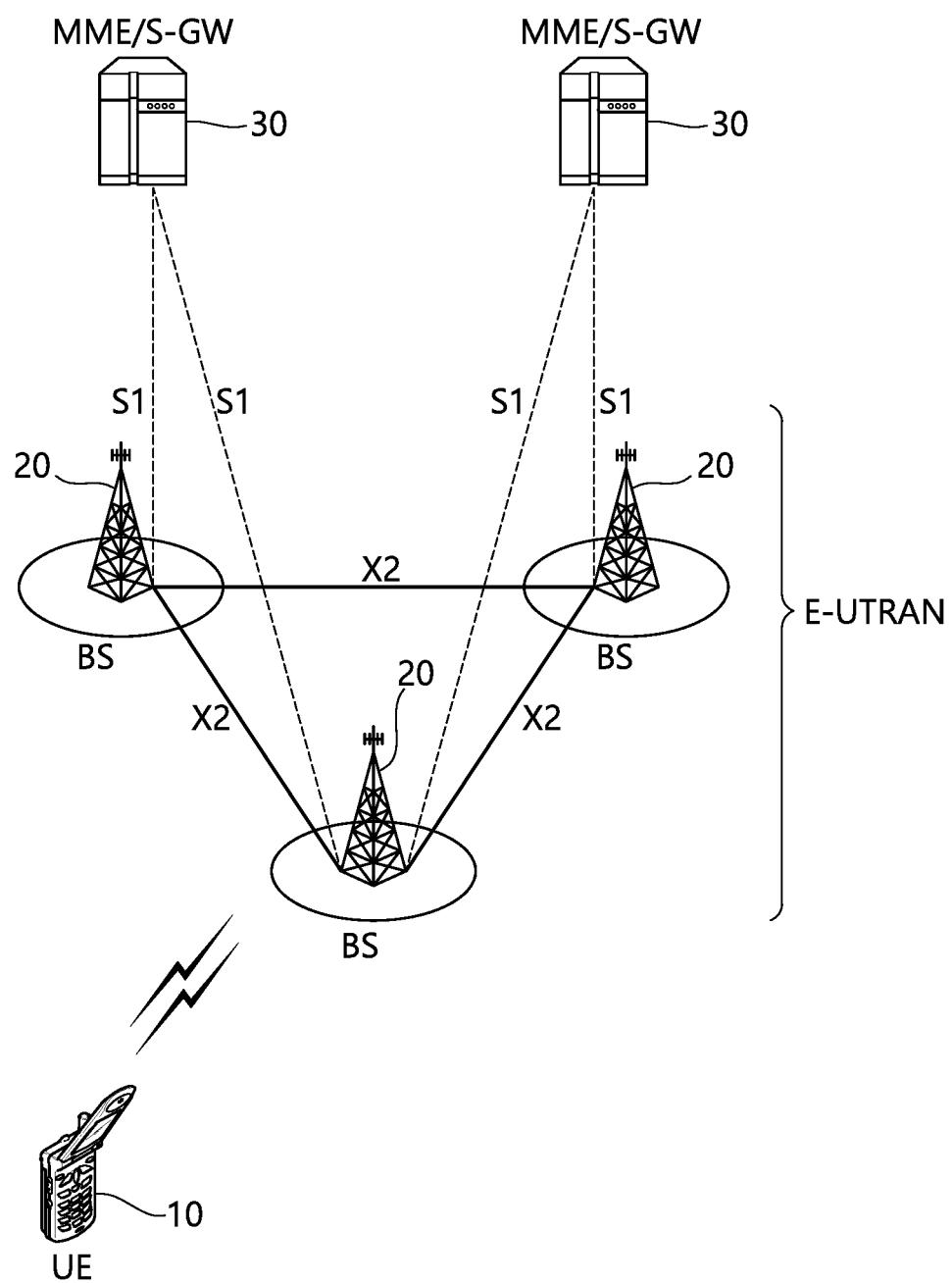
FIG. 1 shows a wireless communication system to which the present document is applied.

FIG. 1 shows a wireless communication system to which the present document is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
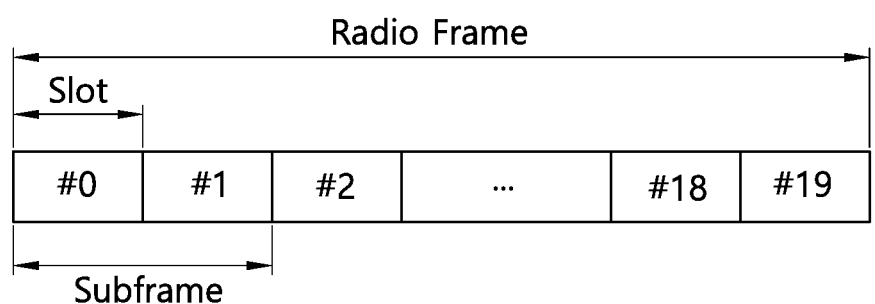
FIG. 2 shows a radio frame structure of 3GPP LTE.

FIG. 2 shows a radio frame structure of 3GPP LTE.

Referring to FIG. 2, a radio frame a radio frame includes 10 subframes and one subframe includes 2 slots. A subframe may have a length of 1 ms and a slot may have a length of 0.5 ms. A time taken to transmit one subframe is referred to as a transmission time interval (TTI). A TTI may be a minimum scheduling unit.

One slot may include a plurality of orthogonal frequency division multiplexing (OFDM) symbols in the time domain. An OFDM symbol is use to represent one symbol period because 3GPP LTE uses OFDMA on downlink and may be called by other names. For example, the OFDM symbol may be called an SC-FDMA symbol. Although one slot includes 7 OFDM symbols in the disclosure for example, the number of OFDM symbols included in one slot may vary according to a cyclic prefix (CP) length. According to 3GPP, 1 subframe includes 7 OFDM symbols in CP and includes 6 OFDM symbols in extended CP. The structure of the radio frame is exemplary and the number of subframes included in a radio frame and the number of slots included in a subframe may be varied in various manners.

Figure 3:
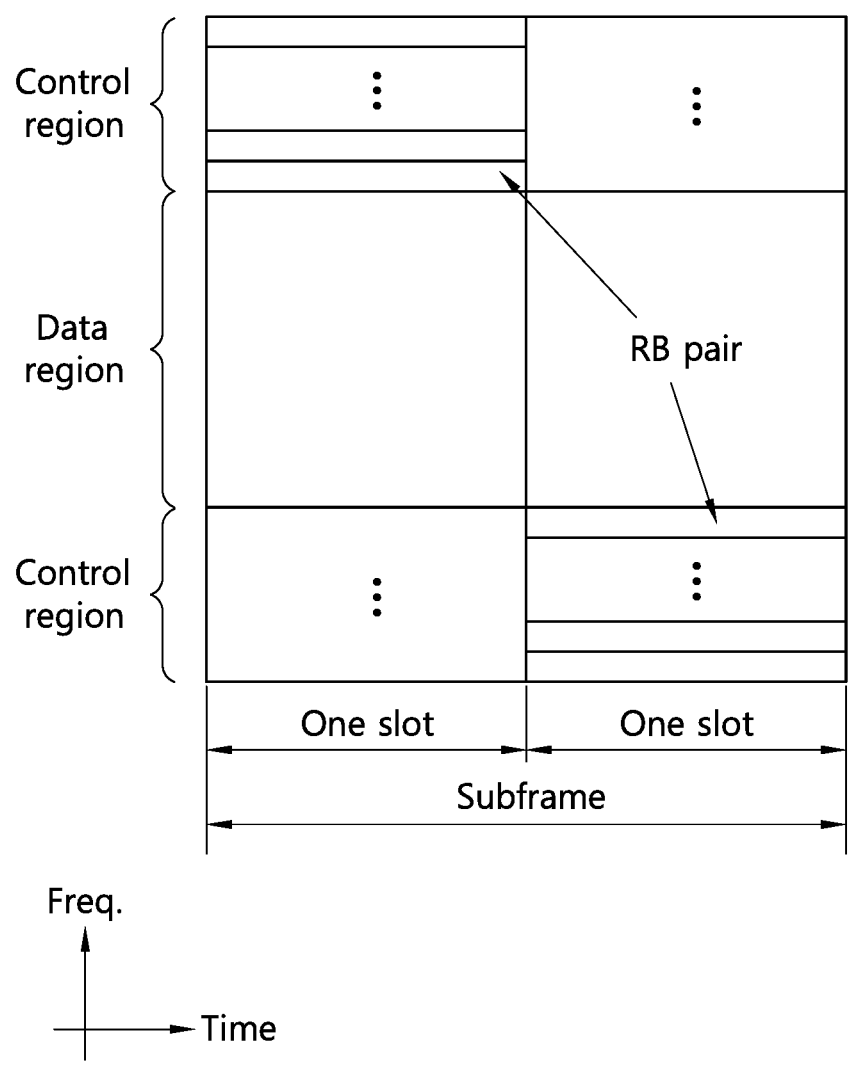
FIG. 3 illustrates an uplink subframe structure.

FIG. 3 illustrates an uplink subframe structure.

Referring to FIG. 3, an uplink subframe can be divided into a control region to which a physical uplink control channel (PUCCH) carrying uplink control information is allocated and a data region to which a physical uplink shared channel (PUSCH) carrying user data is allocated.

A PUCCH for one UE is allocated to a resource block (RB) pair in a subframe and RBs belonging to an RB pair occupy different subframes in 2 slots. This is referred to as frequency hopping of an RB pair allocated to a PUCCH on a slot boundary.

A PUCCH can support multiple formats. That is, the PUCCH can carry uplink control information having different numbers of bits per subframe according to modulation schemes. For example, 1-bit uplink control information can be transmitted over the PUCCH when Binary Phase Shift Keying (BPSK) is used (PUCCH format 1a) and 2-bit uplink control information can be transmitted over the PUCCH when Quadrature Phase Shift Keying (QPSK) is used (PUCCH format 1b). PUCCH formats further include format 1, format 2, format 2a and format 2b.

Figure 4:
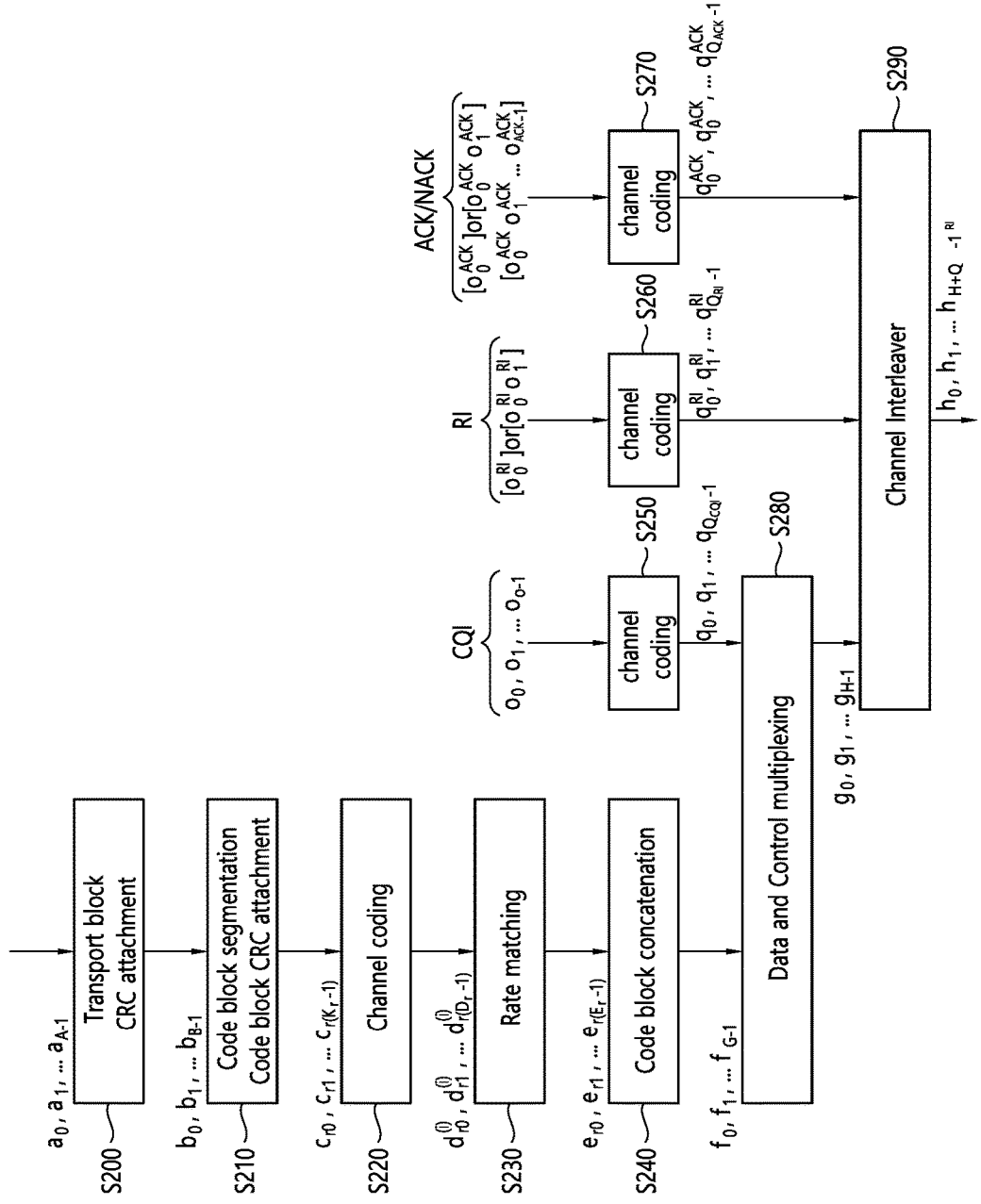
FIG. 4 illustrates a process in which uplink control information and uplink data are multiplexed on a PUSCH.

FIG. 4 illustrates a process in which uplink control information and uplink data are multiplexed on a PUSCH.

Referring to FIG. 4, data bits $a_0, a_1, \ldots, a_{A-1}$ are given in the form of a transport block per TTI. First, cyclic redundancy check (CRC) parity bits $p_0, p_1, \ldots, p_{L-1}$ are added to the data bits $a_0, a_1, \ldots, a_{A-1}$ to generate CRC added bits $b_0, b_1, \ldots, b_{B-1}$ (S200). Here, B=A+L. The relationship between $a_k$ and $b_k$ can be represented as follows.

$$b_k = a_k \text{ for } k=0,1,\ldots,A-1$$

$$b_k = p_{k-A} \text{ for } k=A,A+1,\ldots,A+L-1 \quad \text{[Equation 1]}$$

The CRC added bits $b_0, b_1, \ldots, b_{B-1}$ are segmented into code blocks and CRC parity bits are added again in units of code block (S210). A bit sequence output after code block segmentation is referred to as $c_{r0}, c_{r1}, \ldots, c_{r(K_r-1)}$. Here, when a total number of code blocks is C, r refers to a code block number and $K_r$ refers to the number of bits for the code block number r.

Channel coding is performed on a bit sequence for a given code block (S220). Encoded bits are represented as $d^{(i)}_0, d^{(i)}_1, \ldots, d^{(i)}_{D-1}$, D is the number of encoded bits per output stream and i is an index of an encoder output bit stream.

Rate matching is performed on encoded bits (S230) and code block concatenation is performed thereon (S240) to generate a data bit sequence $f_0, f_1, \ldots, f_{G-1}$. Here, G represents a total number of encoded bits used for transmission other than bits used for control information transmission when control information is multiplexed on a PUSCH.

Meanwhile, control information (uplink control information) can be multiplexed along with data (uplink data). Data and control information can use different coding rates by allocating different numbers of coded symbols for transmission thereof. Control information includes a channel quality indicator (CQI)), a rank indicator (RI), acknowledgement/not-acknowledgement (ACK/NACK), etc.

Channel coding is performed on CQI $o_0, o_1, \ldots, o_{O-1}$ (O is the number of bits of a CQI) to generate a control information bit sequence $q_0, q_1, \ldots, q_{QCQI-1}$ (S250). Channel coding is performed on RI $o_0^{RI}$ or RI $o_0^{RI}, o_1^{RI}$ to generate a control information bit sequence $q_0^{RI}, q_1^{RI}, \ldots, q_{QRI-1}^{RI}$ (S260). Similarly, channel encoding is performed on ACK/NACK $o_0^{ACK}$ or ACK/NACK $o_0^{ACK}, o_1^{ACK}$ or $o_0^{ACK}, o_1^{ACK}, \ldots, o_{oACK-1}^{ACK}$ to generates a control information bit sequence $q_0^{ACK}, q_1^{ACK}, \ldots, q_{QACK-1}^{ACK}$ (S270).

The generated data bit sequence $f_0, f_1, \ldots, f_{G-1}$ and control information bit sequence $q_0, q_1, \ldots, q_{QCQI-1}$ of the CQI are multiplexed into a multiplexed sequence $g_0, g_1, \ldots, g_{H-1}$ (S280). When multiplexing is performed, the control information bit sequence $q_0, q_1, \ldots, q_{QCQI-1}$ of the CQI may be arranged and then the data bit sequence $f_0, f_1, \ldots, f_{G-1}$ may be arranged. That is, when H=G+Q, $[g_0, g_1, \ldots, g_{H-1}] = [q_0, q_1, \ldots, q_{QCQI-1}, f_0, f_1, \ldots, f_{G-1}]$.

The multiplexed sequence $g_0, g_1, \ldots, g_{H-1}$ is mapped to a modulation sequence $h_0, h_1, \ldots, h_{H'-1}$ through a channel interleaver (S280). Further, a control information bit sequence of an RI or ACK/NACK is mapped to a modulation sequence $h_0, h_1, \ldots, h_{H'-1}$ through a channel interleaver. Here, $h_i$ is a modulation symbol on a constellation, and H'=H+$Q_{RI}$. Each modulation symbol of the modulation sequence $h_0, h_1, \ldots, h_{H'-1}$ is mapped to a resource element for a PUSCH. The resource element is an allocation unit on a subframe which is defined as 1 SC-FDMA symbol (or OFDMA symbol) and 1 subcarrier.

Figure 5:
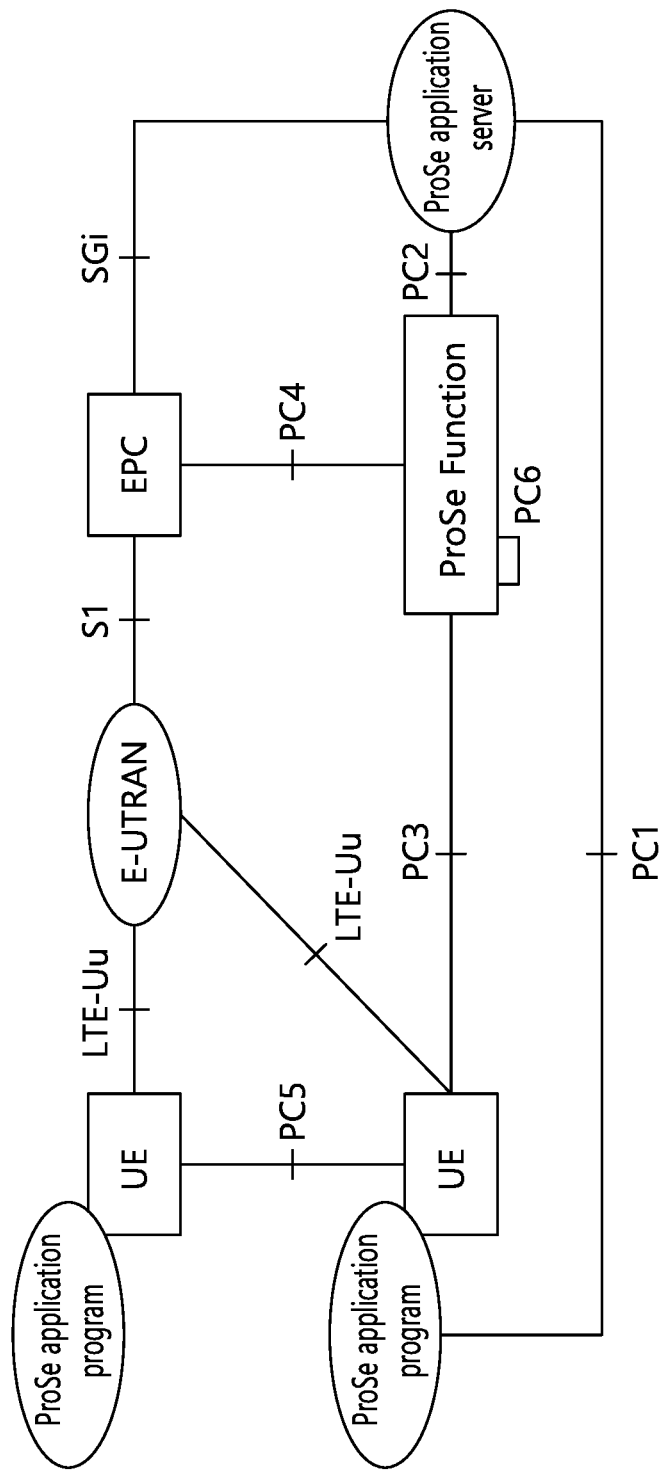
FIG. 5 illustrates a reference structure for a ProSe.

FIG. 5 illustrates a reference structure for a ProSe.

Referring to FIG. 5, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
   Interworking via a reference point towards the 3rd party applications
   Authorization and configuration of the UE for discovery and direct communication)
   Enable the function of the EPC level ProSe discovery
   ProSe related new subscriber data and handling of data storage, and also handling of ProSe identities
   Security related function
   Provide control towards the EPC for policy related function
   Provide function for charging (via or outside of EPC, e.g., offline charging))

Hereinafter, a reference point and a reference interface will be described in a reference structure for the ProSe.
   PC1: a reference point between a ProSe application program in the terminal and a ProSe application program in a ProSe application server. The PC1 is used to define signaling requirements in an application level.
   PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 6:
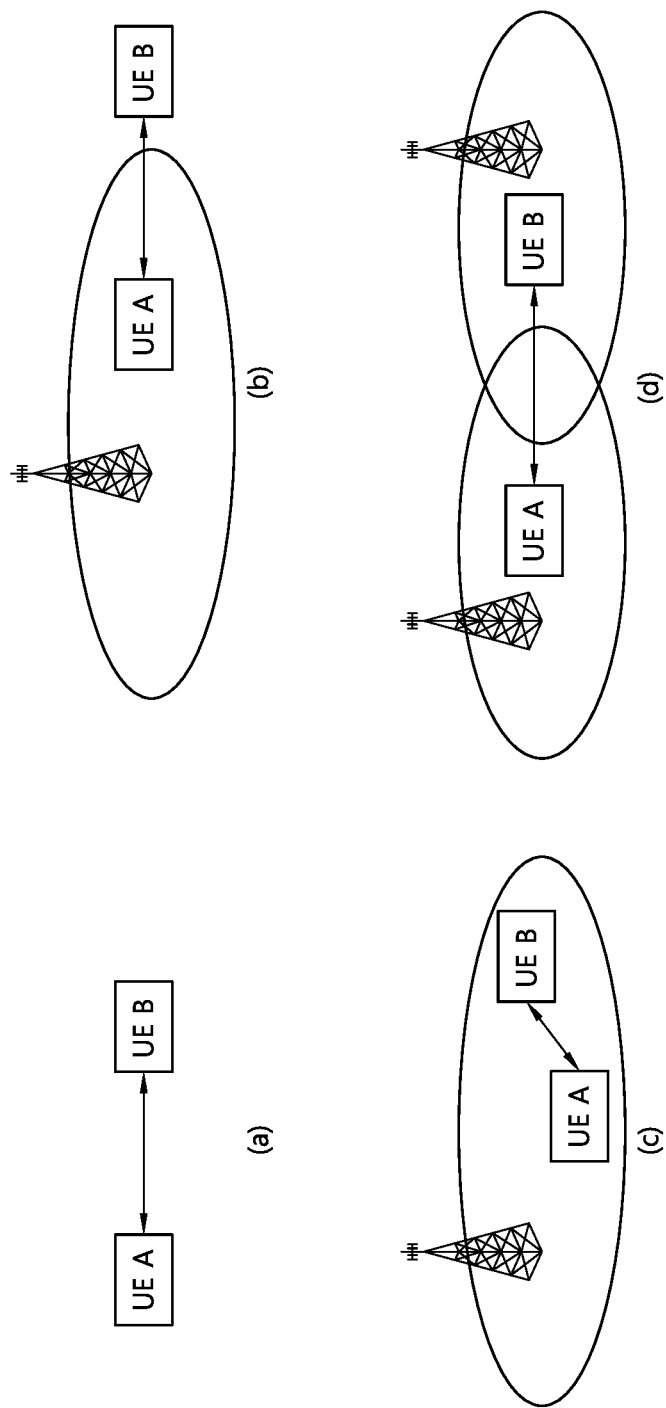
FIG. 6 illustrates arrangement examples of terminals performing ProSe direct communication and cell coverage.

FIG. 6 illustrates arrangement examples of terminals performing ProSe direct communication and cell coverage.

Referring to FIG. 6(a), UEs A and B may be located outside of the cell coverage. Referring to FIG. 6(b), the UE A may be located in the cell coverage and the UE B may be located outside of the cell coverage. Referring to FIG. 6(c), both of UEs A and B may be located in the cell coverage. Referring to FIG. 6(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 7:
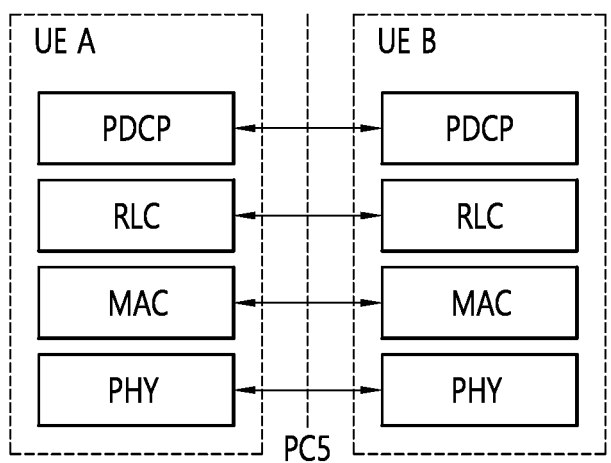
FIG. 7 illustrates a user plane protocol stack for the ProSe direct communication.

FIG. 7 illustrates a user plane protocol stack for the ProSe direct communication.

Referring to FIG. 6, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 8:
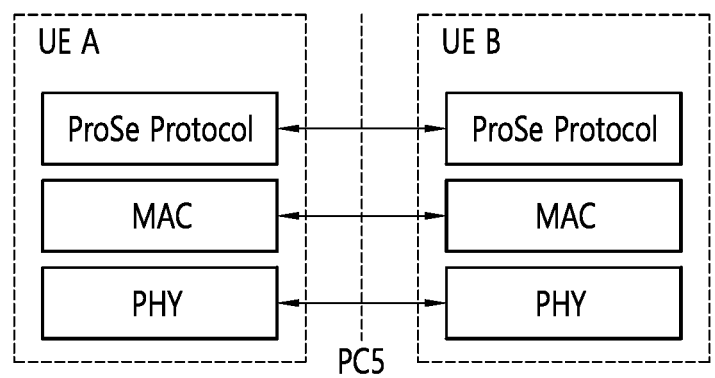
FIG. 8 illustrates a PC 5 interface for D2D discovery.

FIG. 8 illustrates a PC 5 interface for D2D discovery.

Referring to FIG. 8, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present document will be described.

In general, D2D operation has various advantages because the D2D operation is signal transmission and reception between neighboring devices. For example, a D2D UE can perform data communication with a high transfer rate and low delay. Further, D2D operation can distribute traffic concentrating on a base station, and if a UE performing D2D operation serves as a relay, the UE can extend coverage of a base station. Communication including signal transmission and reception between vehicles owing to extension of the aforementioned D2D communication and related to vehicles is called V2X (vehicle-to-X) communication.

Here, "X" in V2X (vehicle-to-X) refers to a pedestrian (communication between a vehicle and a device carried by an individual (e.g., a handheld terminal carried by a pedestrian, a cyclist, a driver or a passenger)) (V2P), a vehicle (communication between vehicles) (V2V), an infrastructure/ network (communication between a vehicle and a roadside unit (RSU)/network (e.g., an RSU is a transportation infrastructure entity (e.g., an entity transmitting speed notifications) implemented in an eNB or a stationary UE)) (V2I/N), and the like, for example. Further, for convenience of description of proposed methods, a (V2P communication related) device carried by a pedestrian (or individual) is called a "P-UE" and a (V2X communication related) device implemented in a vehicle is called a "V-UE", for example. Further, the term "entity" may be interpreted as a P-UE, a V-UE and/or an RSU (/network/infrastructure), for example, in the present document.

A UE providing (or supporting) the aforementioned D2D operation may be called a D2D UE and a UE providing (or supporting) the aforementioned V2X operation may be called a V2X UE. Although embodiments of the present document will be described from the viewpoint of a V2X UE for convenience of description, description of the V2X UE can be applied to the D2D UE.

According to the present document, when V2X UE(s) transmit "V2X message(s) with variable sizes" through "periodic resources (having fixed sizes)" reserved(/selected) in advance, for example, the V2X UE(s) can be defined to follow (some of) rules described below. Here, when (some of) the following rules are applied, for example, "V2X message(s) with variable sizes" can be transmitted with high reliability. Here, a V2X message can include control information and/or data.

Example # A only "resource position(/size)" information is designated in periodic resource allocation, and V2X UE(s) can be caused to consider/determine "link quality" and/or "V2X message sizes (to be transmitted)" of each transmission timing and then piggyback and transmit "modulation and coding scheme (MCS) index(/modulation order)" information along with "data" on a previously designated channel (e.g., a physical sidelink channel (PSSCH)). Here, channel coding different from that for "data" may be applied to control information (e.g., "MCS index(/modulation order)" and/or "TB S index(/transport block size)") piggybacked and transmitted along with the "data" on a previously designated channel (e.g., a PSSCH), for example. Here, since reception V2X UE(s) need to ascertain resources through which the control information is transmitted, for example, it is desirable that the positions(/sizes) of the resources be fixed.

Example # B

Only "resource position(/size)" information and "MCS index (/modulation order)" information are designated in periodic resource allocation and V2X UE(s) can be caused to consider/determine "link quality" and/or "V2X message sizes (to be transmitted)" of each transmission timing and then piggyback and transmit "TBS index(/transport block size)" information along with "data" on a previously designated channel (e.g., a PSSCH). Here, information most suitable for an actual V2X message size (to be transmitted) (e.g., a minimum or closest value among values equal to or greater than the V2X message size) can be selected as the "TBS index(/transport block size)" information, for example.

A detailed mapping method when V2X UE(s) piggyback and transmit control(/scheduling) information (e.g., "MCS index(/modulation order)" and/or "TB S index(/transport block size)") (along with "data") on a previously designated channel (e.g., a PSSCH) is proposed below.

Prior to detailed description of the proposed method, when V2X communication is performed in a relatively "high frequency band (e.g., 6 GHz)" and at a "high speed (e.g., (a maximum of) 140 Km/H)", for example, channel estimation performance (based on a pre-defined(/signaled) reference signal (RS) (e.g., "DM-RS") may decrease (/deteriorate) due to "phase drift (caused by "frequency offset" and "Doppler effect")" and "inter-carrier interference (ICI)" Here, to solve this problem, the density(/number) of reference signals (e.g., "DM-RSs") used for channel estimation can be increased, for example. Accordingly, "phase offset" correction and channel estimation performance can be improved, for example.

FIGS. 9 to 13 illustrate examples of cases in which the density(/number) of reference signals used for channel estimation is increased. More specifically, FIGS. 9 to 13 illustrates cases in which the density(/number) of reference signals (e.g., "DM-RSs") used for channel estimation is increased (e.g., 4 symbols are used for reference signal (DM-RS) transmission). Here, a case in which "normal CP" is set is assumed.

Figure 9:
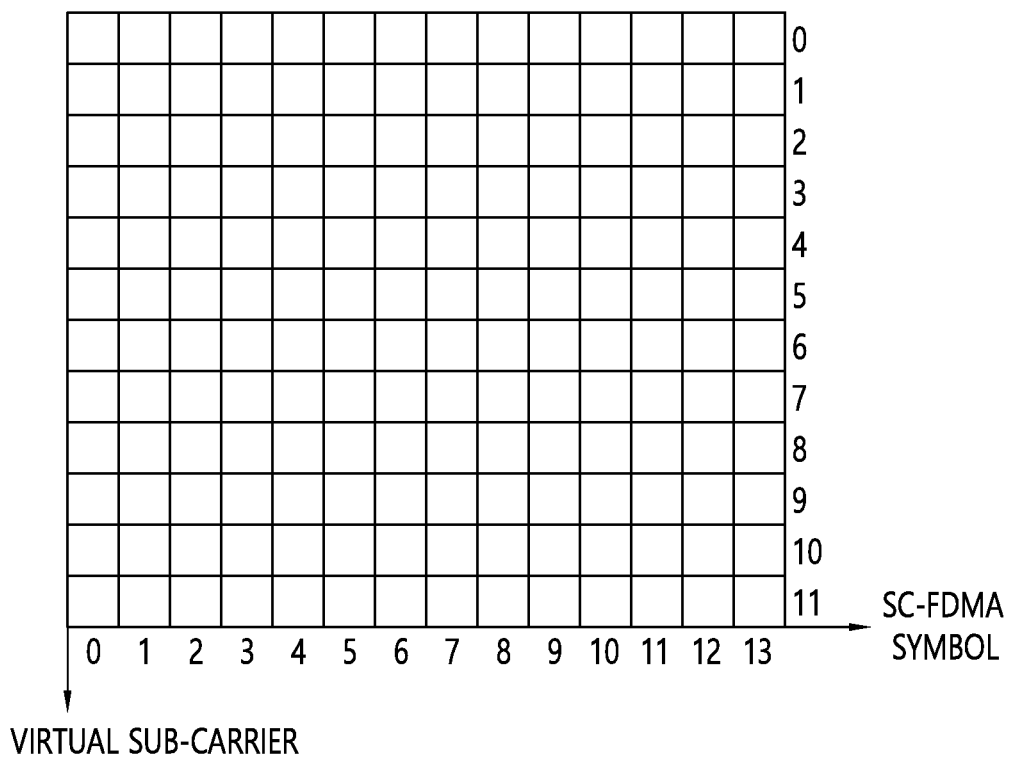
FIGS. 9 to 13 illustrate examples of cases in which the density(/number) of reference signals used for channel estimation is increased.
Figure 10:
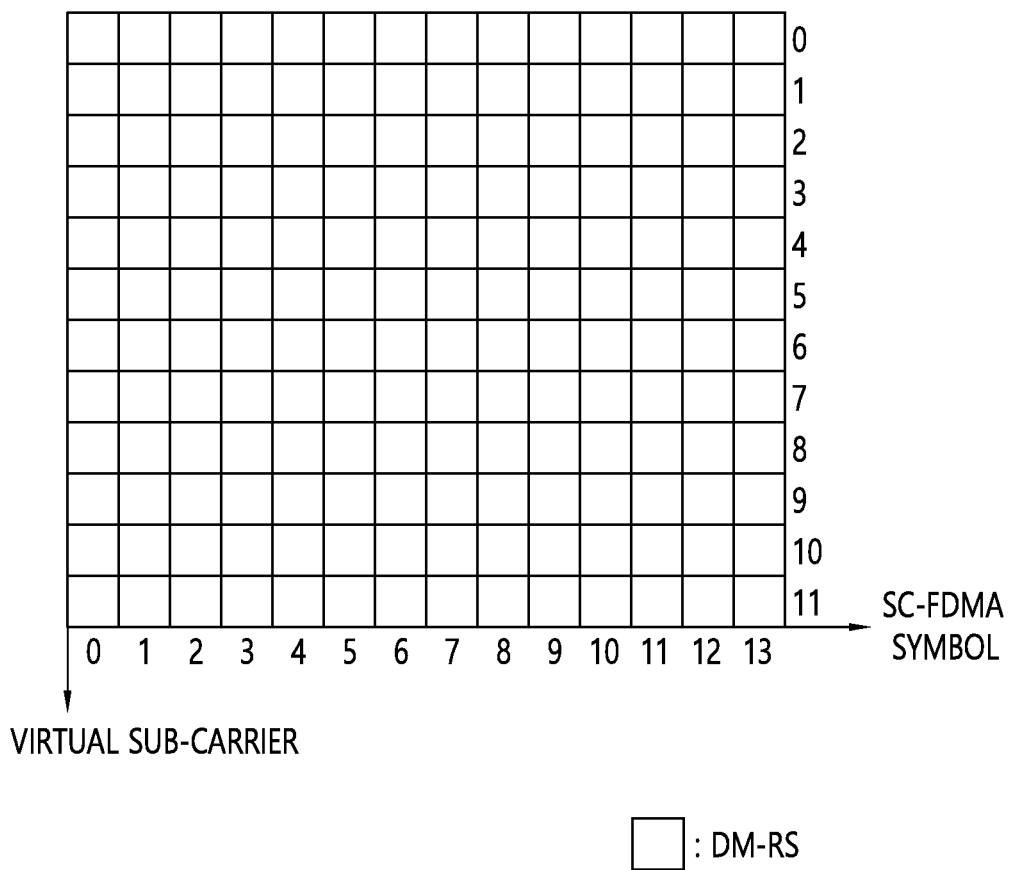
Figure 11:
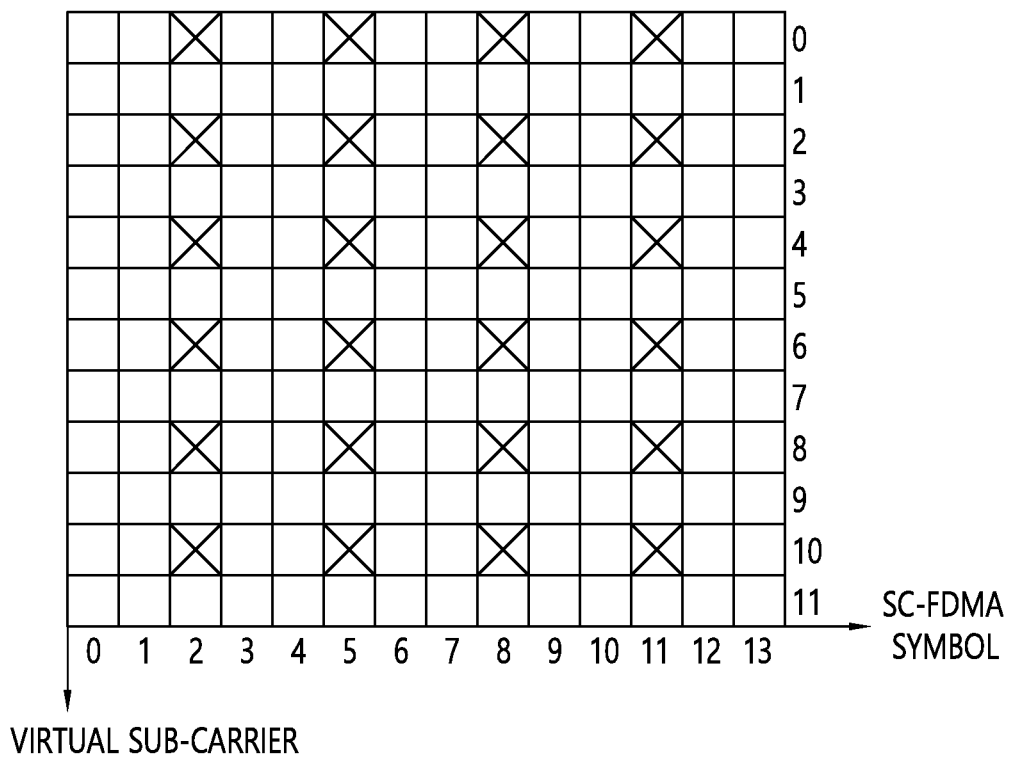
Figure 12:
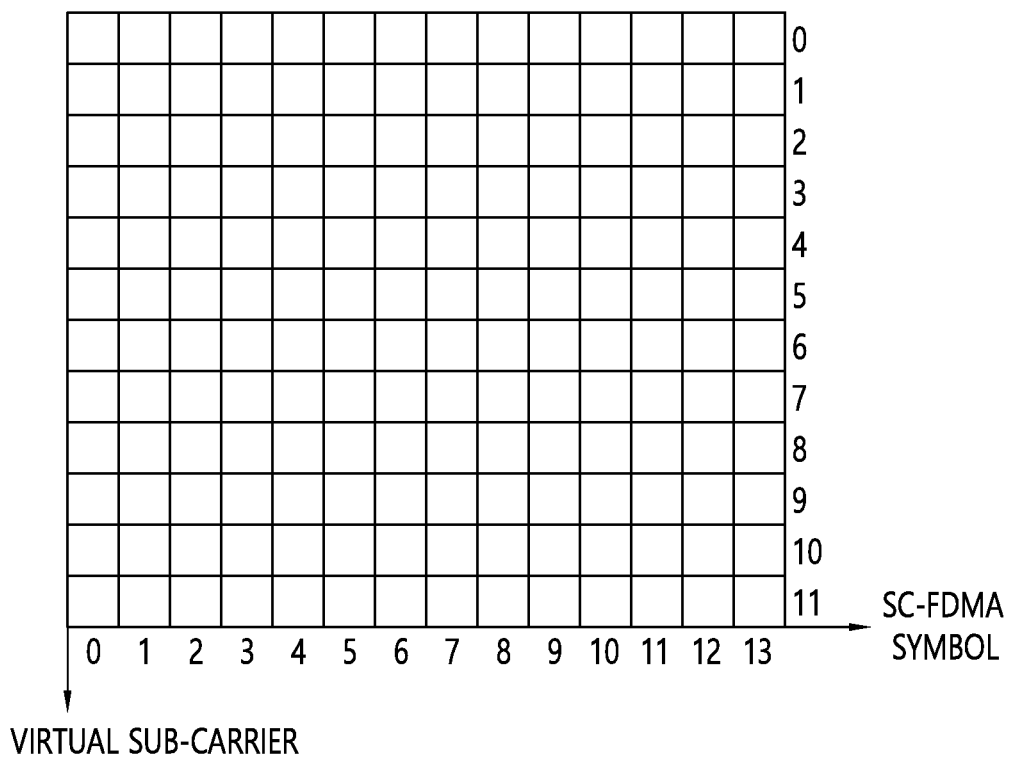
Figure 13:
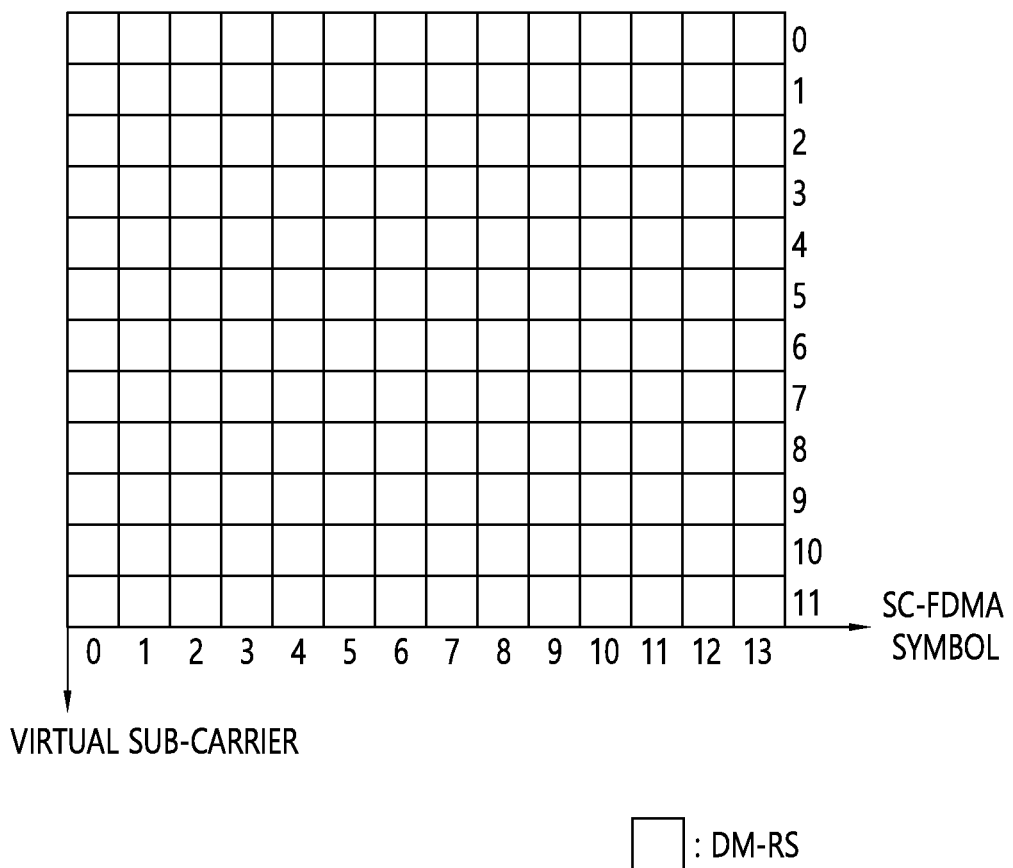

Here, FIG. 9 illustrates a case in which 4 symbol DM-RSs are present at "symbols #2, #5, #8 and #11". FIG. 10 illustrates a case in which 4 symbol DM-RSs are present at "symbols #2, #4, #9 and #11". FIG. 11 illustrates comb-type RSs at "symbols #2, #5, #8 and #11". FIG. 12 illustrates FDM of RS and data at every symbol (OFDM-like structure). FIG. 13 illustrates FDM of RS and data at "symbols #1, #2, #3, #4, #5, #6, #7, #8, #9, #10, #11 and #12" (OFDM-like structure).

In the following, "reference signal structures (/densities/ numbers)" of FIGS. 9 to 13 are assumed for convenience of description (or proposed methods). However, the proposed methods of the present document can be extended and applied to other "reference signal structures (/densities/ numbers).

Figure 14:
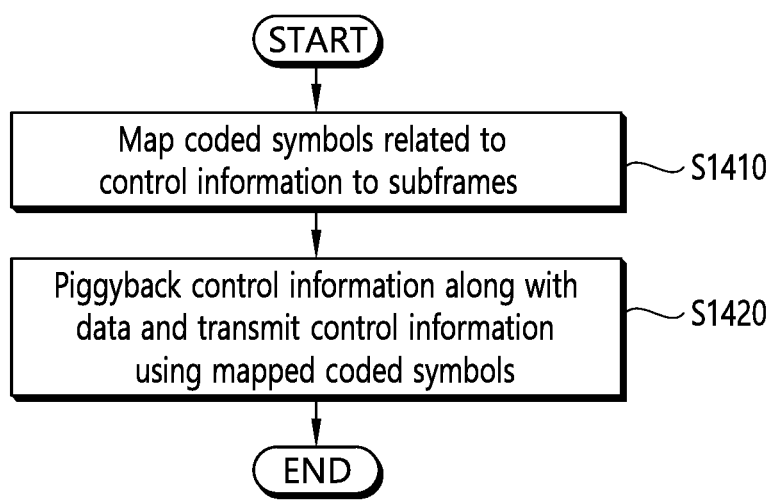
FIG. 14 is a flowchart of a method of mapping a coded symbol related to control information on a subframe according to an embodiment of the present document.
Figure 15:
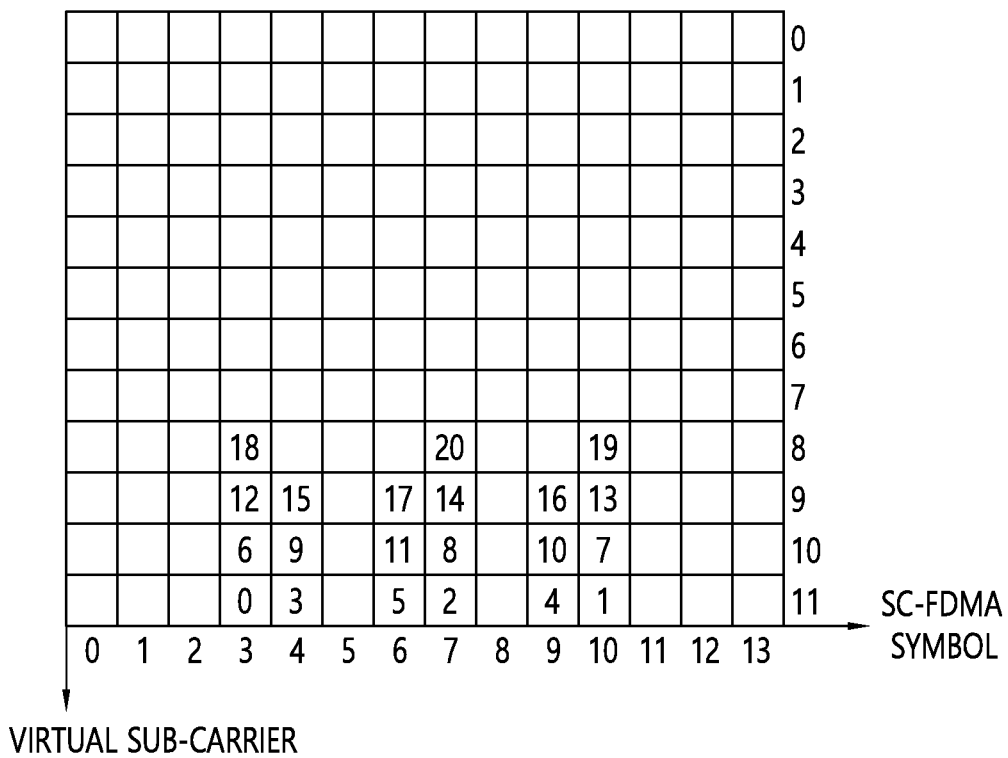
FIGS. 15 to 23 illustrate mapping of control(/scheduling) information related "coded symbol(s)" according to (rule #1-1), (rule #1-2) and (rule #1-3) in the cases of FIG. 9 and/or FIG. 11.
Figure 16:
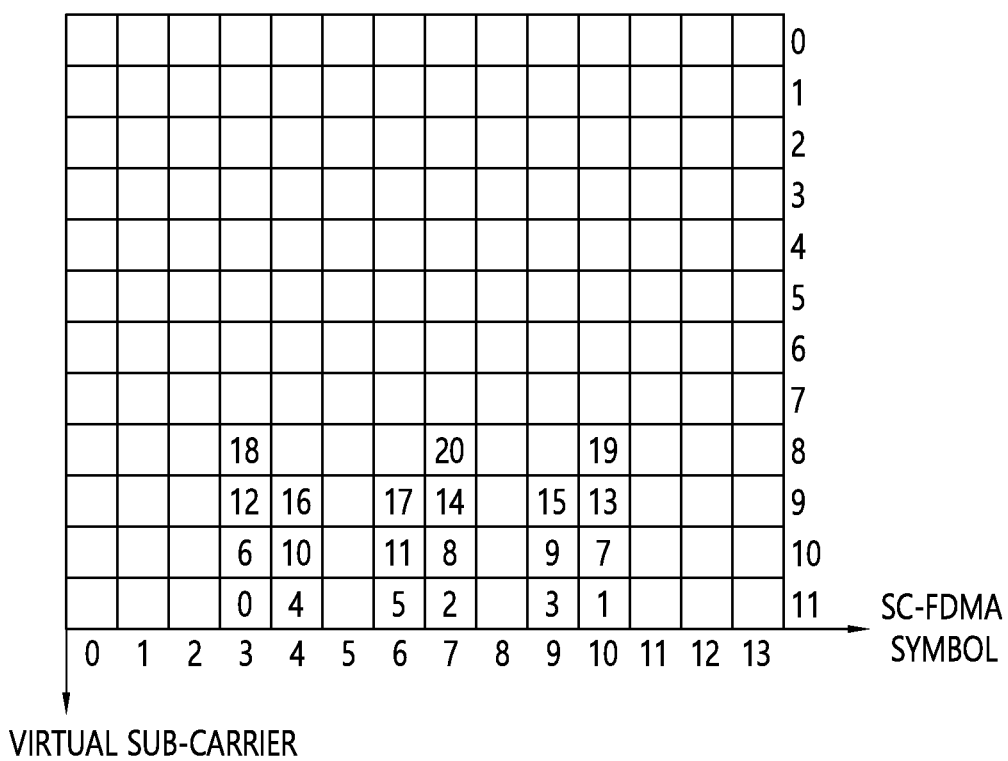
Figure 17:
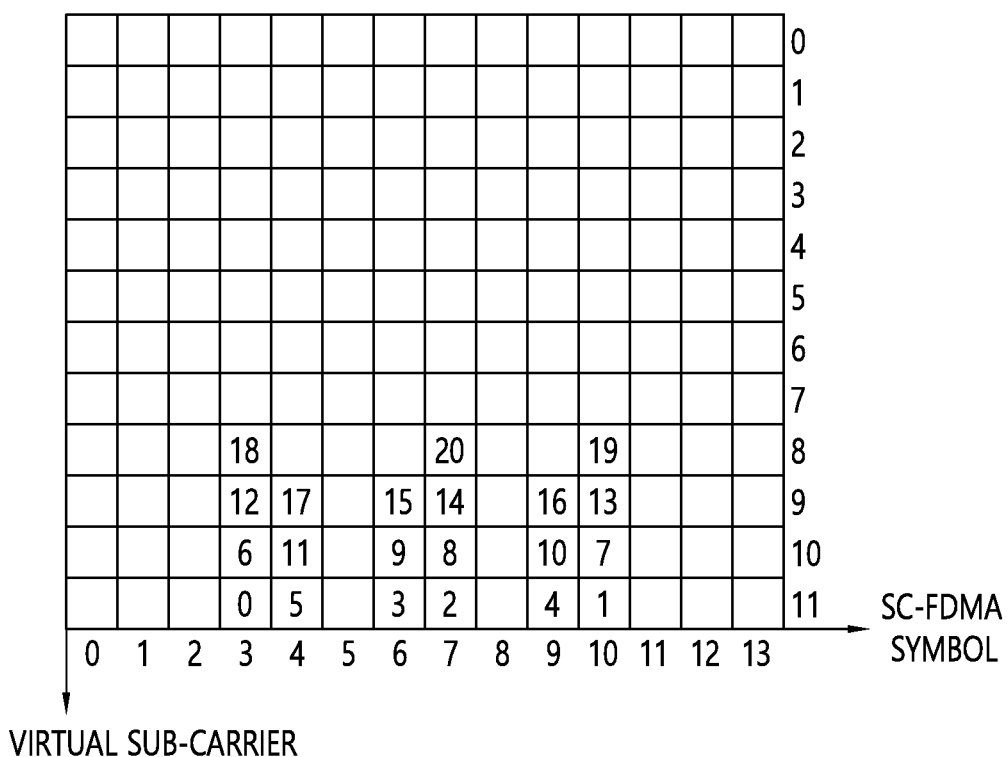
Figure 18:
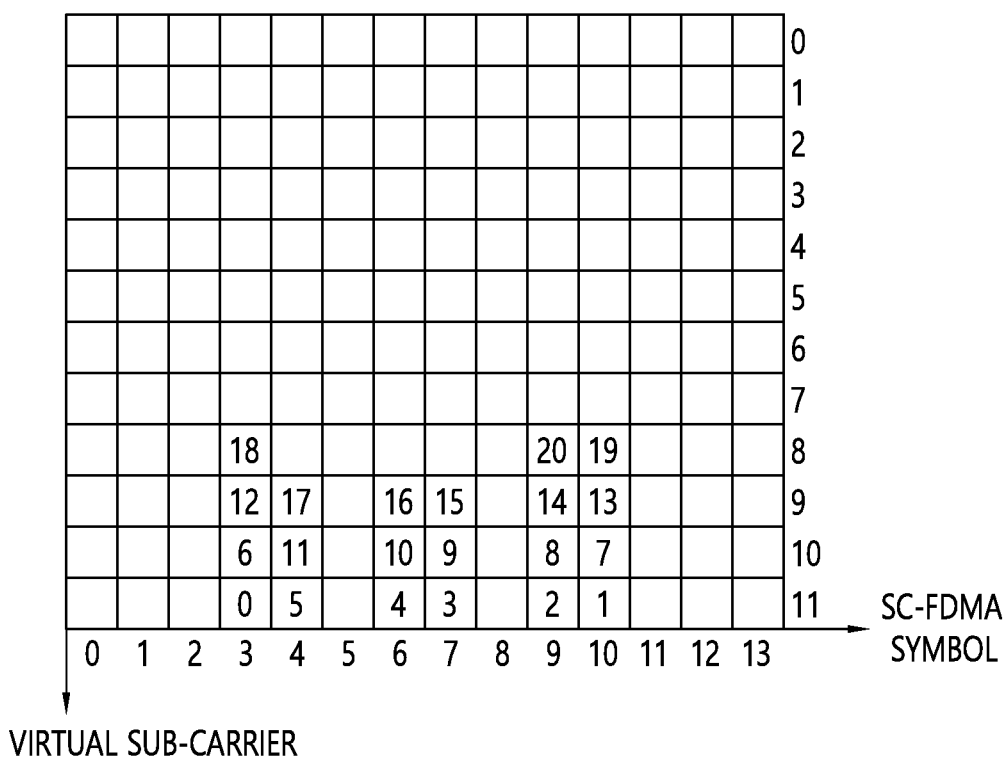
Figure 19:
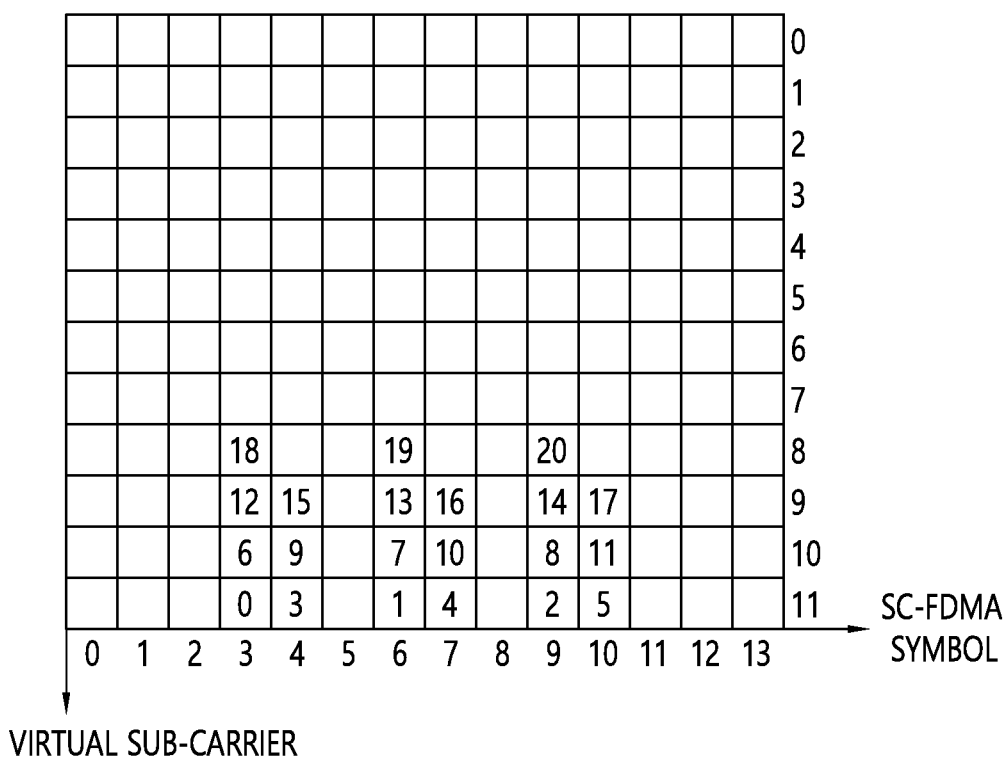
Figure 20:
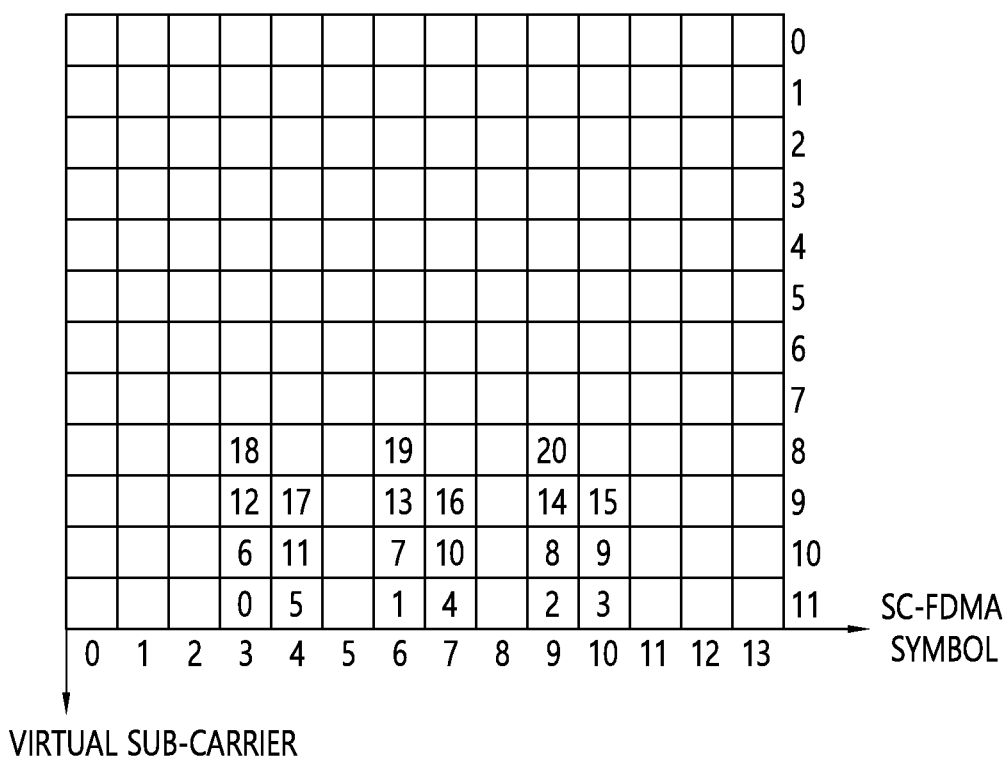
Figure 21:
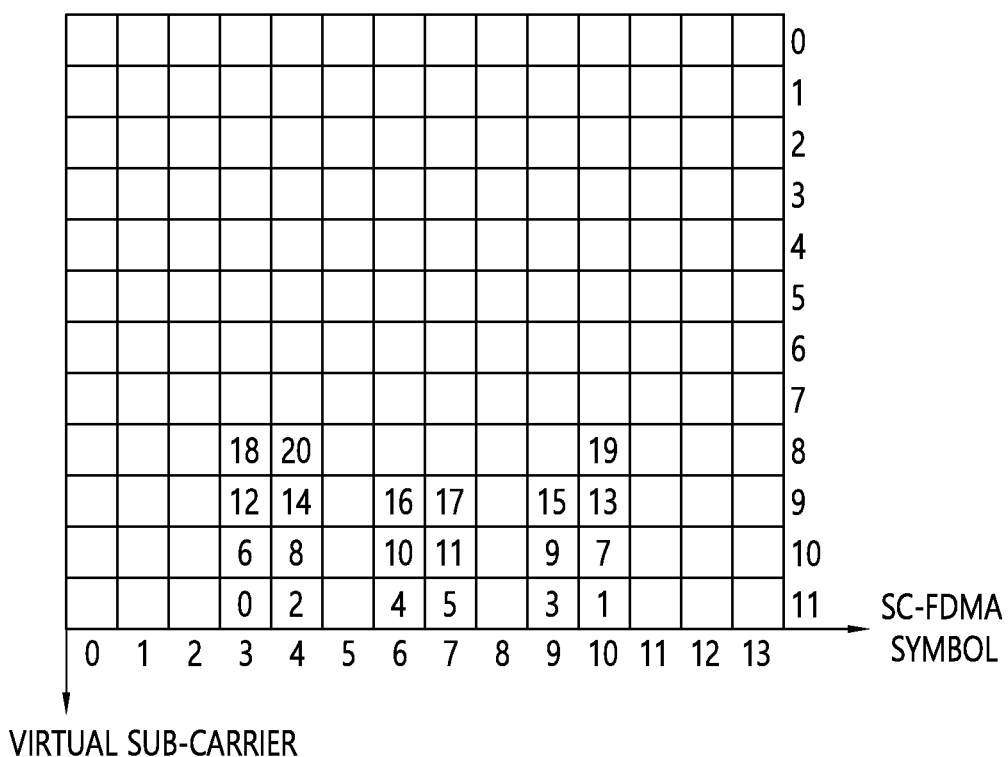
Figure 22:
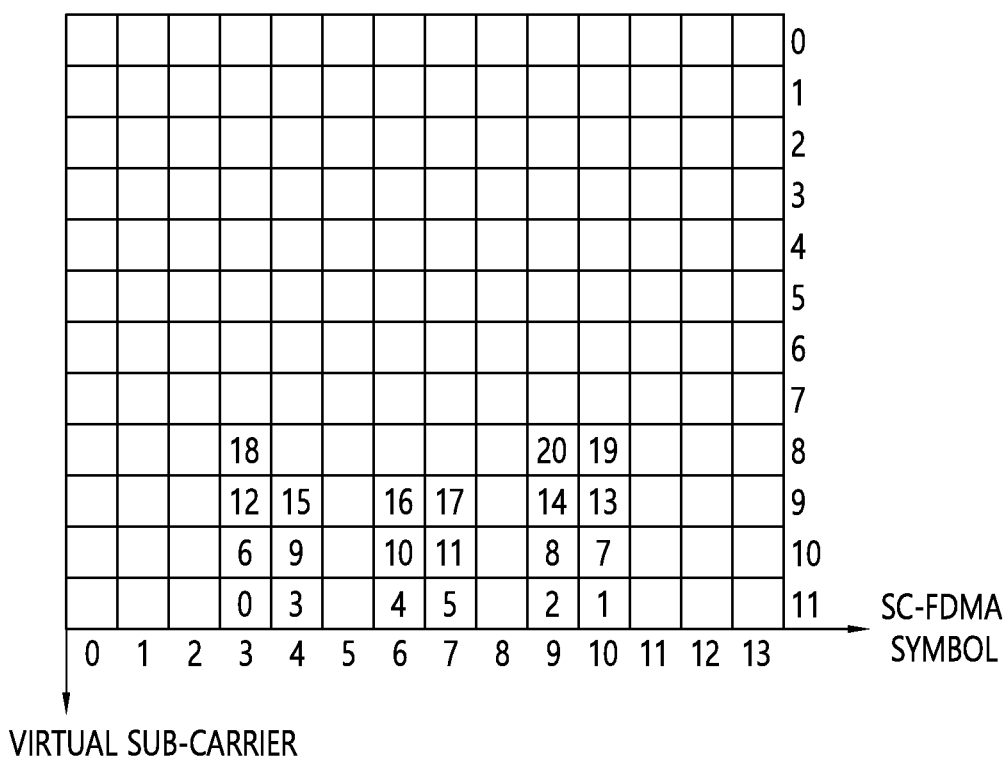
Figure 23:
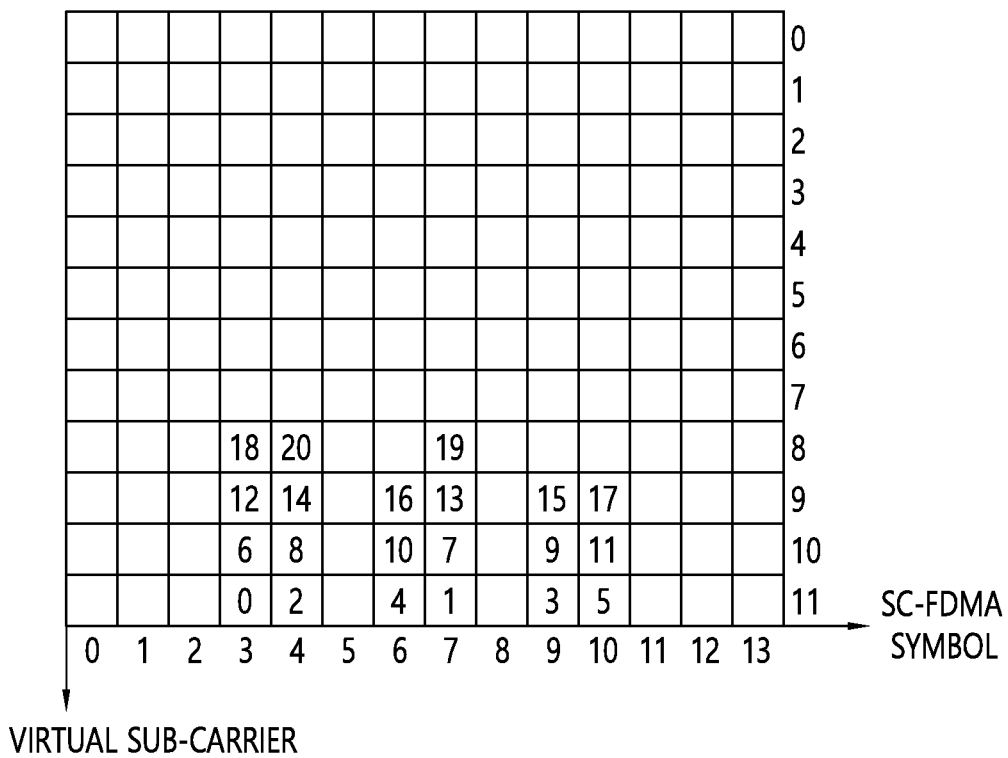

FIG. 14 is a flowchart of a method of mapping a coded symbol related to control information on a subframe according to an embodiment of the present document.

Referring to FIG. 14, a UE maps coded symbols related to control information on subframes (S1410). Here, the UE may be a V2X UE. A detailed example of mapping coded symbols related to control information will be described below.

[Proposed method] Control(/scheduling) information related "coded symbol(s)" can be mapped according to (some of) the following rules (/principle). Here, the (control (/scheduling) information related) "coded symbol(s)" may be configured to be mapped prior to "data" (in a form in which "data" is "rate-matched") or to be mapped by "puncturing" preferentially(/first) mapped "data", for example. Further, "a maximum number of control(/scheduling) information related 'coded symbol(s)'" may be limited to "the number of symbols to which the control(/scheduling) information related 'coded symbol(s)' are mapped"דscheduled bandwidth (the number of subcarriers) of a channel (e.g., "PSSCH") over which the control(/scheduling) information is transmitted along with 'data'", for example.

(Rule #1-1) To improve "channel estimation(/decoding) performance", (control(/scheduling) information related) "coded symbol(s)" are mapped to regions close (closest) to "DM-RS" symbol(s).

(Rule #1-2) To reduce "extra(/outer)-polation" based channel estimation, (control(/scheduling) information related) "coded symbol(s)" are mapped (only) between "DM-RS" symbol(s). For example, when this rule is applied, (control(/scheduling) information related) "coded symbol(s)" are not mapped on "symbol(s) before the first 'DM-RS' symbol" and "symbol(s) after the last 'DM-RS' symbol".

(Rule #1-3) To obtain (maximum) "time-diversity" gain, a spacing between (control(/scheduling) information related) "coded symbol(s)" (consecutively) mapped on the same frequency(/subcarrier) is maximized.

FIGS. 15 to 23 illustrate mapping of control(/scheduling) information related "coded symbol(s)" according to (rule #1-1), (rule #1-2) and (rule #1-3) in the cases of FIG. 9 and/or FIG. 11.

More specifically, FIGS. 15 to 23 illustrate examples of mapping control(/scheduling) information related "coded symbol(s)" according to (rule #1-1), (rule #1-2) and (rule #1-3) in the cases of FIG. 9 and/or FIG. 11. Here, it is assumed that the number of control(/scheduling) information related "coded symbol(s)" (to be piggybacked) is "21", for example. Here, symbol positions (/resource sizes(/sizes)) to which (control(/scheduling) information related) "coded symbol(s)" are mapped may be interpreted as "symbols #3/4/6/7/9/10", for example. As another example, control(/scheduling) information related "coded symbol(s)" mapped to "symbol #6" and "symbol #7" may be changed such that they are mapped to "symbol #7" and "symbol #6" in FIGS. 15, 16 and 17. As a specific example, "coded symbols #5/11/7" mapped to "symbol #6" and "coded symbols #2/8/14/20" mapped to "symbol #7" may be changed such that the former is mapped to "symbol #7" and the latter is mapped to "symbol #6" in the case of FIG. 15.

Figure 24:
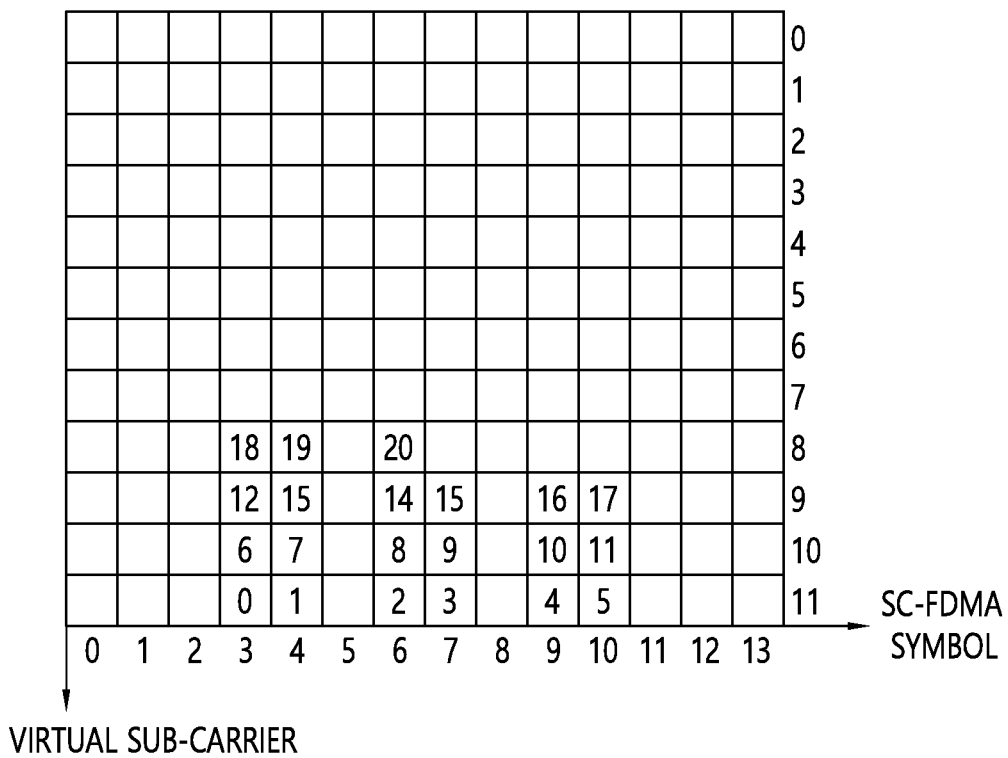
FIG. 24 illustrates an example of mapping control(/scheduling) information related "coded symbol(s)" according to (rule #1-1) and (rule #1-2) in the cases of FIG. 9 and/or FIG. 11.
Figure 25:
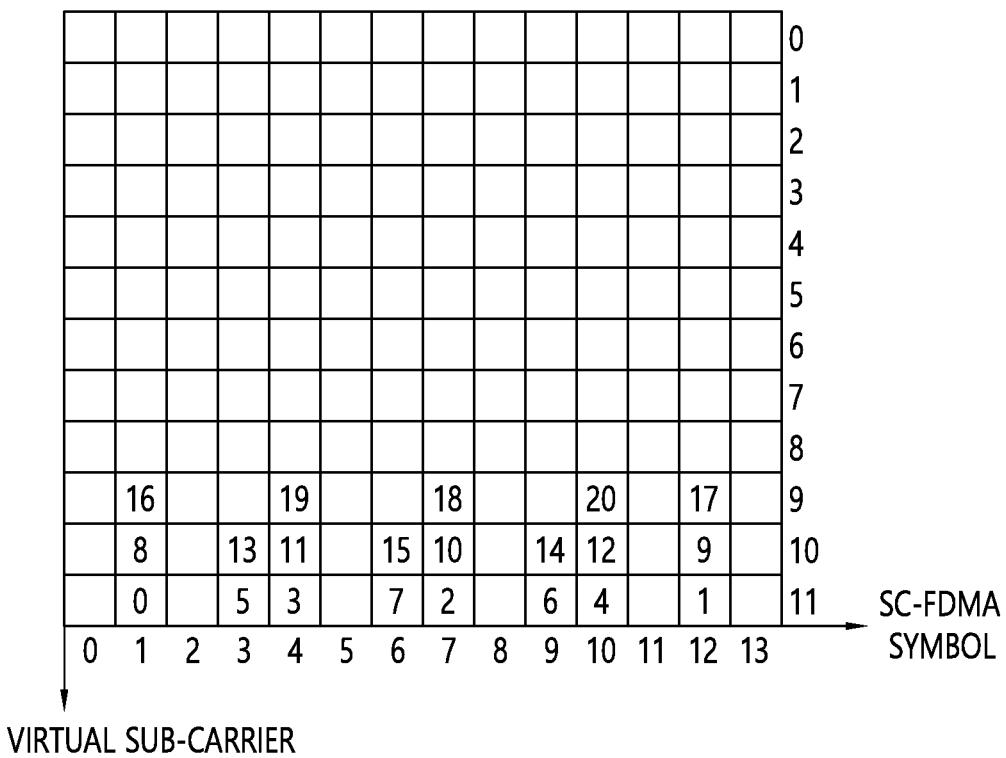
FIGS. 25 to 34 illustrate mapping of control(/scheduling) information related "coded symbol(s)" according to (rule #1-1) and (rule #1-3) in the cases of FIG. 9 and/or FIG. 11.
Figure 26:
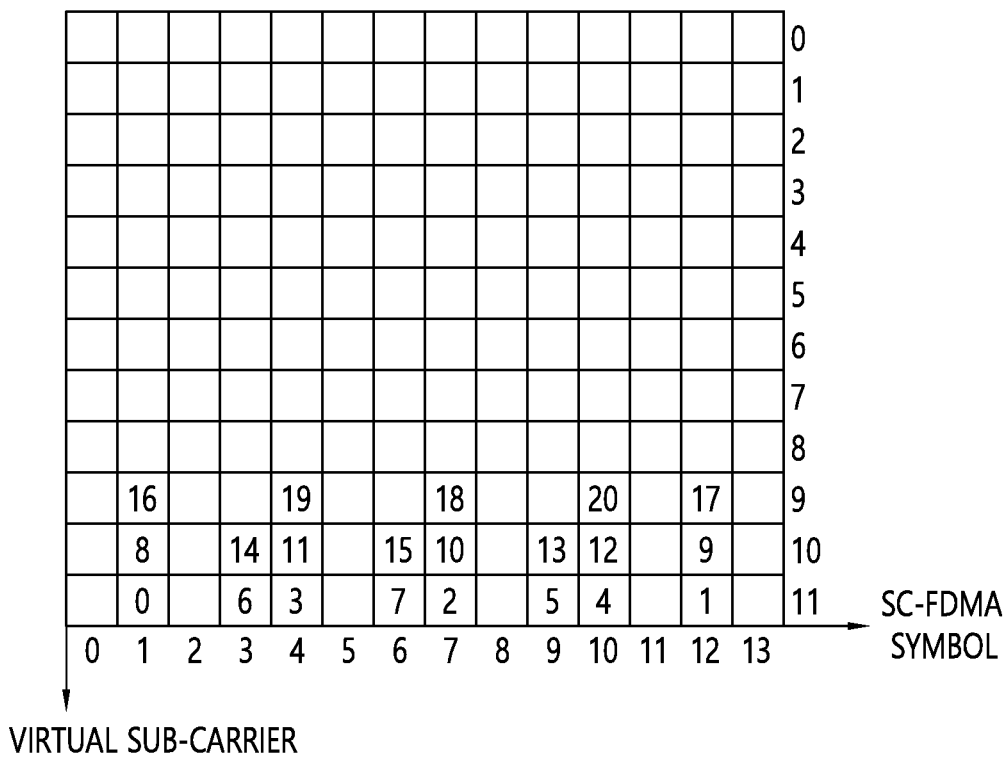
Figure 27:
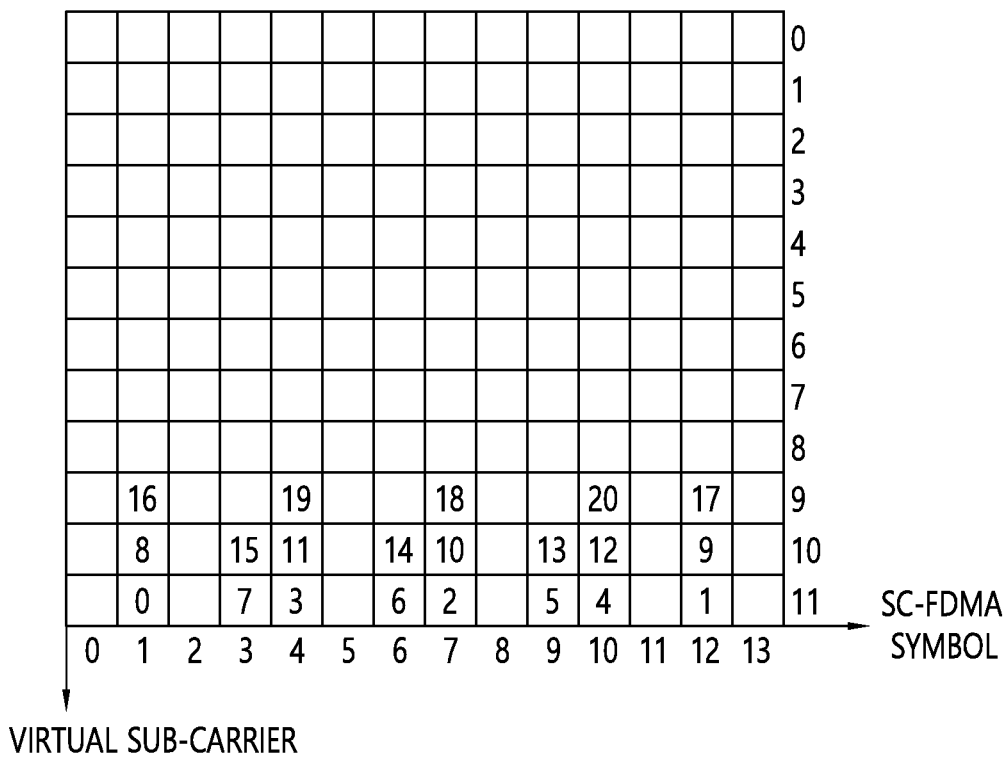

FIG. 24 illustrates an example of mapping control(/scheduling) information related "coded symbol(s)" according to (rule #1-1) and (rule #1-2) in the cases of FIG. 9 and/or FIG. 11. Here, it is assumed that the number of control(/scheduling) information related "coded symbol(s)" (to be piggybacked) is "21", for example. Here, symbol positions (/resource sizes(/sizes)) to which (control(/scheduling) information related) "coded symbol(s)" are mapped may be interpreted as "symbols #3/4/6/7/9/10", for example. Here, control(/scheduling) information related "coded symbol(s)" are allocated while "symbol(/time) index" is increased from a minimum value (e.g., "symbol #3") of "symbol(/time) indexes" and a maximum value of "subcarrier(/frequency) indexes", and when the "symbol(/time) index" reaches a maximum value (e.g., "symbol #10"), "subcarrier(/frequency) index" is reduced one and then "symbol(/time) index" is increased again from the minimum value of "symbol(/time) indexes" (in consideration of only symbol(s)(/resource positions(/sizes)) to which the "coded symbol(s)" are mapped), for example.

FIGS. 25 to 34 illustrate mapping of control(/scheduling) information related "coded symbol(s)" according to (rule #1-1) and (rule #1-3) in the cases of FIG. 9 and/or FIG. 11.

More specifically, FIGS. 25 to 34 illustrate examples of mapping control(/scheduling) information related "coded symbol(s)" according to (rule #1-1) and (rule #1-3) in the cases of FIG. 9 and/or FIG. 11. Here, it is assumed that the number of control(/scheduling) information related "coded symbol(s)" (to be piggybacked) is "21", for example. Here, symbol positions (/resource sizes(/sizes)) to which (control (/scheduling) information related) "coded symbol(s)" are mapped may be interpreted as "symbols #1/3/4/6/7/9/10/ 12", for example. As another example, control(/scheduling) information related "coded symbol(s)" mapped to "symbol #9" and "symbol #10" may be changed such that they are mapped to "symbol #10" and "symbol #9" in FIGS. 25, 26 and 27. As a specific example, "coded symbols #6/14" mapped to "symbol #9" and "coded symbols #4/12/20" mapped to "symbol #10" may be changed such that the former is mapped to "symbol #10" and the latter is mapped to "symbol #9" in the case of FIG. 25.

Figure 35:
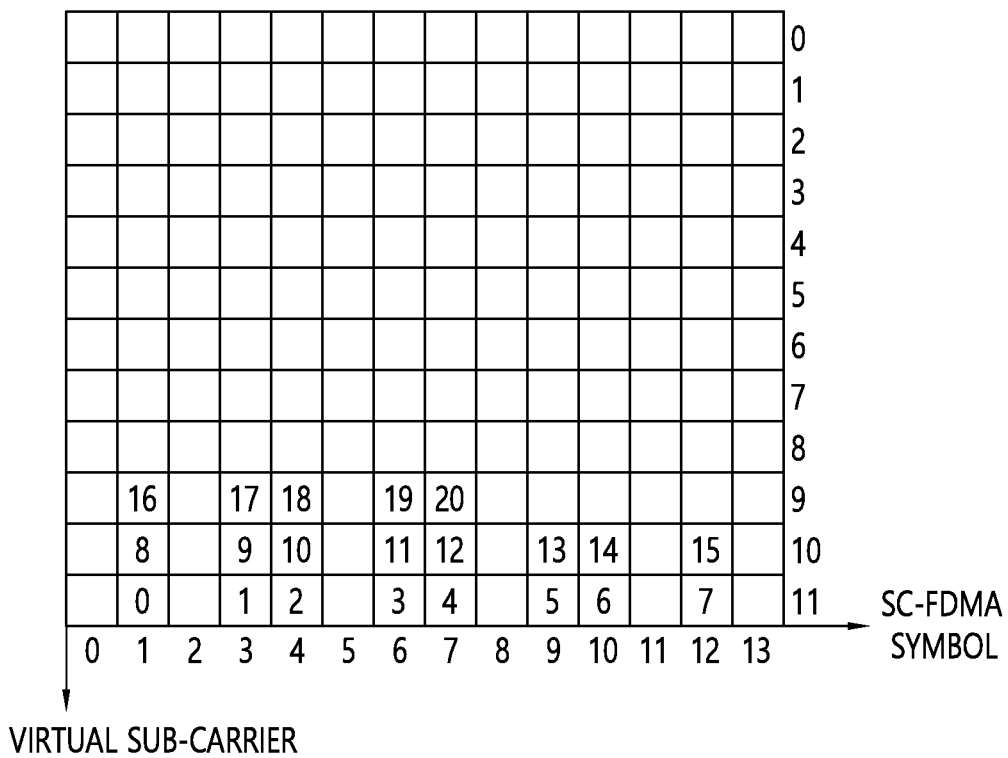
FIG. 35 illustrates mapping of control(/scheduling) information related "coded symbol(s)" according to (rule #1-1) in the cases of FIG. 9 and/or FIG. 11.
Figure 36:
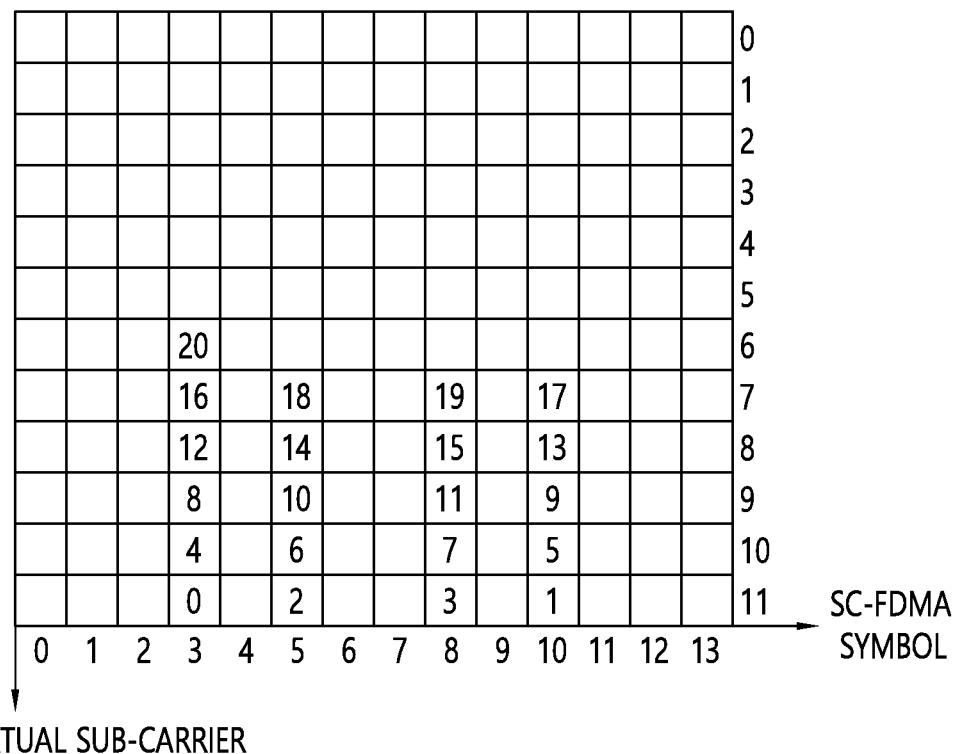
FIGS. 36 to 39 illustrate mapping of control(/scheduling) information related "coded symbol(s)" according to (rule #1-1), (rule #1-2) and (rule #1-3) in the case of FIG. 10.
Figure 37:
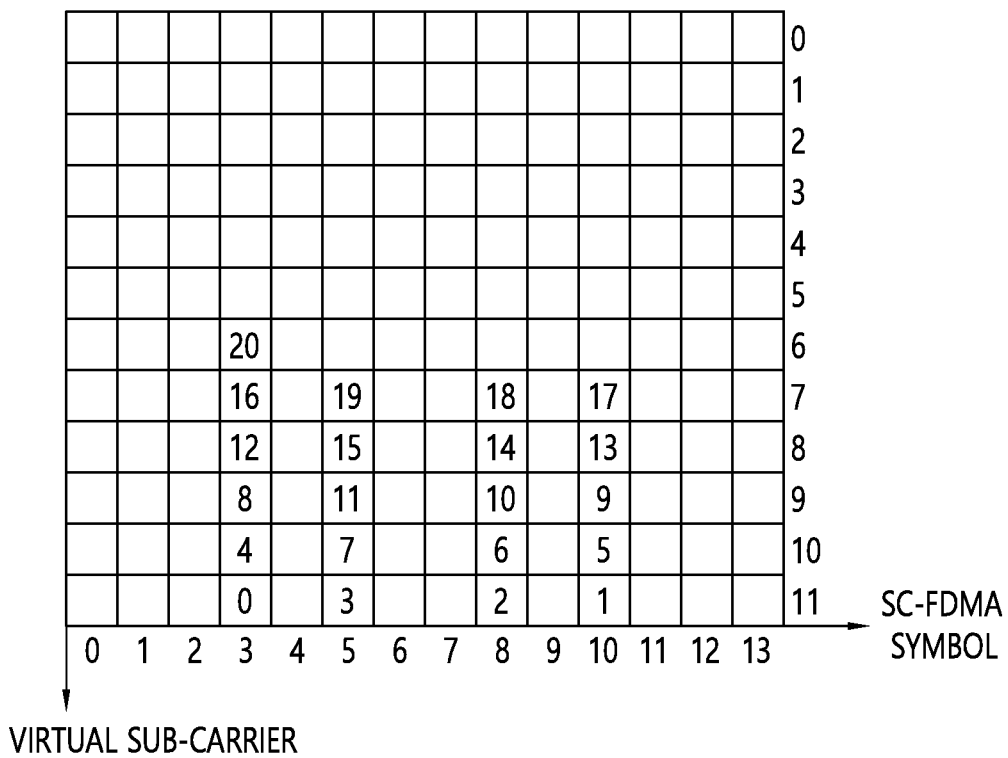
Figure 38:
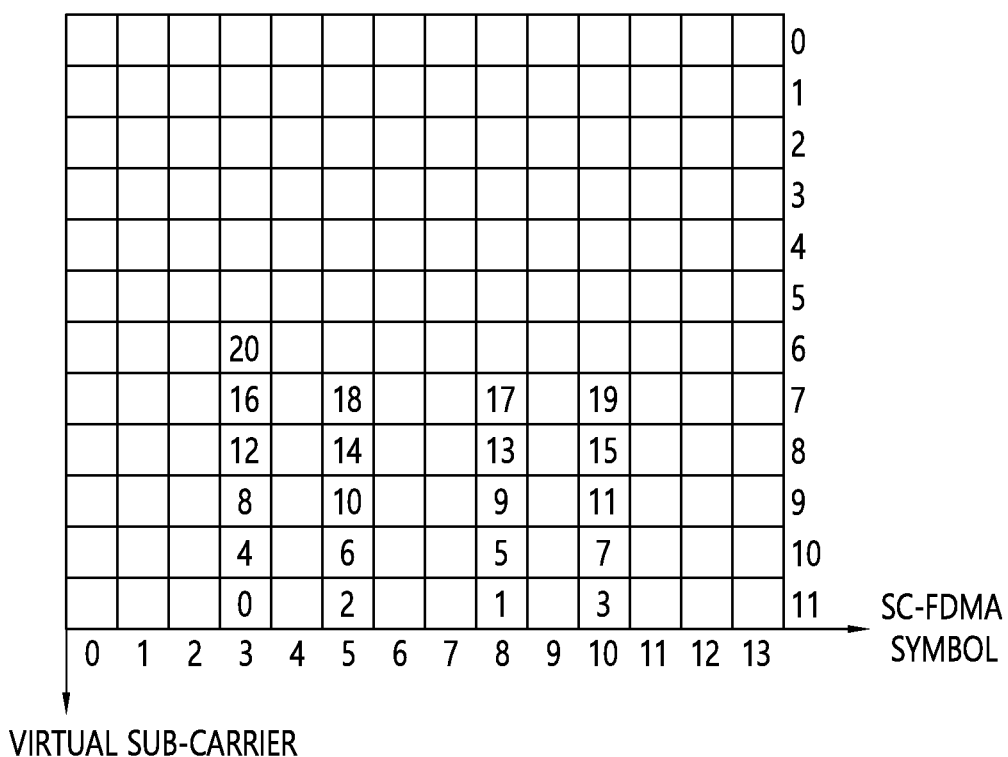
Figure 39:
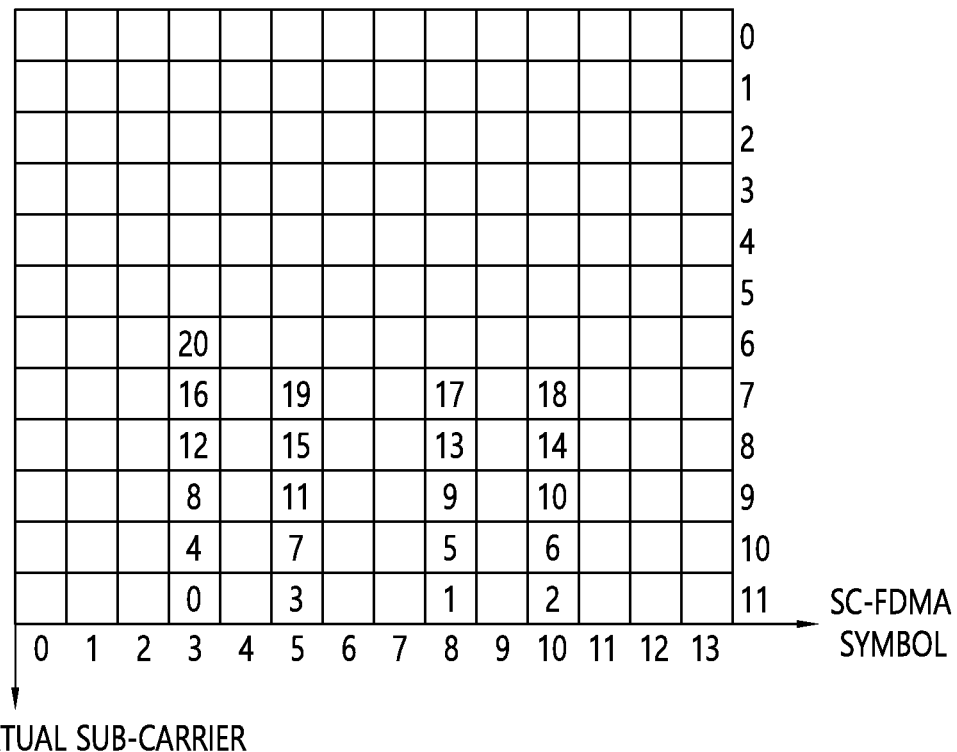

FIG. 35 illustrates mapping of control(/scheduling) information related "coded symbol(s)" according to (rule #1-1) in the cases of FIG. 9 and/or FIG. 11.

More specifically, FIG. 35 illustrates an example of mapping control(/scheduling) information related "coded symbol(s)" according to (rule #1-1) in the cases of FIG. 9 and/or FIG. 11. Here, it is assumed that the number of control(/scheduling) information related "coded symbol(s)" (to be piggybacked) is "21", for example. Here, symbol positions (/resource sizes(/sizes)) to which (control(/scheduling) information related) "coded symbol(s)" are mapped may be interpreted as "symbols #1/3/4/6/7/9/10/12", for example. Here, control(/scheduling) information related "coded symbol(s)" are allocated while "symbol(/time) index" is increased from a minimum value (e.g., "symbol #1") of "symbol(/time) indexes" and a maximum value of "subcarrier(/frequency) indexes", and when the "symbol(/ time) index" reaches a maximum value (e.g., "symbol #12"), "subcarrier(/frequency) index" is reduced one and then "symbol(/time) index" is increased again from the minimum value of "symbol(/time) indexes" (in consideration of only symbol(s)(/resource positions(/sizes)) to which the "coded symbol(s)" are mapped), for example.

FIGS. 36 to 39 illustrate mapping of control(/scheduling) information related "coded symbol(s)" according to (rule #1-1), (rule #1-2) and (rule #1-3) in the case of FIG. 10.

More specifically, FIGS. 36 to 39 illustrate examples of mapping control(/scheduling) information related "coded symbol(s)" according to (rule #1-1), (rule #1-2) and (rule #1-3) in the case of FIG. 10. Here, it is assumed that the number of control(/scheduling) information related "coded symbol(s)" (to be piggybacked) is "21", for example. Here, symbol positions (/resource sizes(/sizes) to which (control (/scheduling) information related) "coded symbol(s)" are mapped may be interpreted as "symbols #3/5/8/10", for example.

Figure 40:
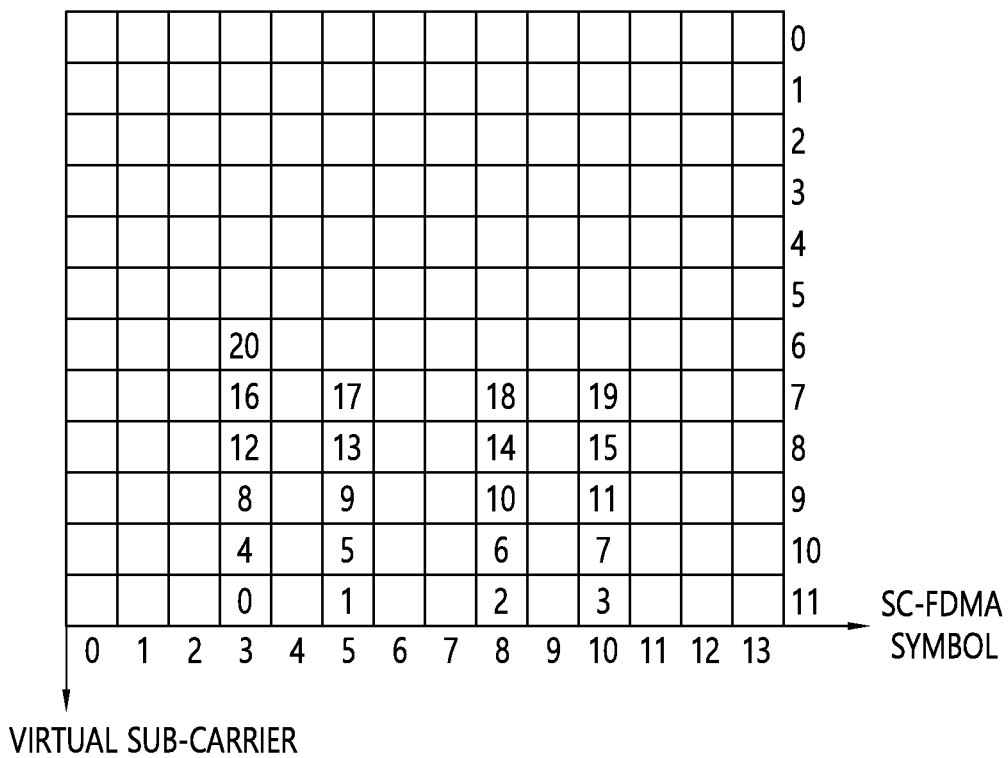
FIG. 40 illustrates mapping of control(/scheduling) information related "coded symbol(s)" according to (rule #1-1) and (rule #1-2) in the case of FIG. 10.
Figure 41:
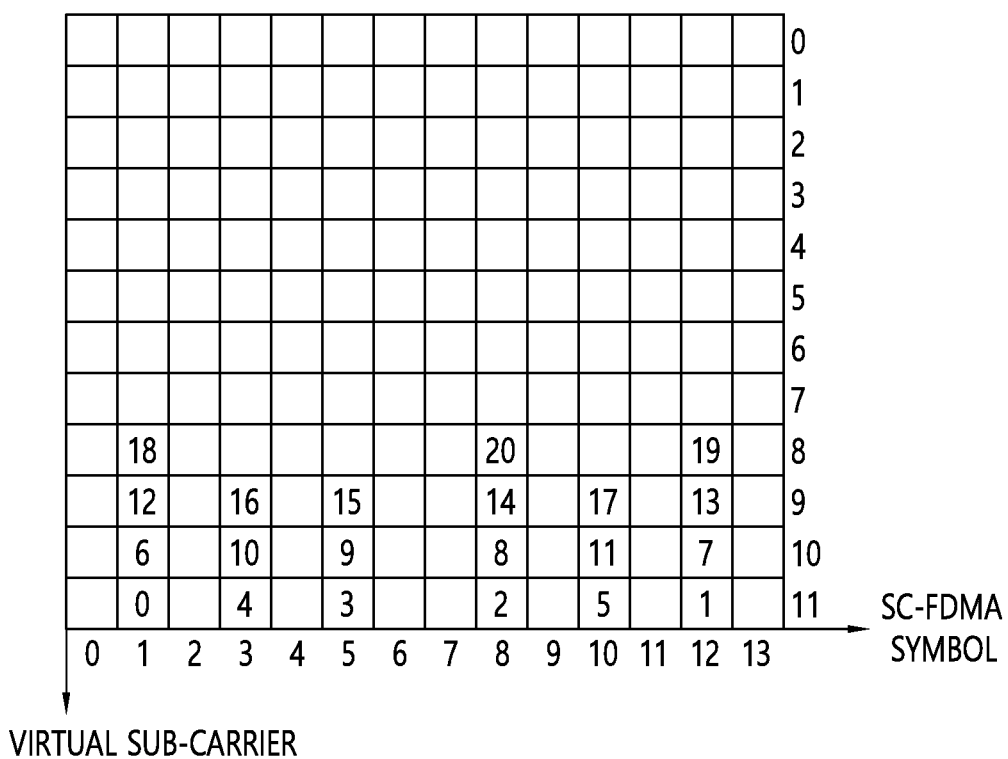
FIGS. 41 to 49 illustrate mapping of control(/scheduling) information related "coded symbol(s)" according to (rule #1-1) and (rule #1-3) in the case of FIG. 10.
Figure 42:
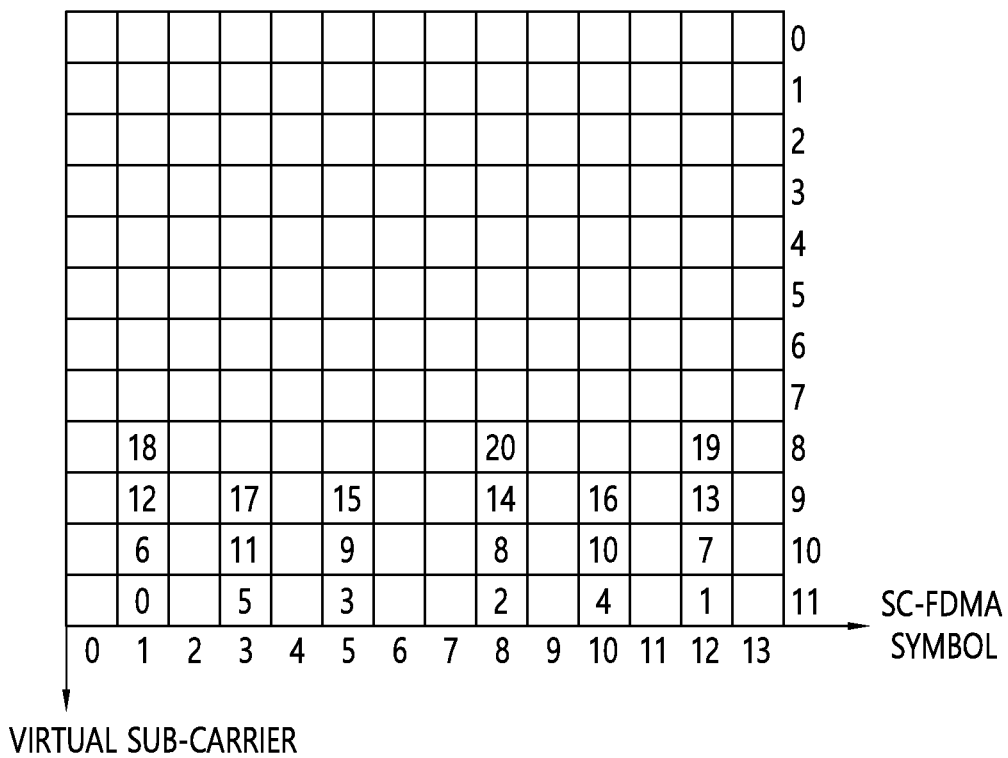
Figure 43:
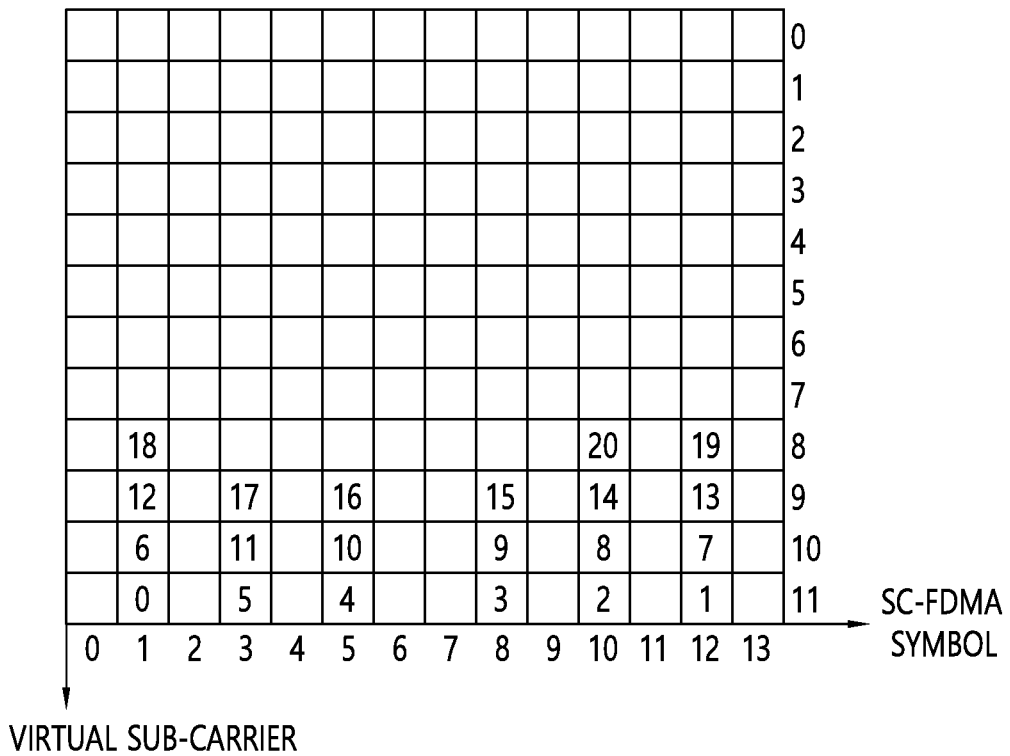
Figure 44:
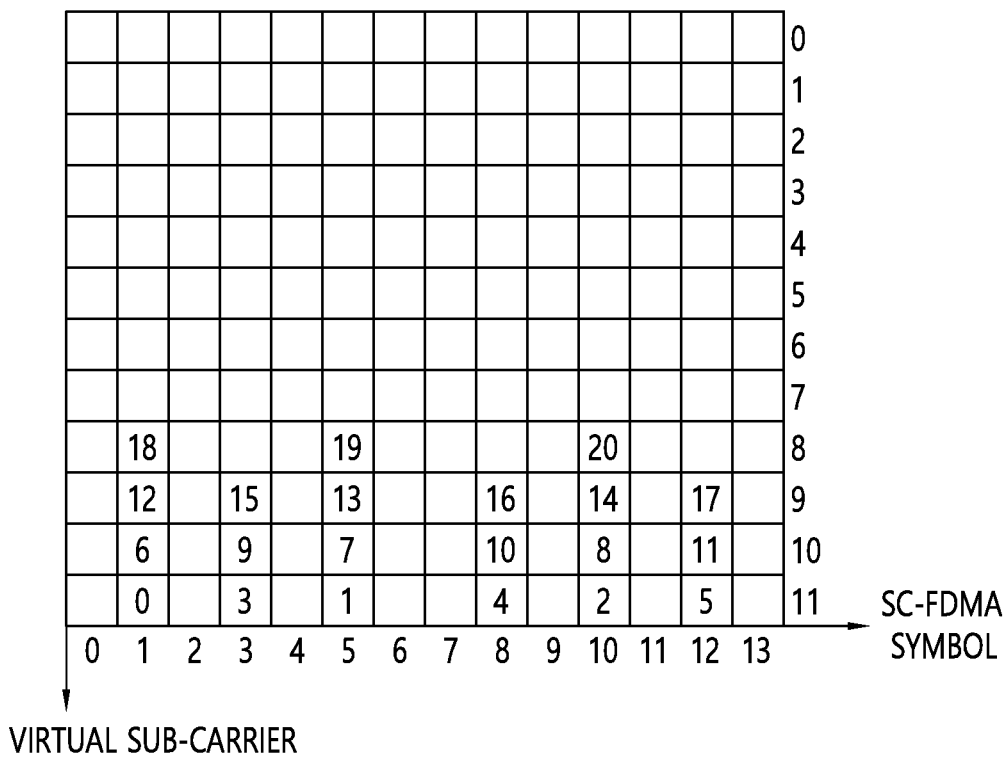
Figure 45:
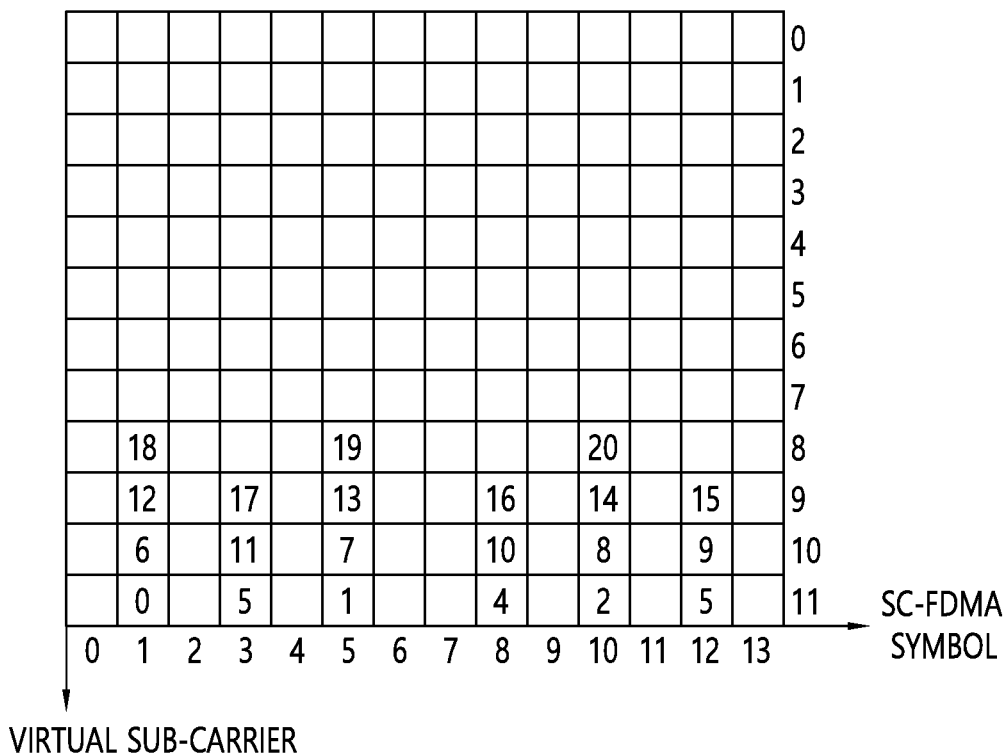
Figure 46:
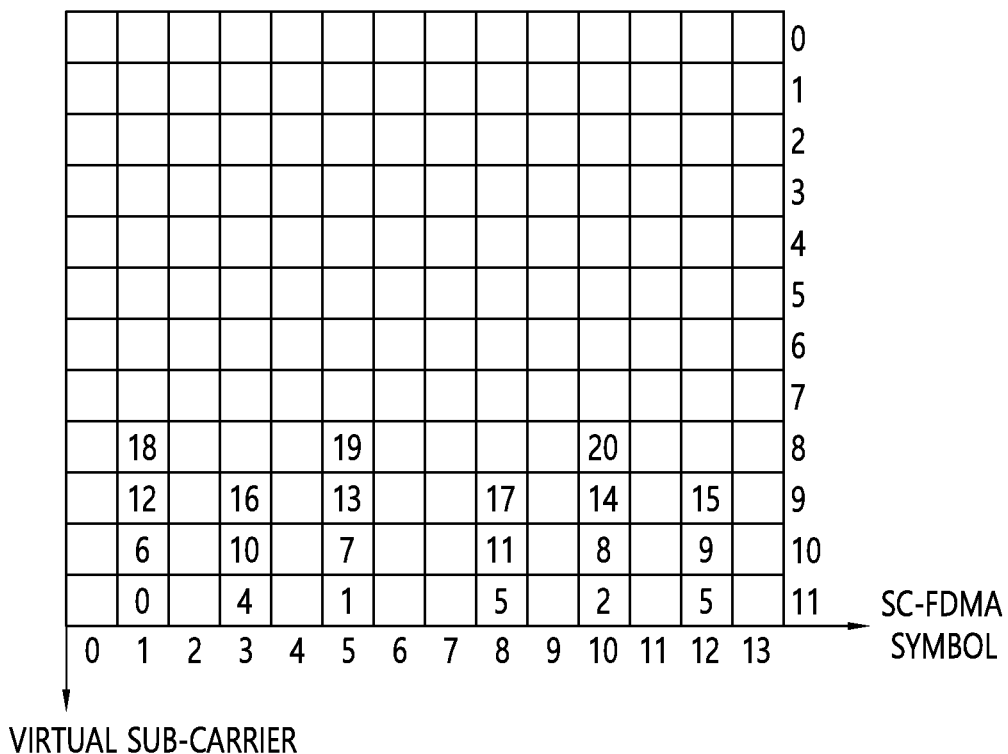
Figure 47:
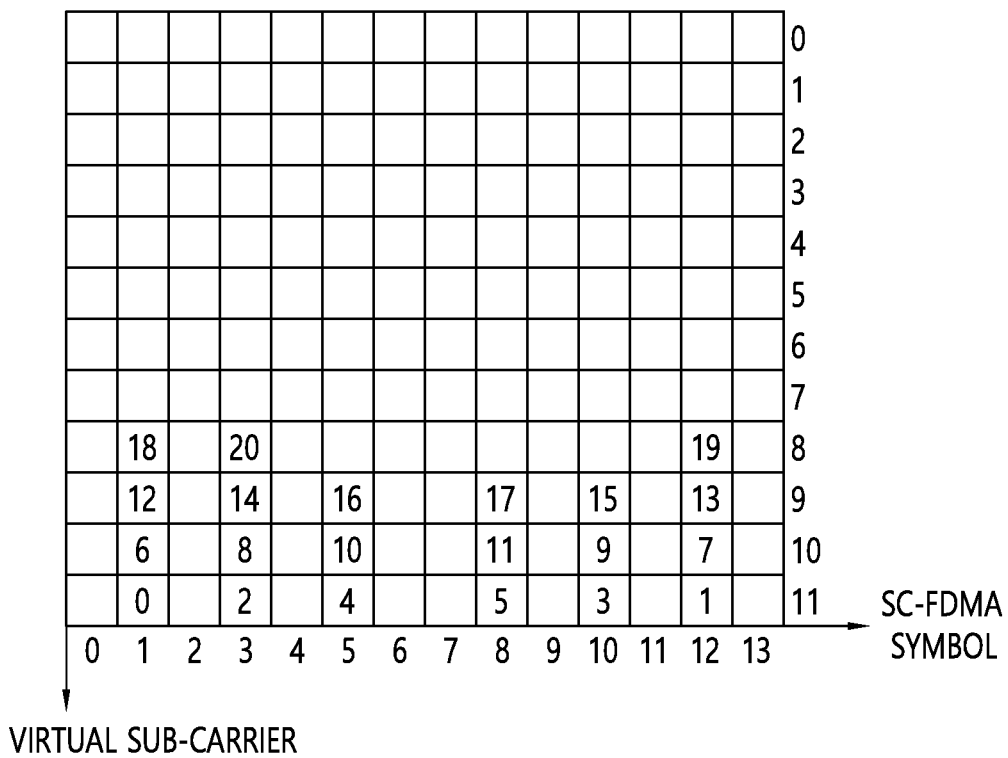
Figure 48:
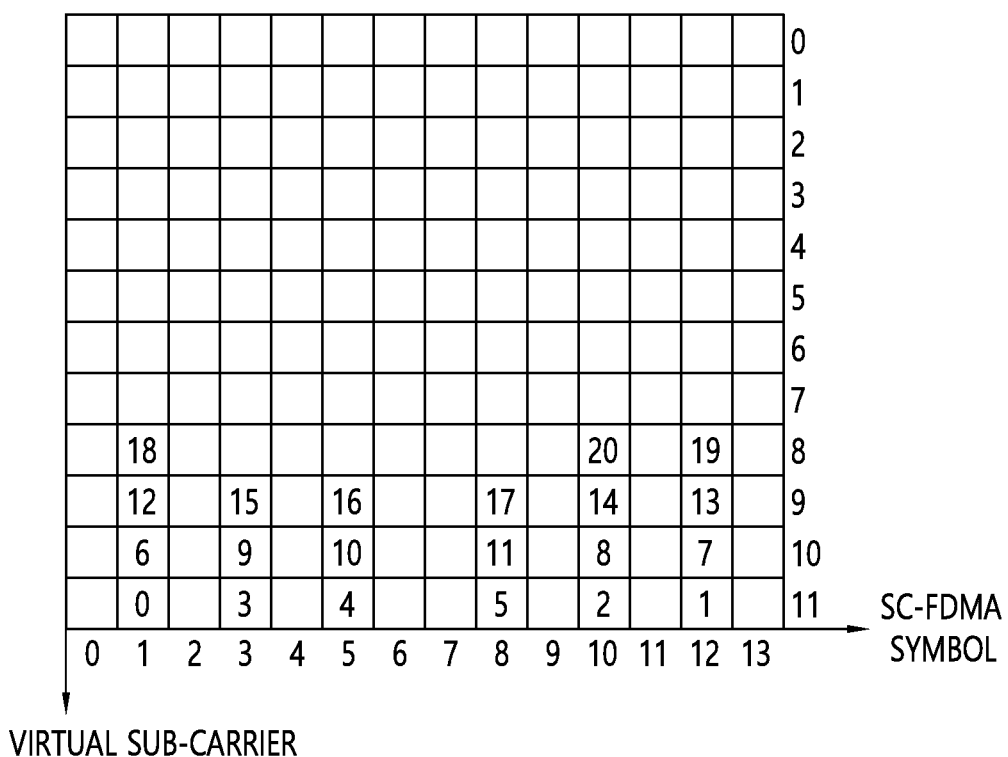
Figure 49:
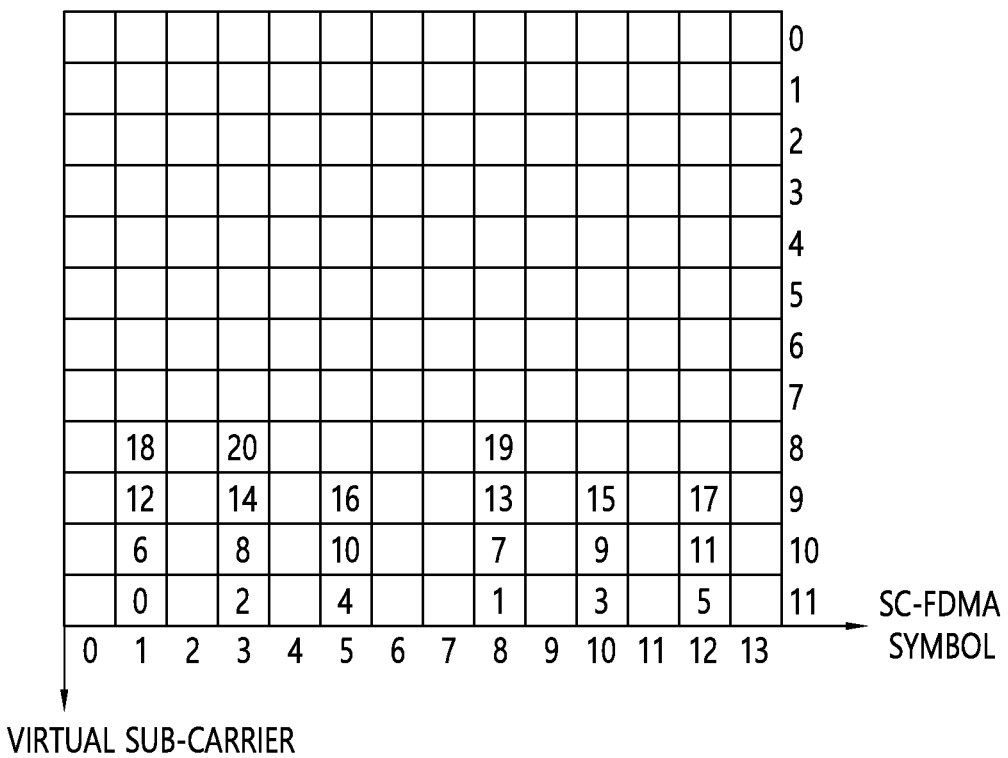

FIG. 40 illustrates mapping of control(/scheduling) information related "coded symbol(s)" according to (rule #1-1) and (rule #1-2) in the case of FIG. 10.

More specifically, FIG. 40 illustrates an example of mapping control(/scheduling) information related "coded symbol(s)" according to (rule #1-1) and (rule #1-2) in the case of FIG. 10. Here, it is assumed that the number of control(/scheduling) information related "coded symbol(s)" (to be piggybacked) is "21", for example. Here, symbol positions (/resource sizes(/sizes) to which (control(/scheduling) information related) "coded symbol(s)" are mapped may be interpreted as "symbols #3/5/8/10", for example. Here, control(/scheduling) information related "coded symbol(s)" are allocated while "symbol(/time) index" is increased from a minimum value (e.g., "symbol #3") of "symbol(/time) indexes" and a maximum value of "subcarrier(/frequency) indexes", and when the "symbol(/time) index" reaches a maximum value (e.g., "symbol #10"), "subcarrier(/frequency) index" is reduced one and then "symbol(/time) index" is increased again from the minimum value of "symbol(/time) indexes" (in consideration of only symbol(s)(/resource positions(/sizes)) to which the "coded symbol(s)" are mapped), for example.

FIGS. 41 to 49 illustrate mapping of control(/scheduling) information related "coded symbol(s)" according to (rule #1-1) and (rule #1-3) in the case of FIG. 10.

More specifically, FIGS. 41 to 49 illustrate examples of mapping control(/scheduling) information related "coded symbol(s)" according to (rule #1-1) and (rule #1-3) in the case of FIG. 10. Here, it is assumed that the number of control(/scheduling) information related "coded symbol(s)" (to be piggybacked) is "21", for example. Here, symbol positions (/resource sizes(/sizes) to which (control(/scheduling) information related) "coded symbol(s)" are mapped may be interpreted as "symbols #1/3/5/8/10/12", for example. As another example, control(/scheduling) information related "coded symbol(s)" mapped to "symbol #5" and "symbol #8" may be changed such that they are mapped to "symbol #8" and "symbol #5" in FIGS. 41 and 42. As a specific example, "coded symbols #3/9/15" mapped to "symbol #5" and "coded symbols #2/8/14/20" mapped to "symbol #8" may be changed such that the former is mapped to "symbol #8" and the latter is mapped to "symbol #5" in the case of FIG. 41.

Figure 50:
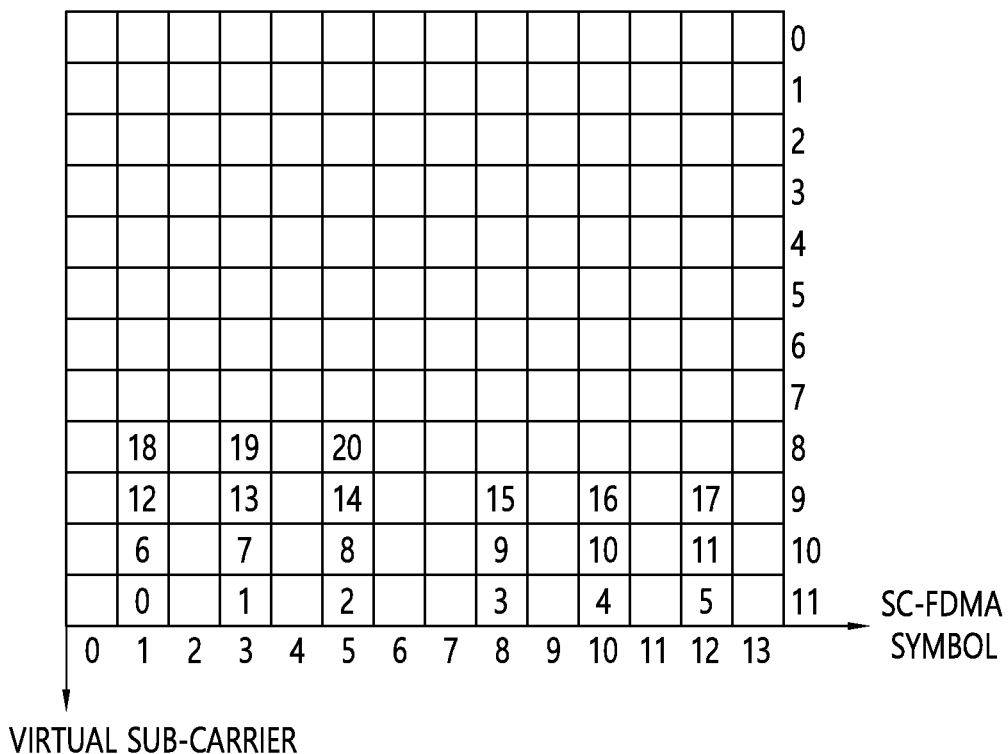
FIG. 50 illustrates mapping of control(/scheduling) information related "coded symbol(s)" according to (rule #1-1) in the case of FIG. 10.

FIG. 50 illustrates mapping of control(/scheduling) information related "coded symbol(s)" according to (rule #1-1) in the case of FIG. 10.

More specifically, FIG. 50 illustrates an example of mapping control(/scheduling) information related "coded symbol(s)" according to (rule #1-1) in the case of FIG. 10. Here, it is assumed that the number of control(/scheduling) information related "coded symbol(s)" (to be piggybacked) is "21", for example. Here, symbol positions (/resource sizes(/sizes) to which (control(/scheduling) information related) "coded symbol(s)" are mapped may be interpreted as "symbols #1/3/5/8/10/12", for example. Here, control(/scheduling) information related "coded symbol(s)" are allocated while "symbol(/time) index" is increased from a minimum value (e.g., "symbol #1") of "symbol(/time) indexes" and a maximum value of "subcarrier(/frequency) indexes", and when the "symbol(/time) index" reaches a maximum value (e.g., "symbol #12"), "subcarrier(/frequency) index" is reduced one and then "symbol(/time) index" is increased again from the minimum value of "symbol(/time) indexes" (in consideration of only symbol(s)(/resource positions(/sizes)) to which the "coded symbol(s)" are mapped), for example.

FIGS. 51 to 54 illustrate examples of control(/scheduling) information related "coded symbol(s)".

Figure 51:
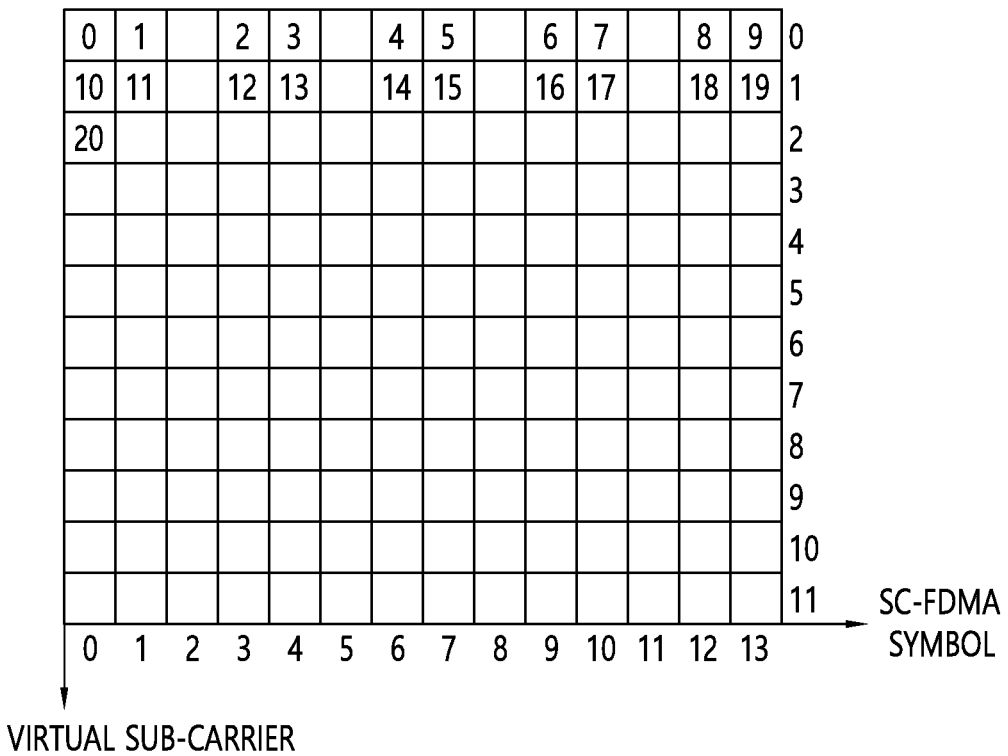
FIGS. 51 to 54 illustrate examples of control(/scheduling) information related "coded symbol(s)".
Figure 52:
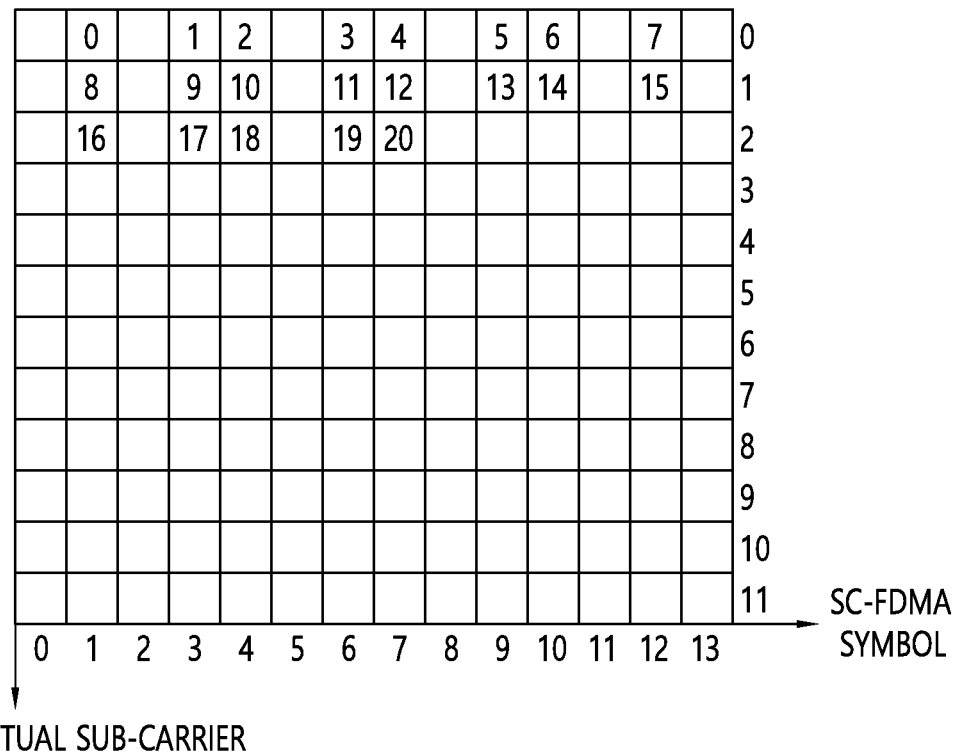
Figure 53:
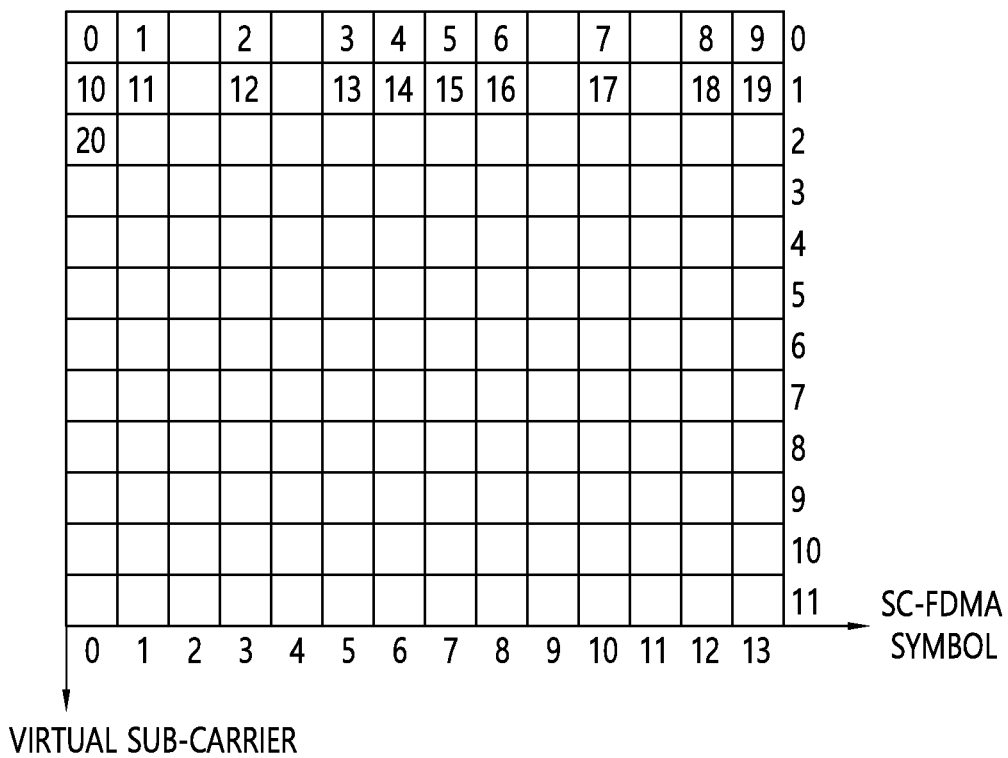
Figure 54:
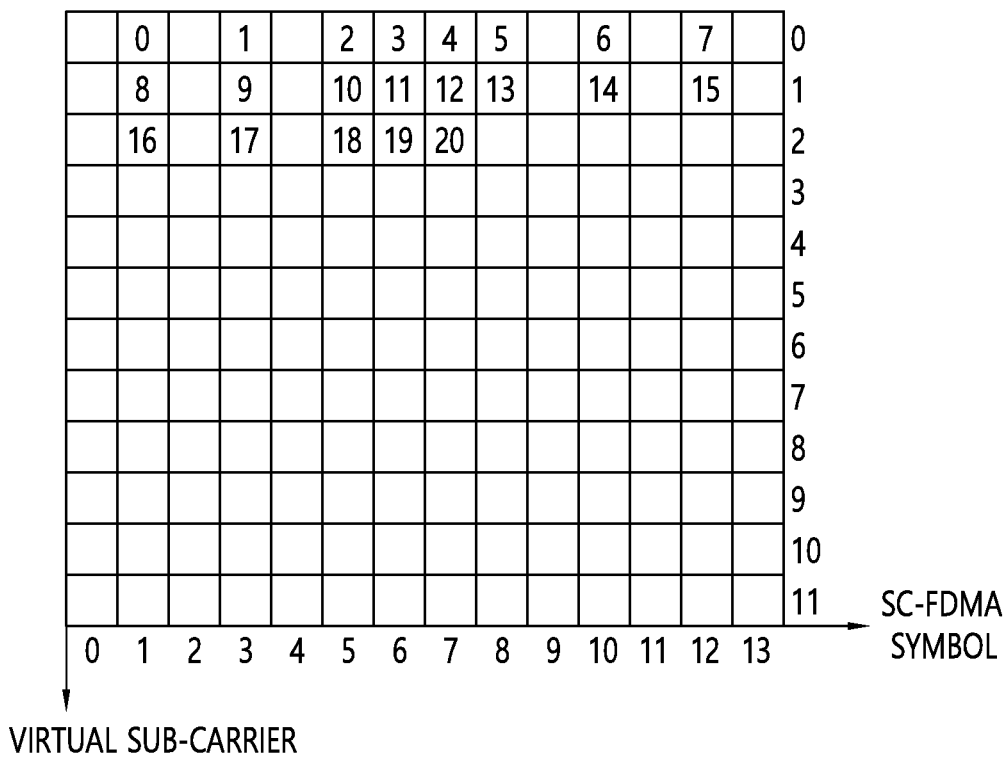

More specifically, FIG. 51 and/or FIG. 52 and FIG. 53 and/or FIG. 54 correspond to the cases of FIG. 9 and/or FIG. 11 and FIG. 10. Here, it is assumed that the number of control(/scheduling) information related "coded symbol(s)" (to be piggybacked) is "21", for example. Here, symbol positions (/resource sizes(/sizes) to which (control(/scheduling) information related) "coded symbol(s)" are mapped may be interpreted as "symbols #0/1/3/4/6/7/9/10/12/13", "symbols #1/3/4/6/7/9/10/12", "symbols #0/1/3/5/6/7/8/10/12/13" and "symbols #1/3/5/6/7/8/10/12", for example. Here, control(/scheduling) information related "coded symbol(s)" are allocated while "symbol(/time) index" is increased from a minimum value (e.g., "symbol #1" (FIG. 52)) of "symbol(/time) indexes" and a minimum value of "subcarrier(/frequency) indexes", and when the "symbol(/time) index" reaches a maximum value (e.g., "symbol #12" (FIG. 52))), "subcarrier(/frequency) index" is increased one and then "symbol(/time) index" is increased again from the minimum value of "symbol(/time) indexes" (in consideration of only symbol(s)(/resource positions(/sizes)) to which the "coded symbol(s)" are mapped), for example. Here, when the first symbol "symbol #0" and/or the last symbol "symbol #13" are punctured due to "AGC problem mitigation" and/or "prevention of overlap with (following) WAN UL TX (SF)", for example, FIG. 52 and/or FIG. 54 can guarantee more advanced "control(/scheduling) information transmission/reception performance" than FIG. 51 and/or FIG. 53 (because the number of control(/scheduling) information related "coded symbol(s)" lost due to puncturing is relatively small). Here, the (control(/scheduling) information related) "coded symbol(s)" may be configured to be mapped prior to "data" (in a form in which "data" is "rate-matched") or to be mapped by "puncturing" preferentially(/first) mapped "data", for example.

FIGS. 55 to 58 illustrate examples of mapping control(/scheduling) information related "coded symbol(s)".

Figure 55:
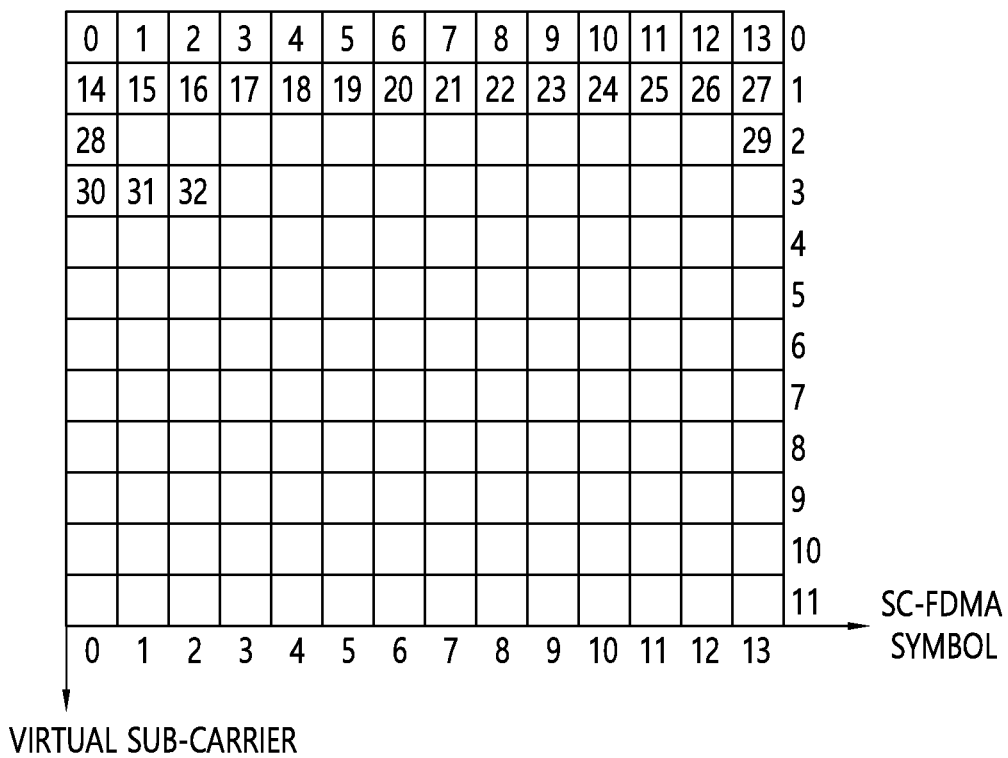
FIGS. 55 to 58 illustrate examples of mapping control(/scheduling) information related "coded symbol(s)".
Figure 56:
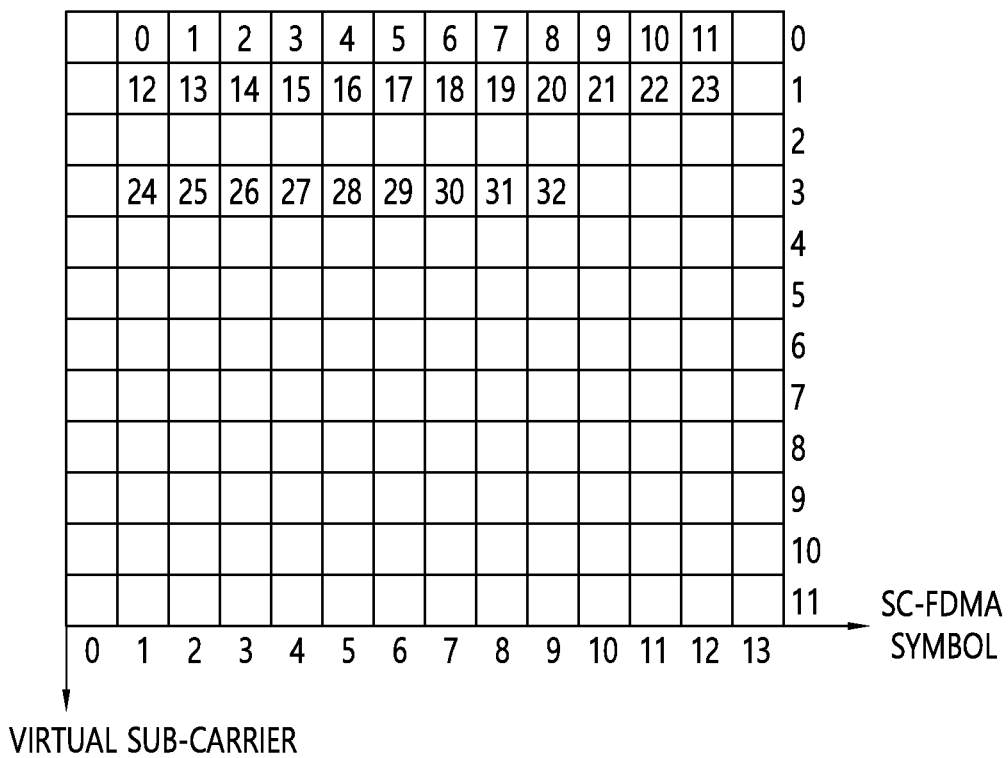
Figure 57:
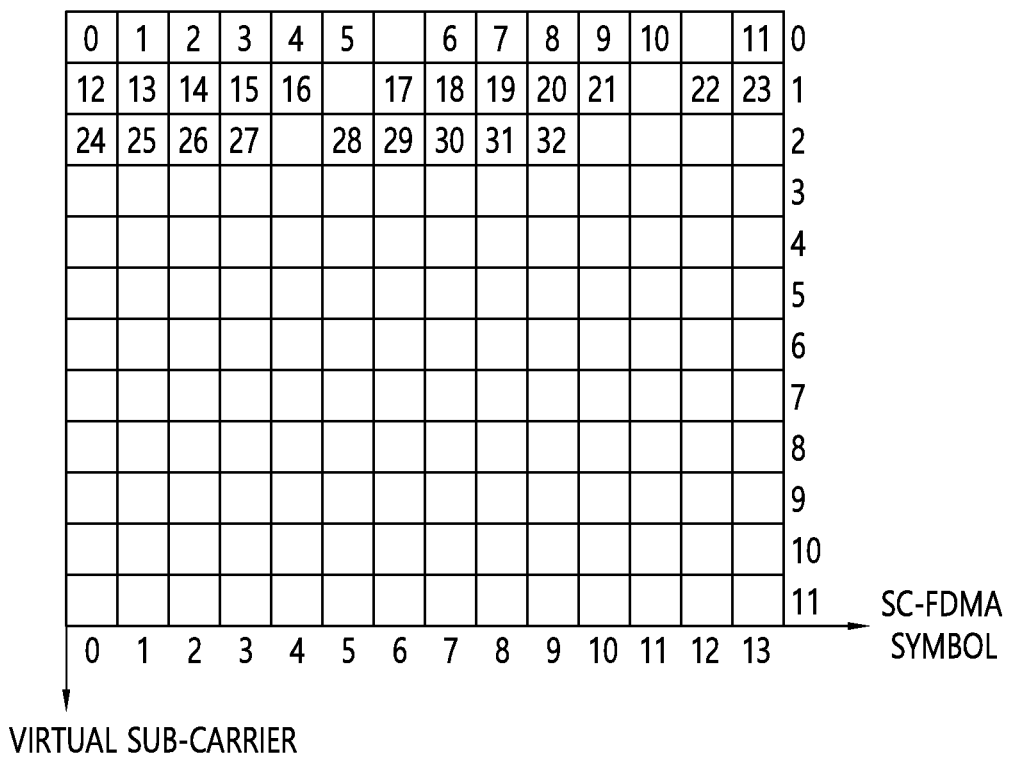
Figure 58:
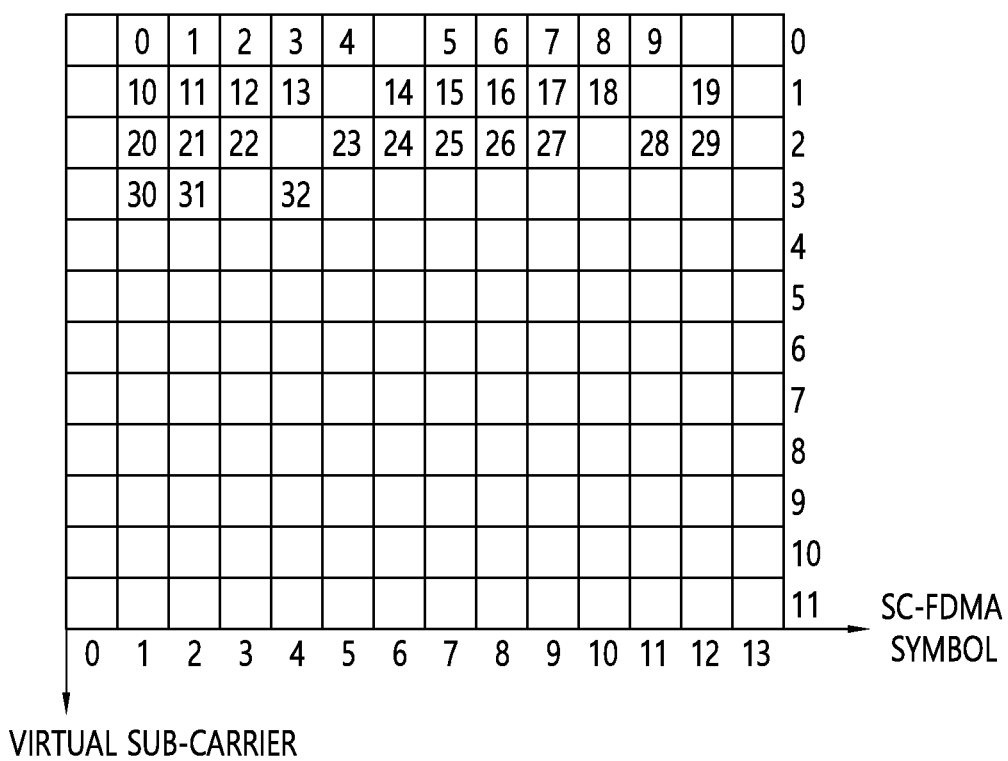
Figure 59:
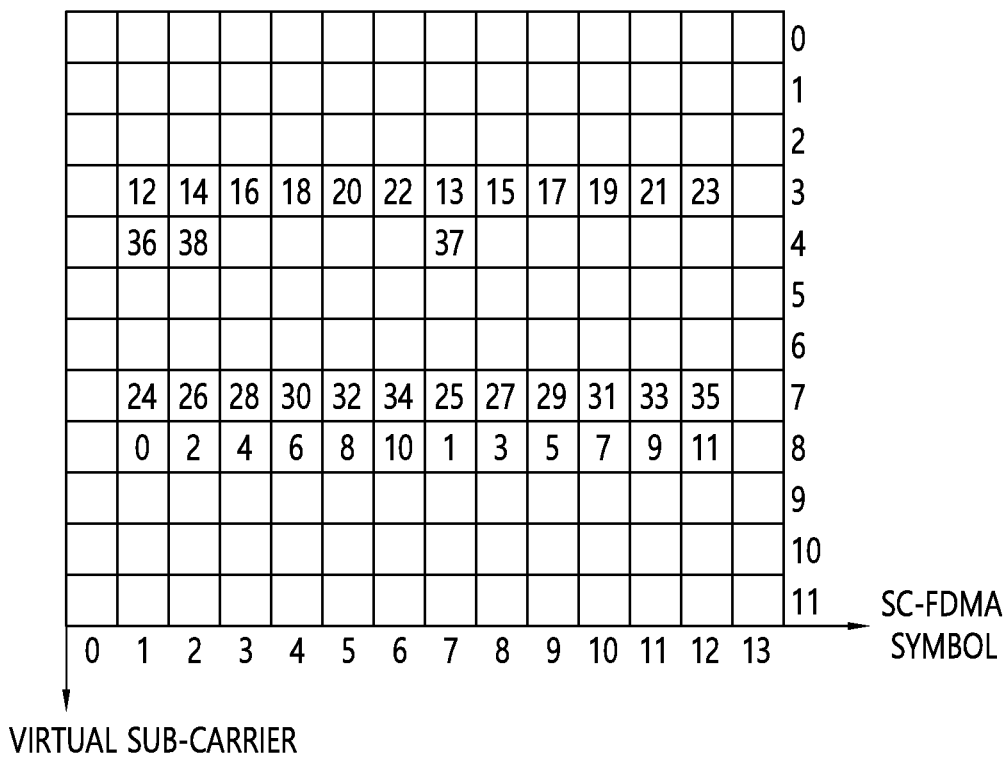
FIGS. 59 to 73 illustrate mapping of control(/scheduling) information related "coded symbol(s)" according to (rule #1-1) and (rule #1-3)(/(rule #1-2)) in the case of FIG. 12.
Figure 60:
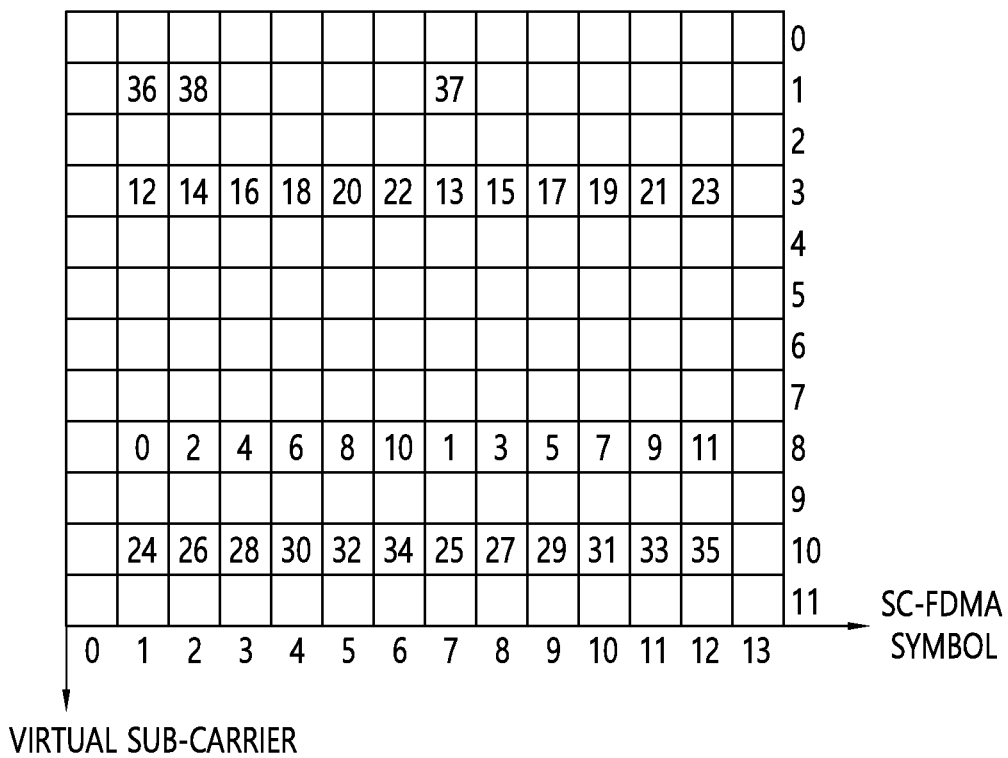
Figure 61:
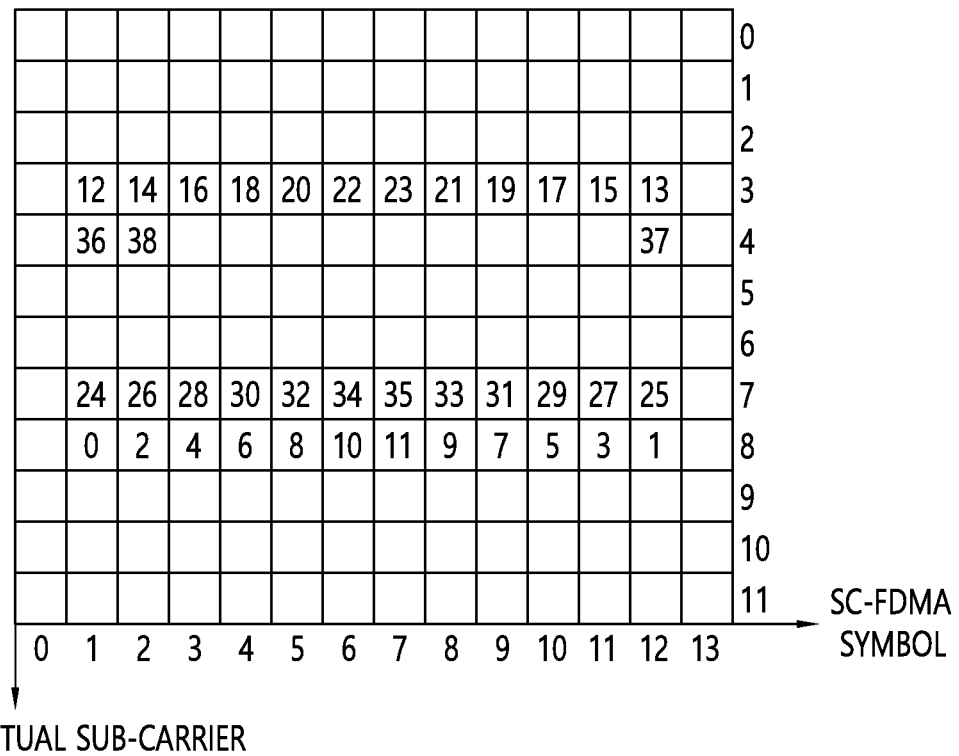
Figure 62:
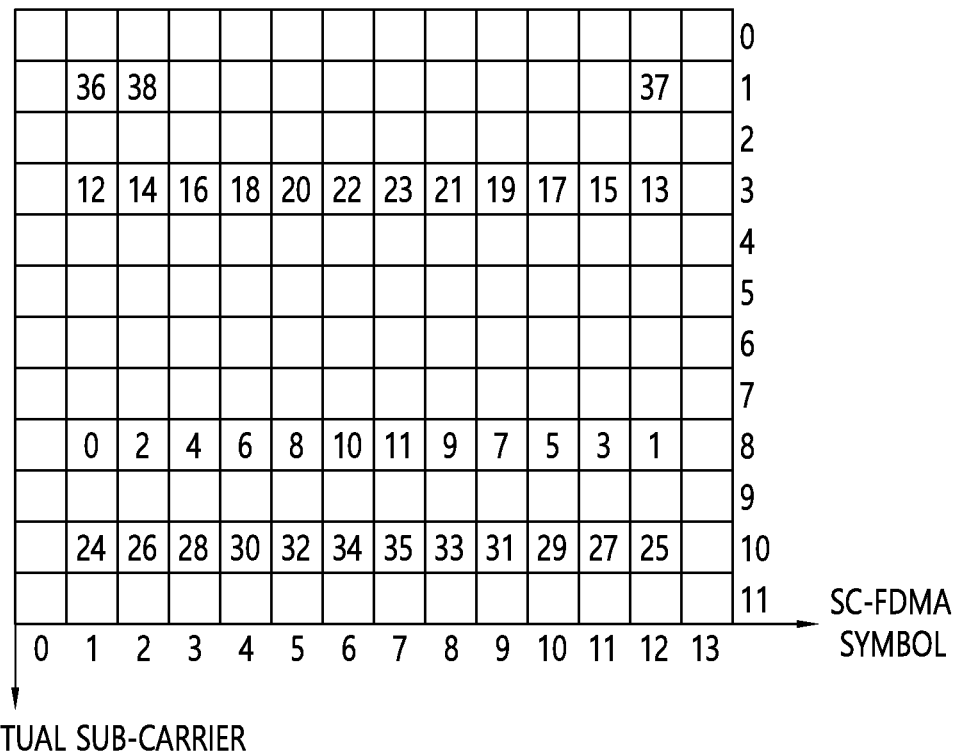
Figure 63:
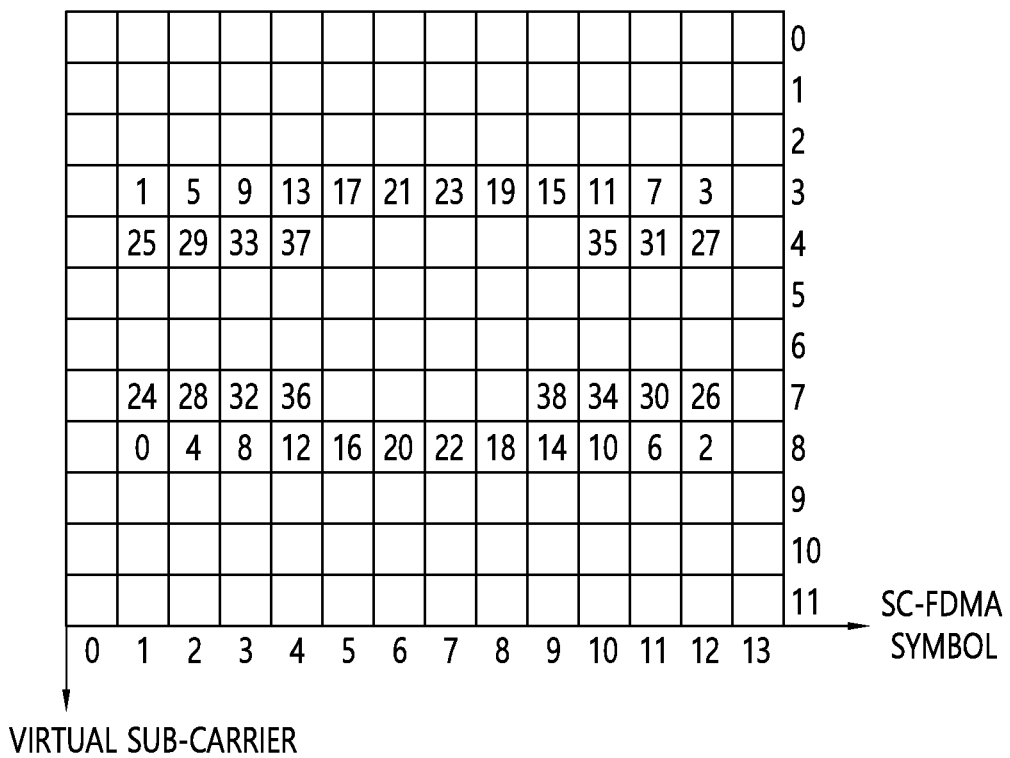
Figure 64:
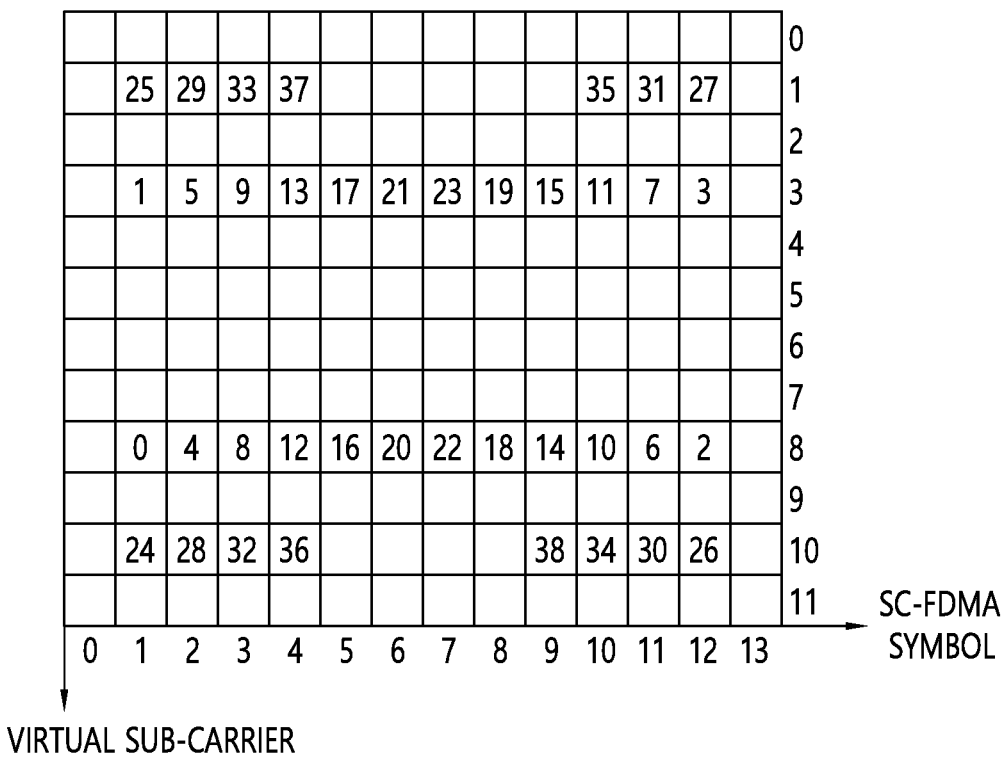
Figure 65:
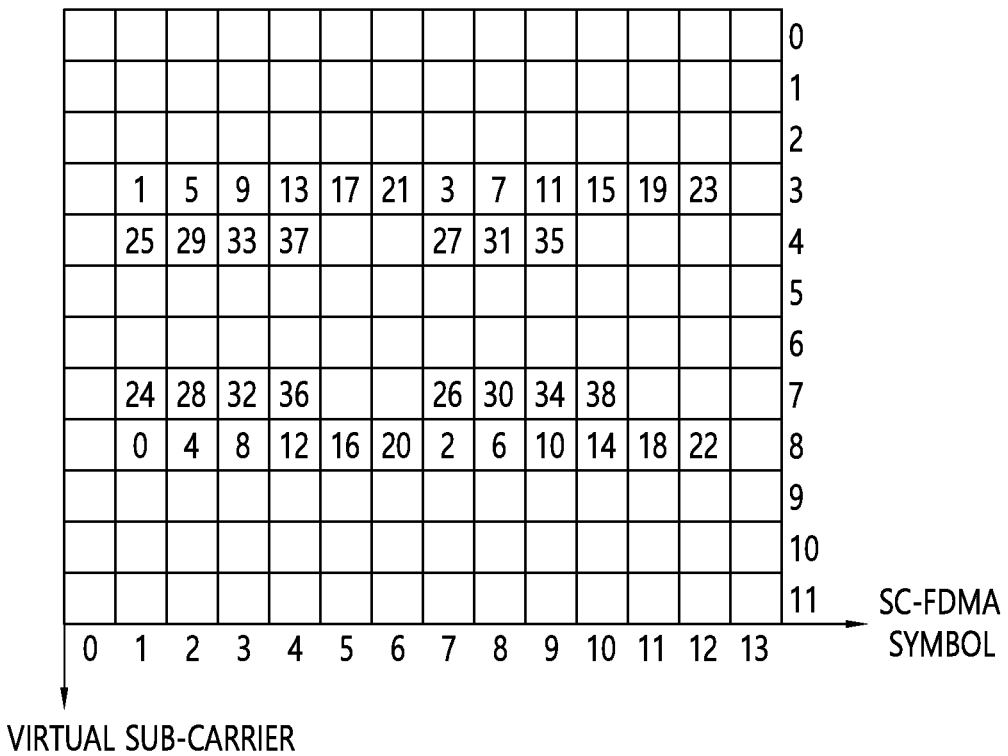
Figure 66:
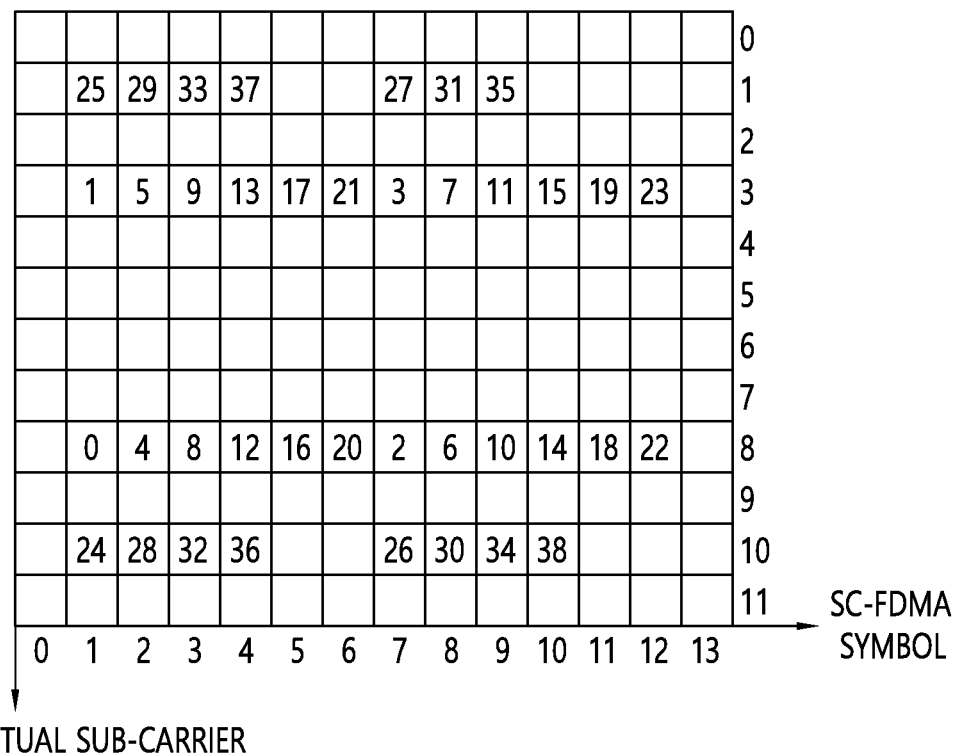
Figure 67:
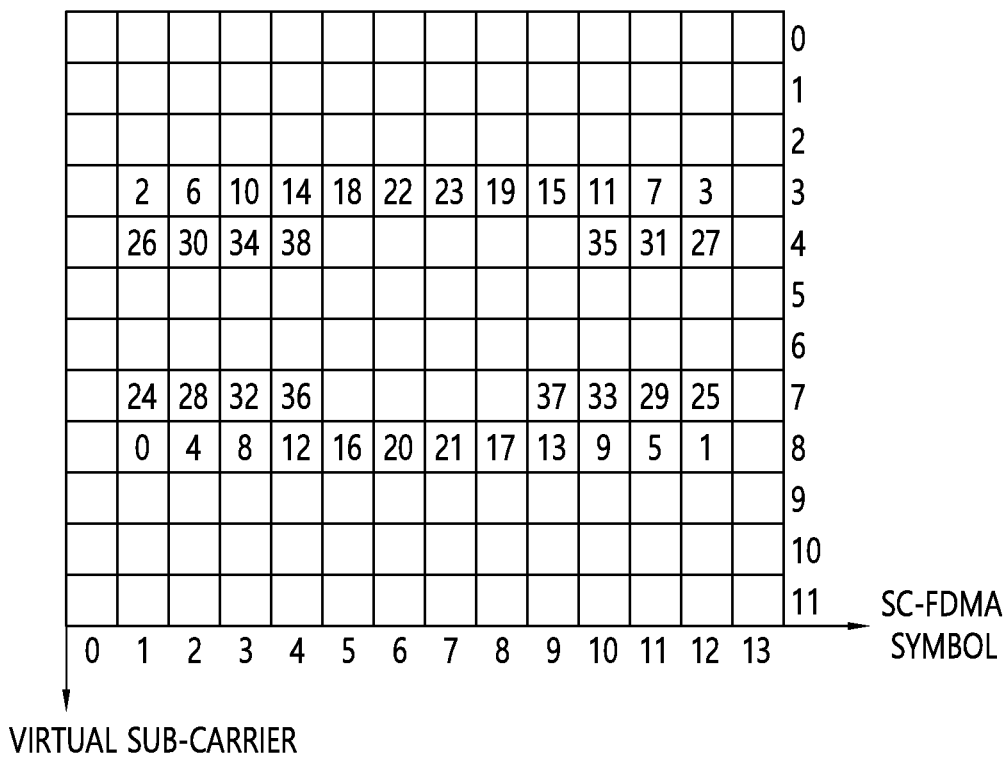
Figure 68:
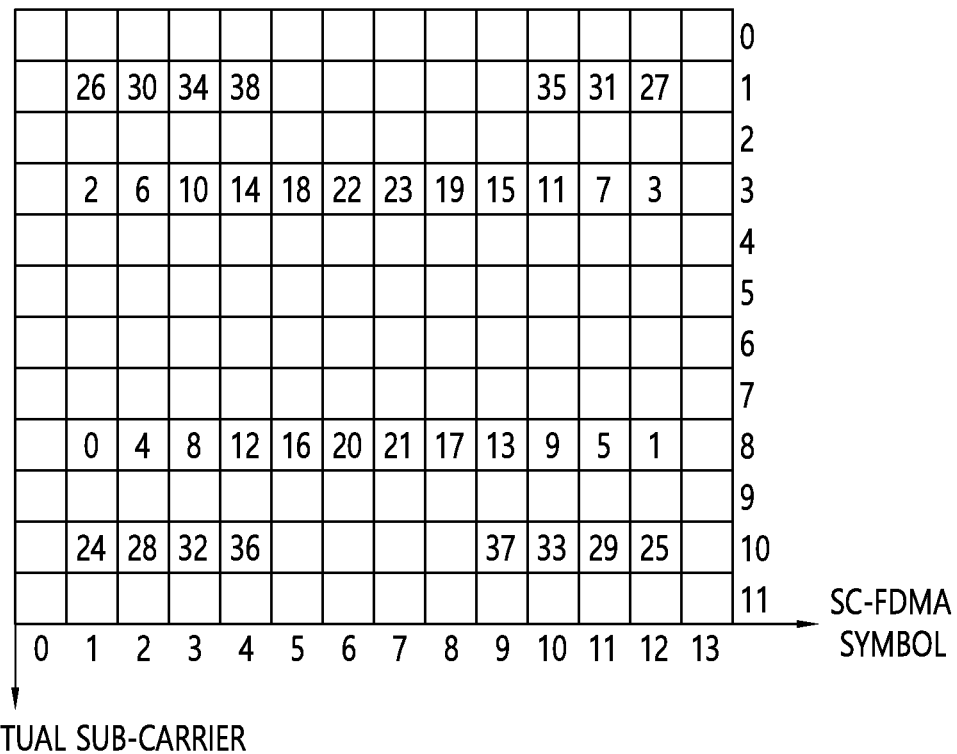
Figure 69:
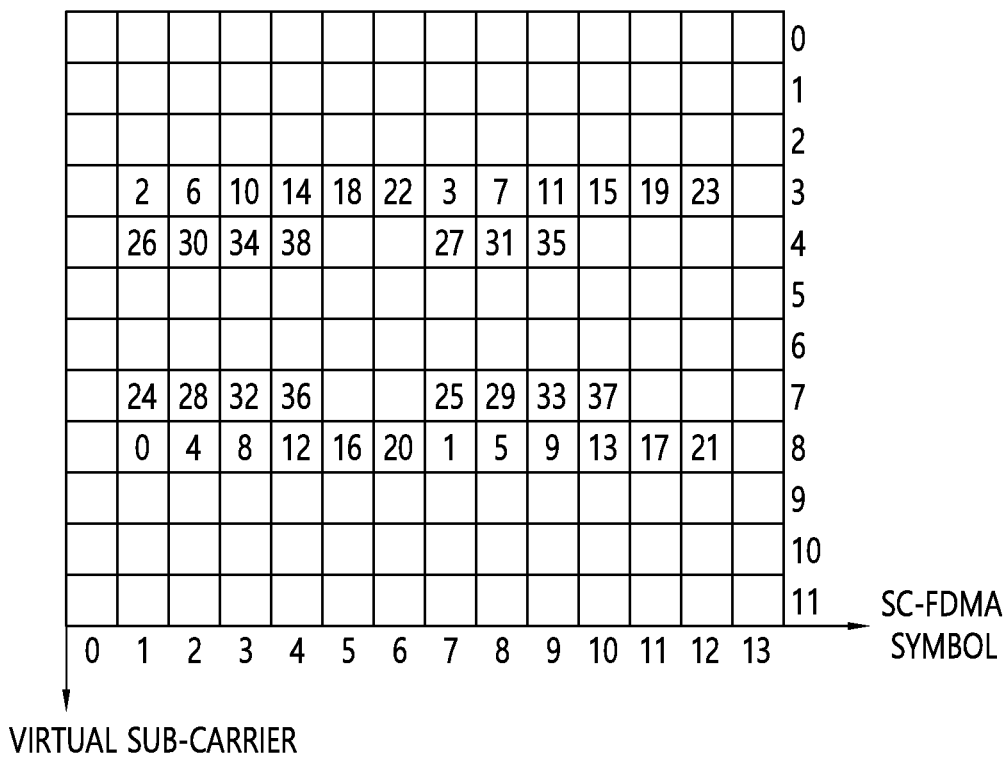
Figure 70:
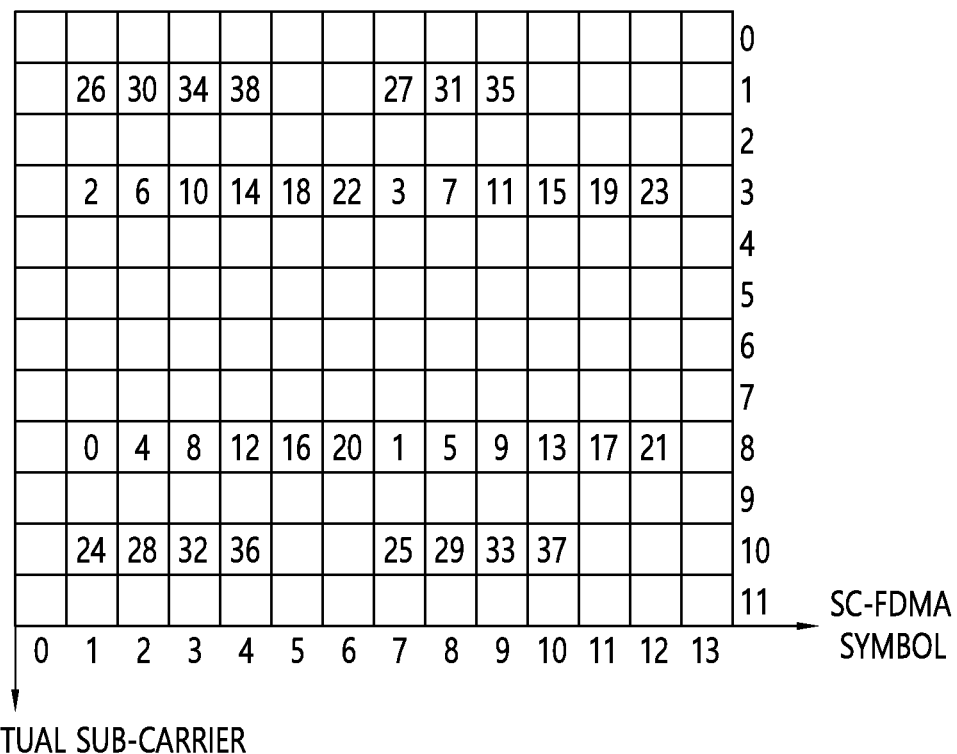
Figure 71:
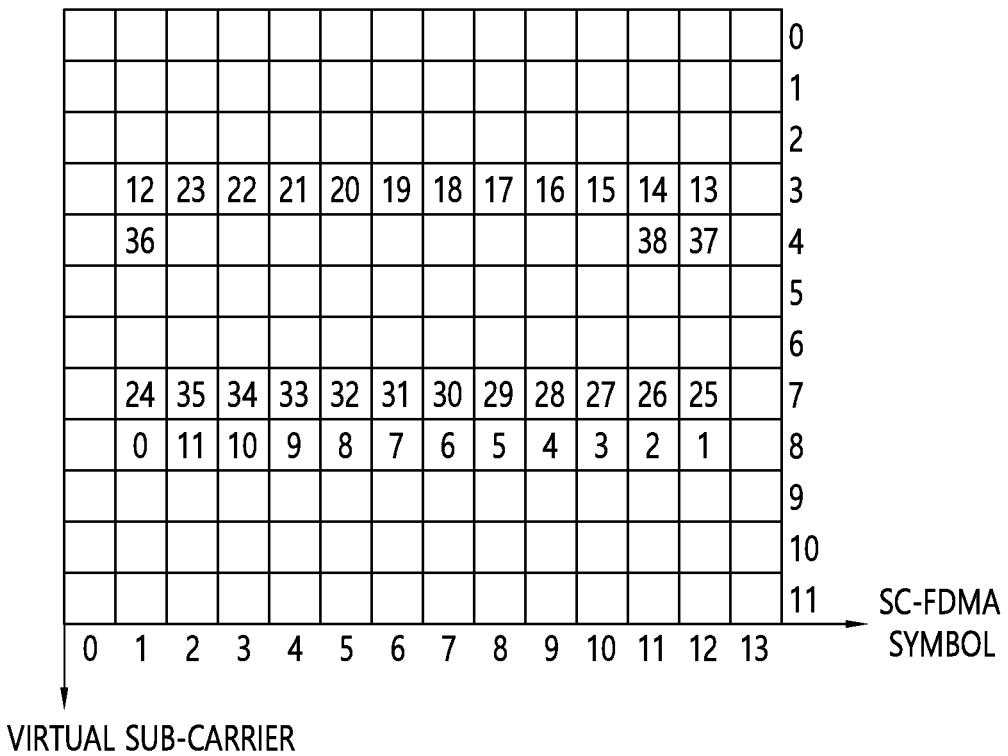
Figure 72:
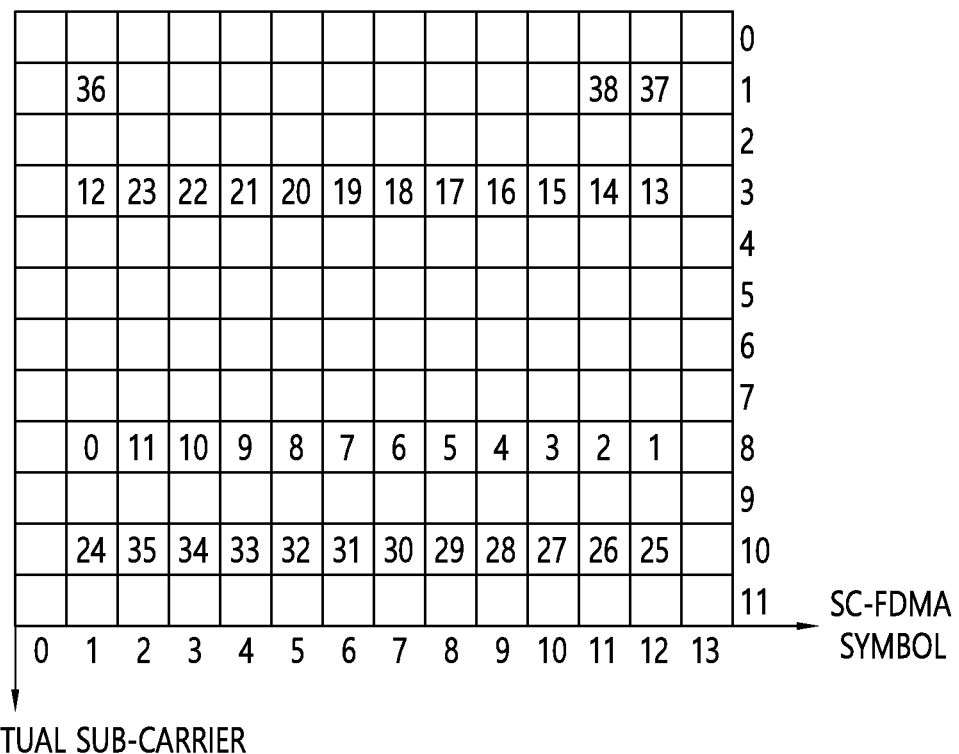
Figure 73:
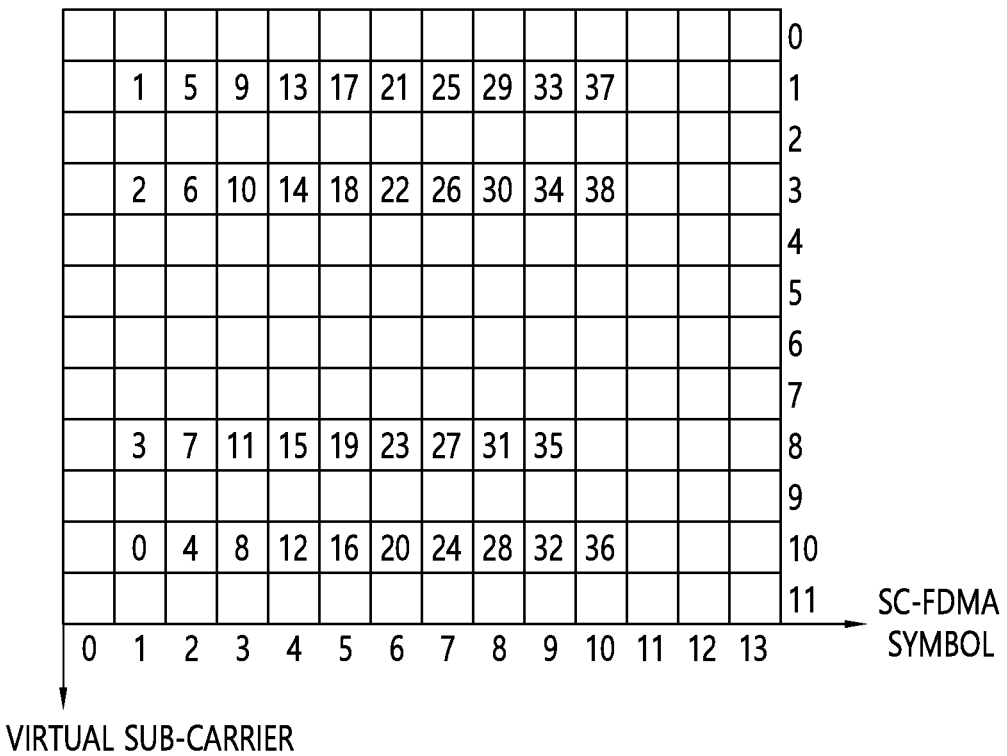
Figure 74:
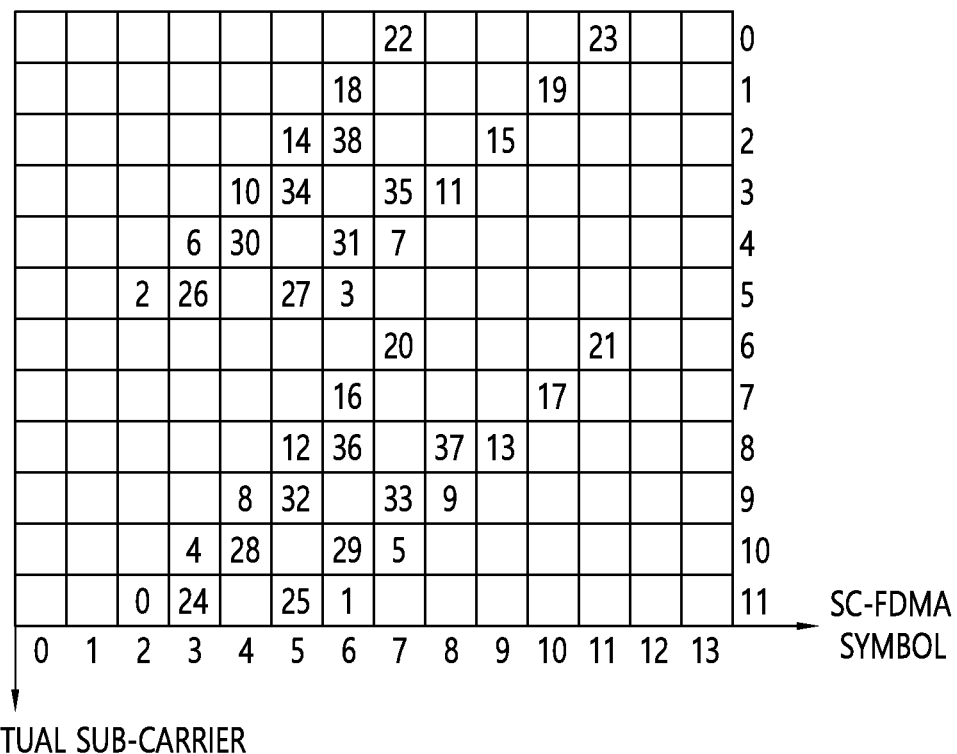
FIGS. 74 to 82 illustrate mapping of control(/scheduling) information related "coded symbol(s)" according to (rule #1-1) and (rule #1-3)(/(rule #1-2)) in the case of FIG. 13.
Figure 75:
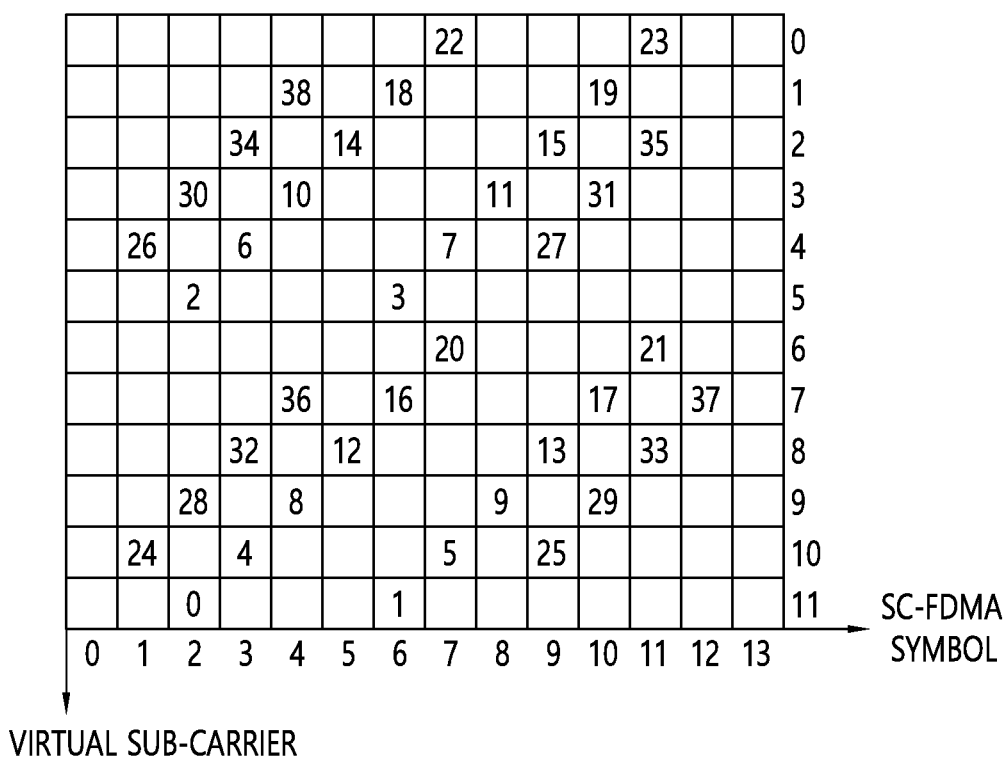
Figure 76:
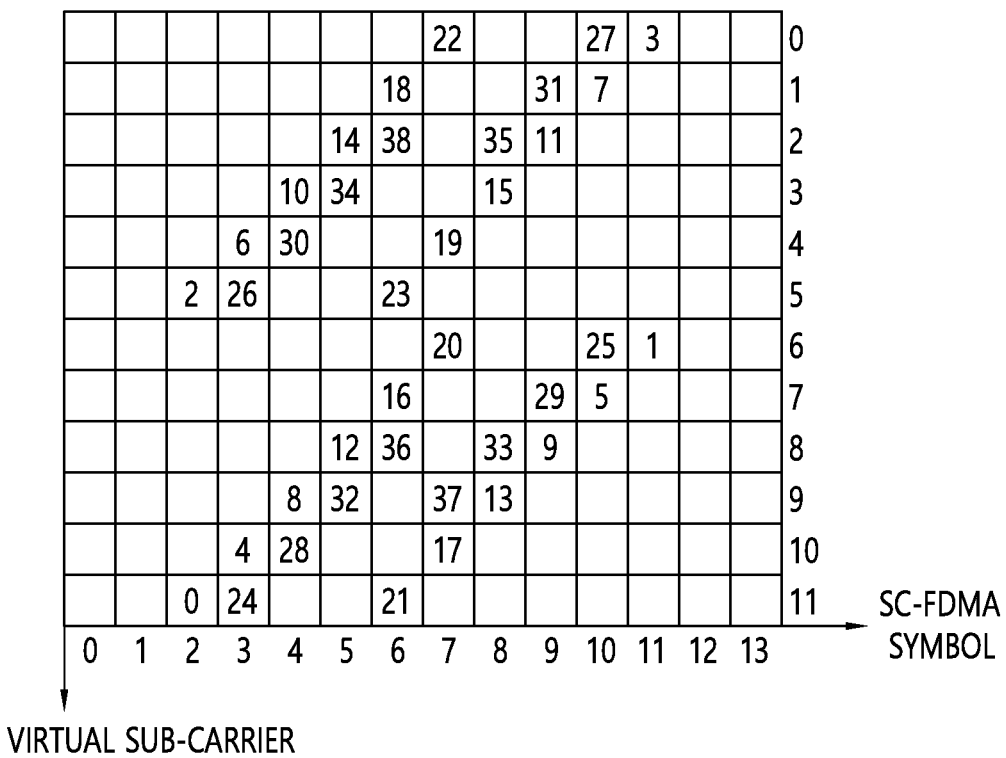
Figure 77:
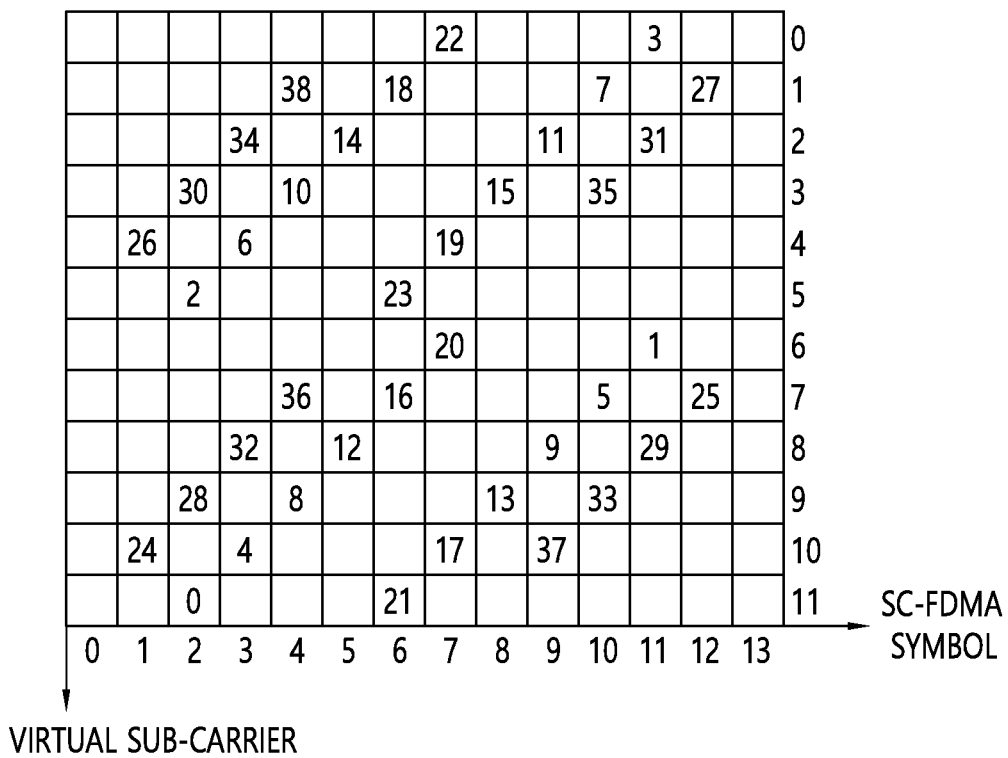
Figure 78:
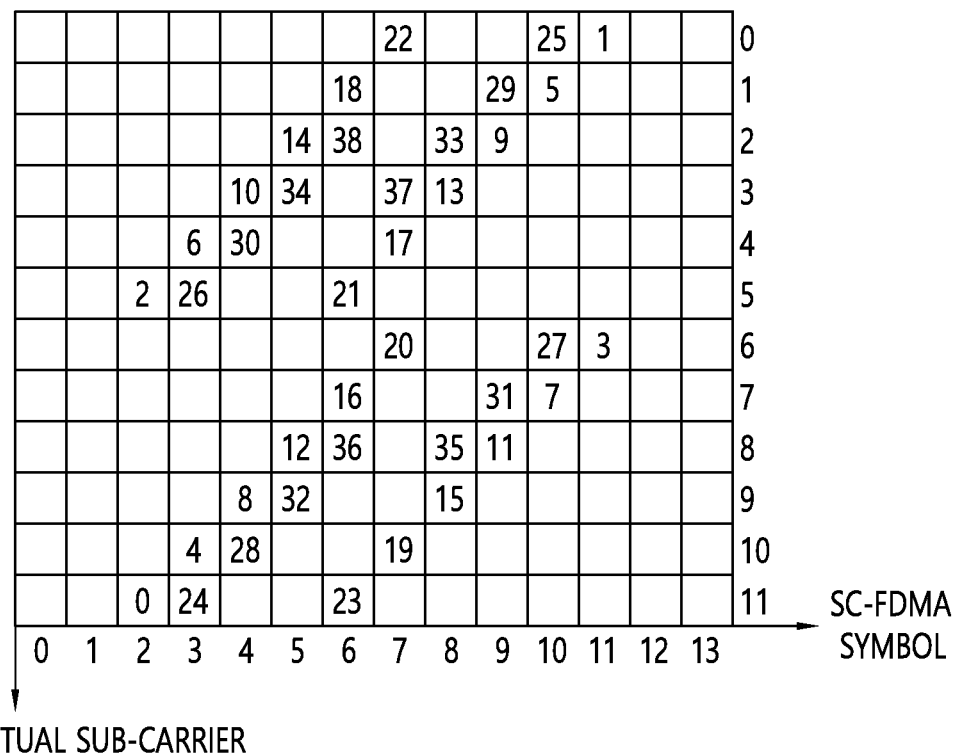
Figure 79:
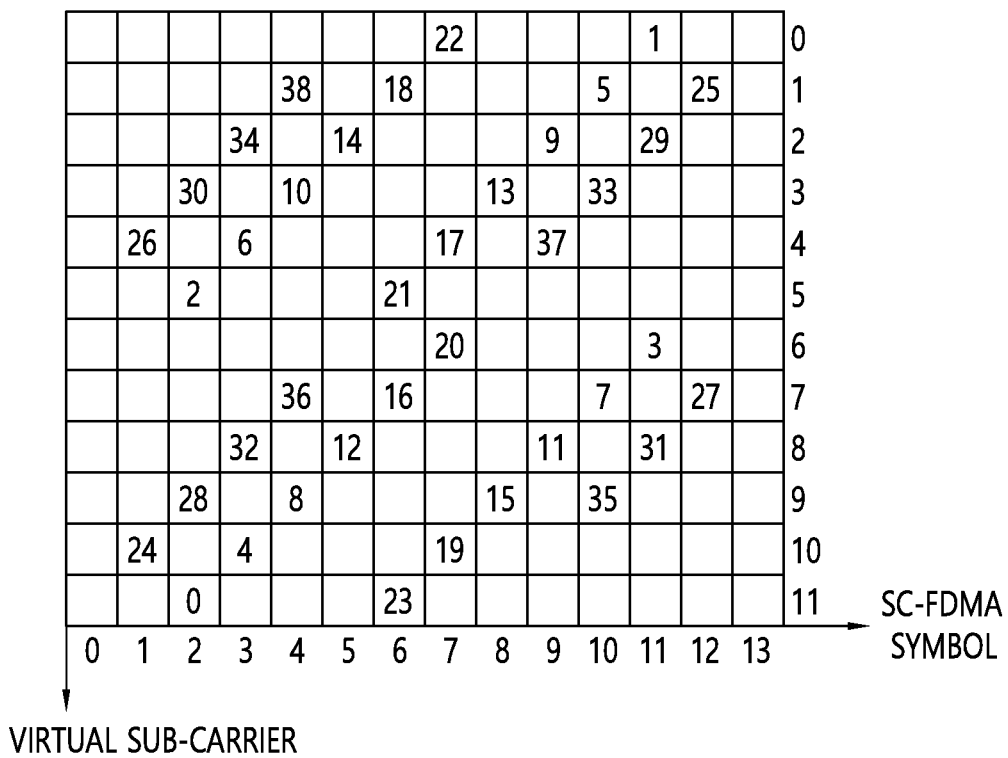
Figure 80:
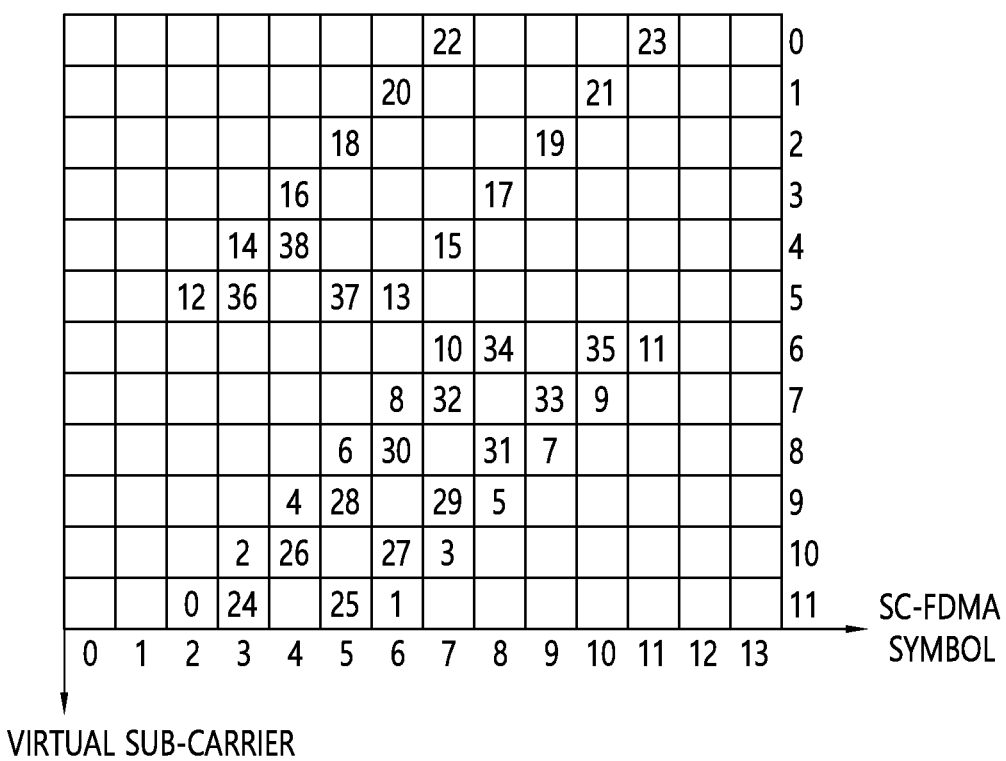
Figure 81:
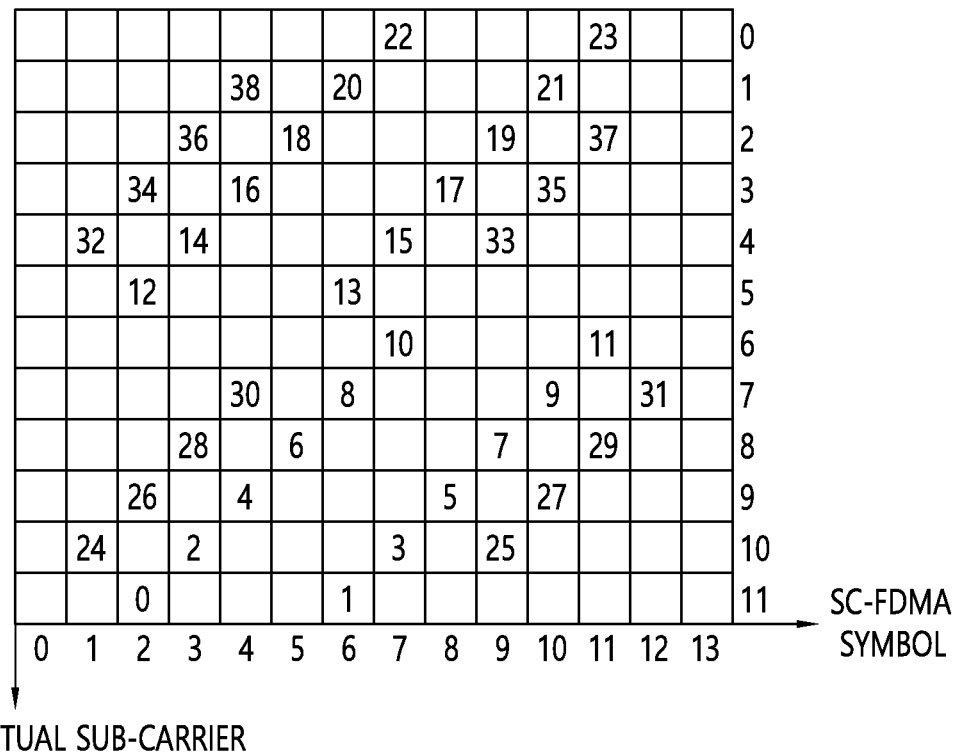
Figure 82:
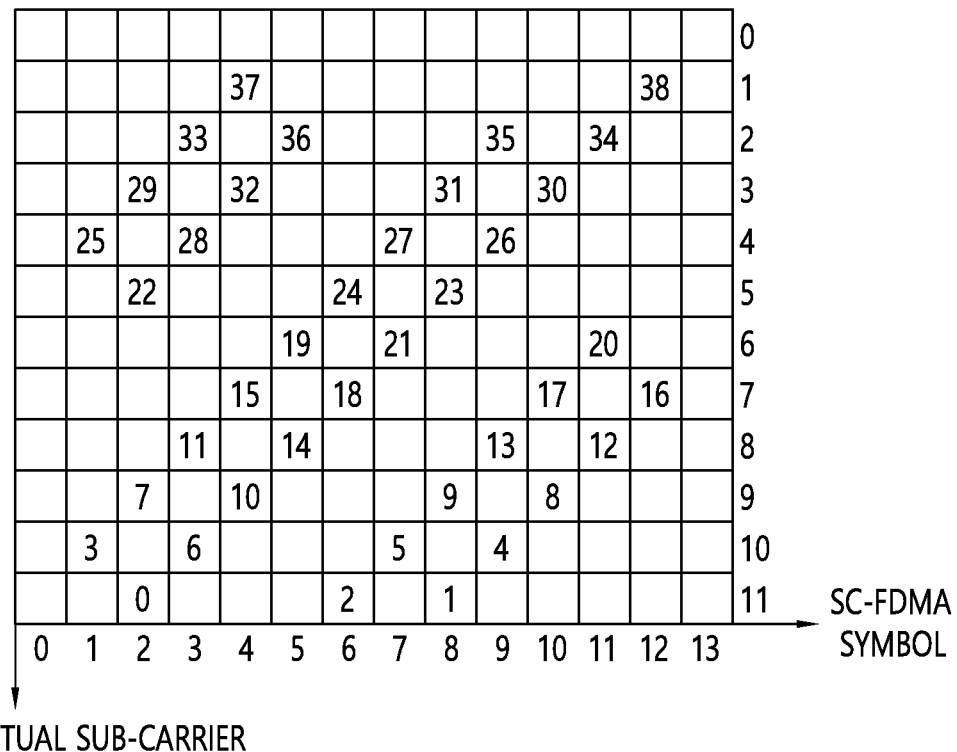

More specifically, FIG. 55 and/or FIG. 56 and FIG. 57 and/or FIG. 58 correspond to the cases of FIGS. 12 and 14. Here, it is assumed that the number of control(/scheduling) information related "coded symbol(s)" (to be piggybacked) is "33", for example. Here, a mapping order/puncturing(/rate matching) among symbol positions(/numbers) punctured due to a control(/scheduling) information related "coded symbol(s)" mapping rule (/direction), "AGC problem mitigation" and/or "prevention of overlap with (following) WAN UL TX (SF)", (control(/scheduling) information related) "coded symbol(s)" and "data" are assumed to be the same as those in the cases of FIGS. 51 to 54, for example.

FIGS. 59 to 73 illustrate mapping of control(/scheduling) information related "coded symbol(s)" according to (rule #1-1) and (rule #1-3)(/(rule #1-2)) in the case of FIG. 12.

More specifically, FIGS. 59 to 73 illustrate examples of mapping control(/scheduling) information related "coded symbol(s)" according to (rule #1-1) and (rule #1-3)(/(rule #1-2)) in the case of FIG. 12. Here, it is assumed that the number of control(/scheduling) information related "coded symbol(s)" (to be piggybacked) is "39", for example. Here, it is possible to assumed that the first symbol "symbol #0" and/or the last symbol "symbol #13" are punctured due to "AGC problem mitigation" and/or "prevention of overlap with (following WAN UL TX (SF)" (or are not used for control(/scheduling) information related "coded symbol(s)" mapping), for example.

FIGS. 74 to 82 illustrate mapping of control(/scheduling) information related "coded symbol(s)" according to (rule #1-1) and (rule #1-3)(/(rule #1-2)) in the case of FIG. 13.

More specifically, FIGS. 74 to 82 illustrate examples of mapping control(/scheduling) information related "coded symbol(s)" according to (rule #1-1) and (rule #1-3)(/(rule #1-2)) in the case of FIG. 13. Here, it is assumed that the number of control(/scheduling) information related "coded symbol(s)" (to be piggybacked) is "39", for example. Here, it is possible to assumed that the first symbol "symbol #0" and/or the last symbol "symbol #13" are punctured due to "AGC problem mitigation" and/or "prevention of overlap with (following WAN UL TX (SF)" (or are not used for control(/scheduling) information related "coded symbol(s)" mapping), for example.

Alternatively, rules may be defined such that (pre-defined (/signaled) control(/scheduling) information with relatively high priority (e.g., "MCS index(/modulation order)" and/or "TBS index(/transport block size)") is transmitted as illustrated in FIGS. 15 to 50 and FIGS. 59 to 82 and control(/scheduling) information with relatively low priority (or other pieces of control(/scheduling) information) is transmitted as illustrated in FIGS. 51 to 58.

Alternatively, rules may be defined such that control(/scheduling) information with relatively low priority is mapped to symbols on which "extra(/outer)-polation" based channel estimation is performed and control(/scheduling) information with relatively high priority is mapped to symbols on which "interpolation" based channel estimation is performed.

Figure 83:
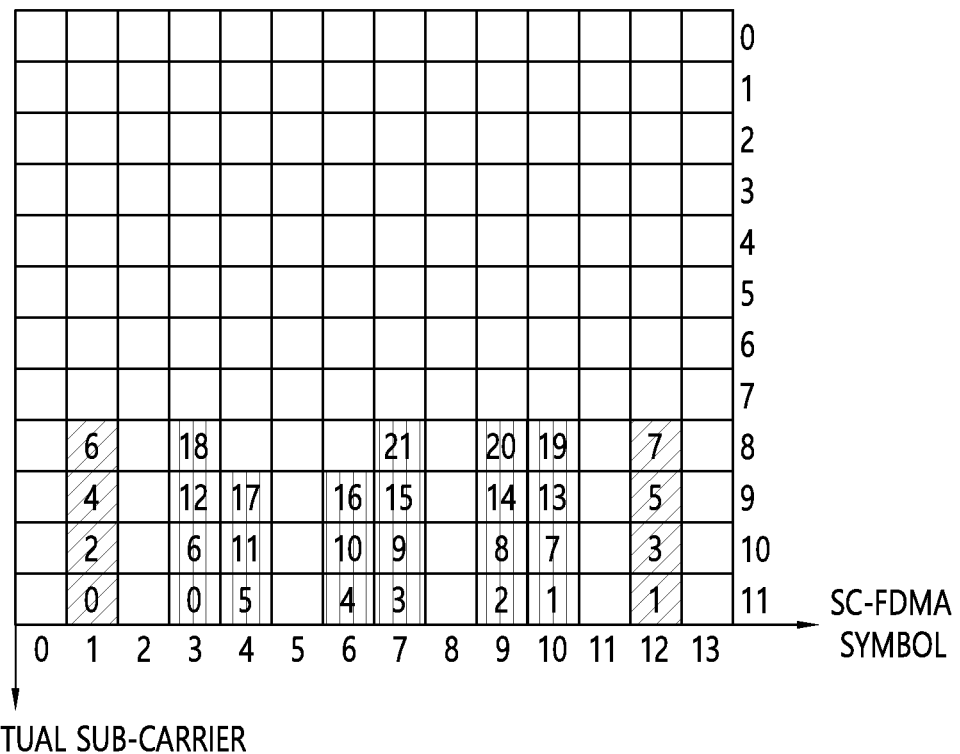
FIG. 83 illustrates an example in which control(/scheduling) information with relatively low priority is mapped to symbols on which "extra(/outer)-polation" based channel estimation is performed and control(/scheduling) information with relatively high priority is mapped to symbols on which "interpolation" based channel estimation is performed.

FIG. 83 illustrates an example in which control(/scheduling) information with relatively low priority is mapped to symbols on which "extra(/outer)-polation" based channel estimation is performed and control(/scheduling) information with relatively high priority is mapped to symbols on which "interpolation" based channel estimation is performed.

Figure 28:
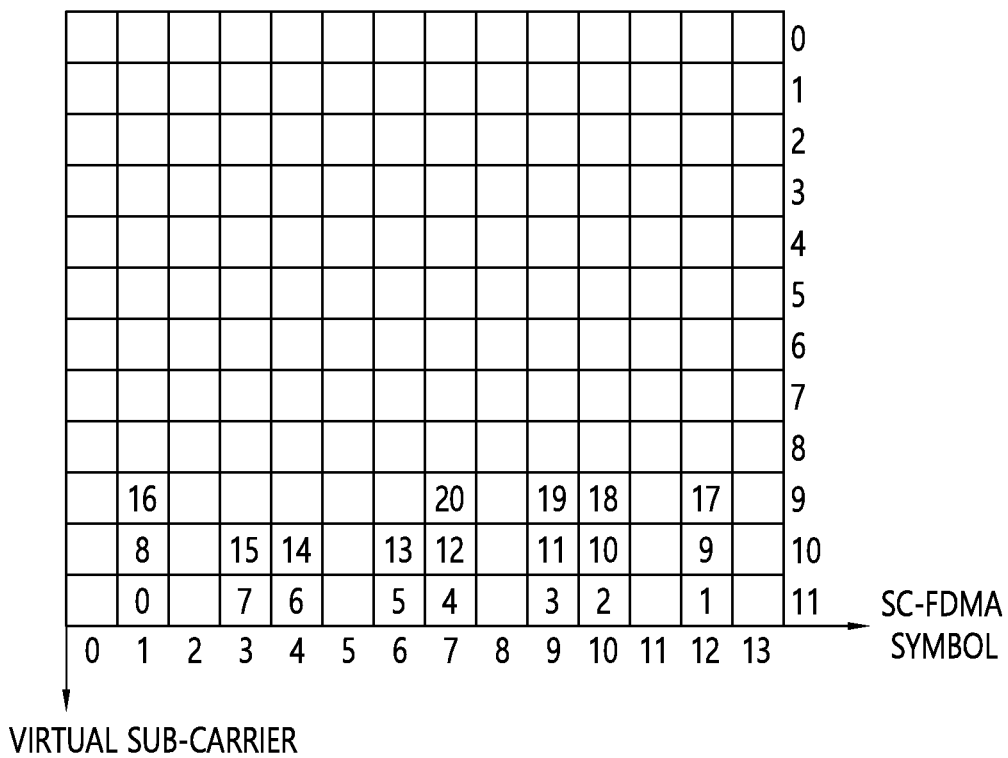
Figure 29:
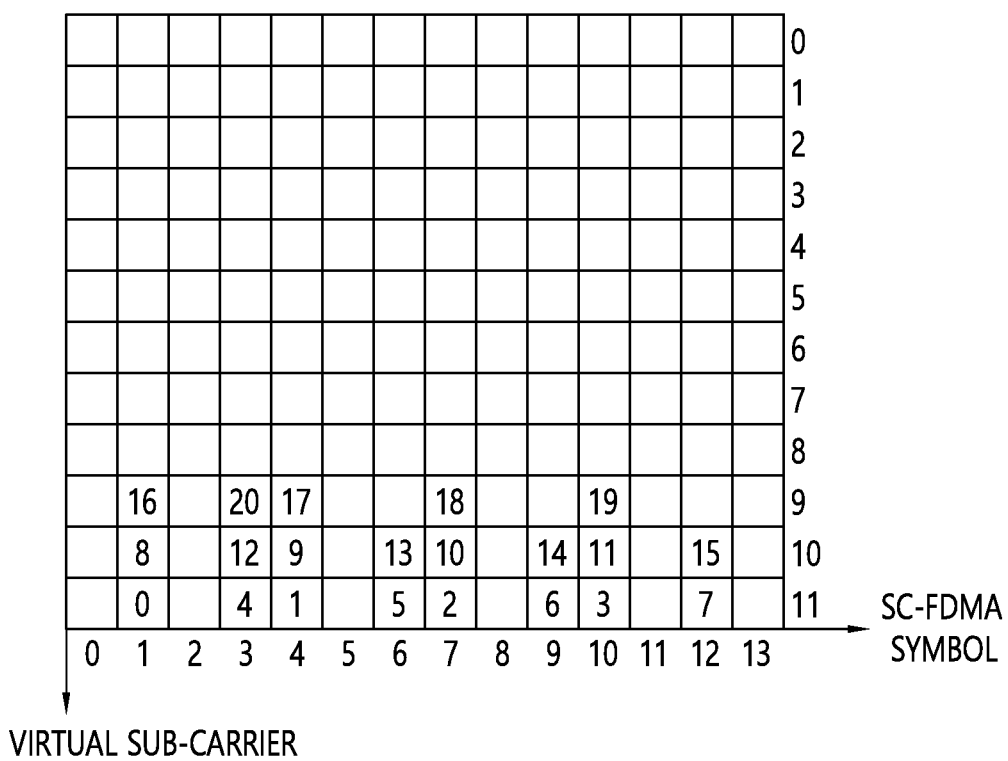
Figure 30:
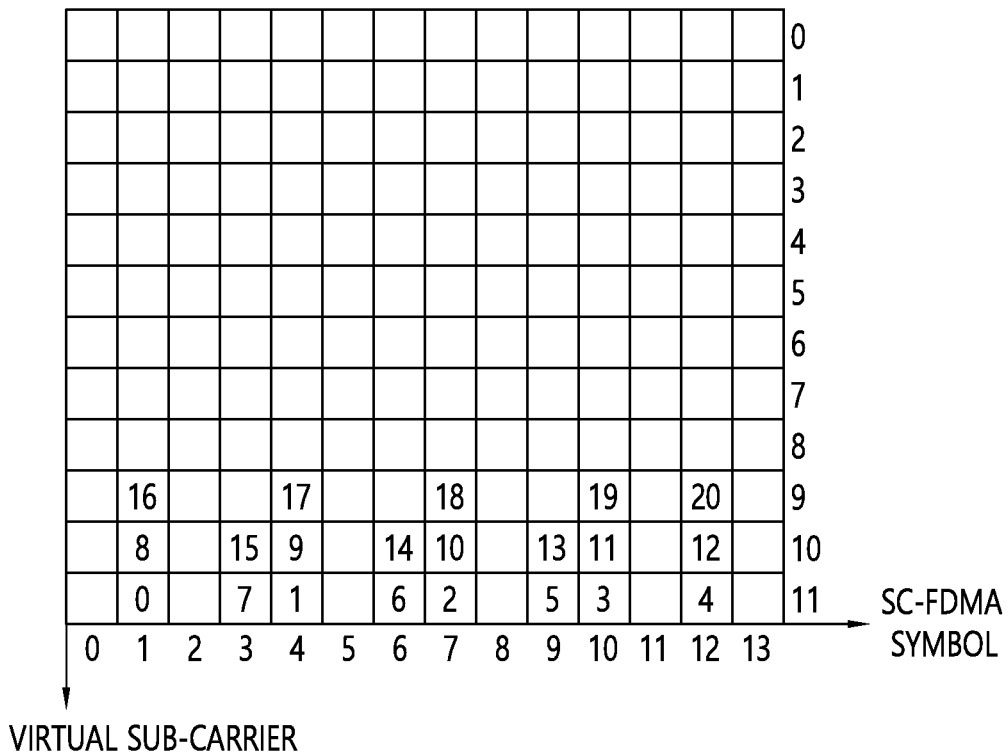
Figure 31:
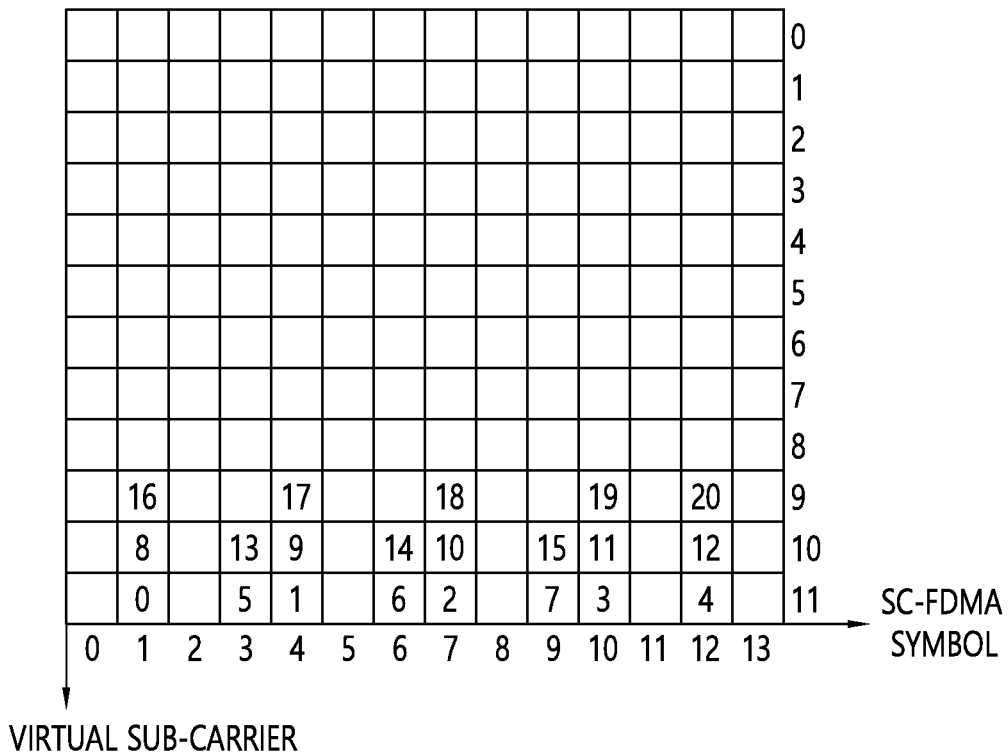
Figure 32:
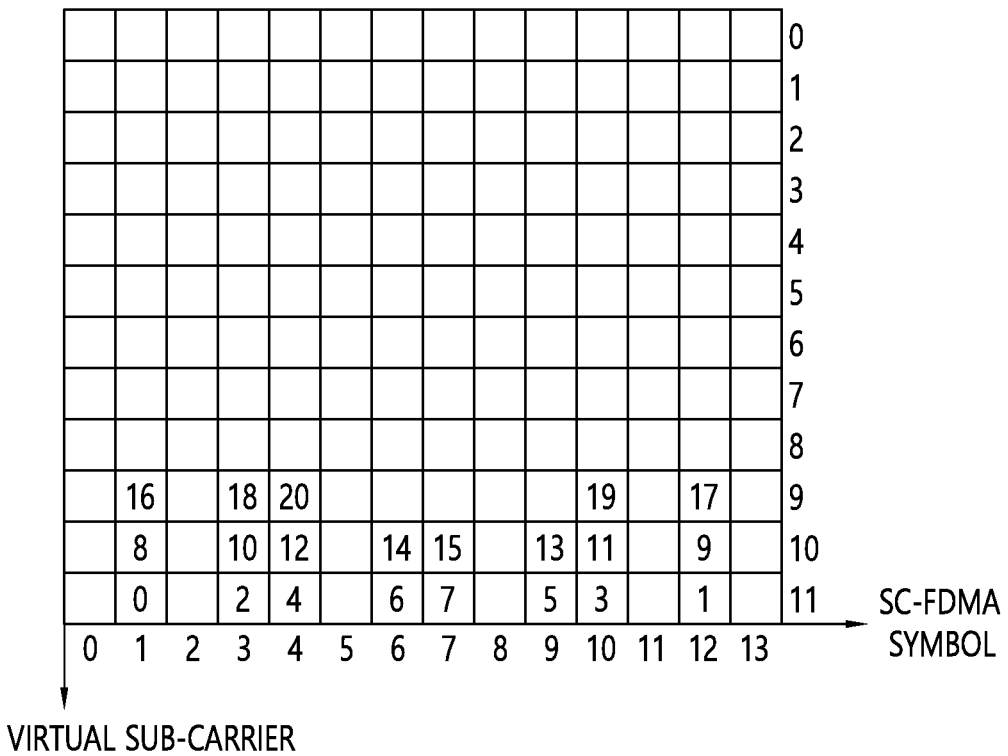
Figure 33:
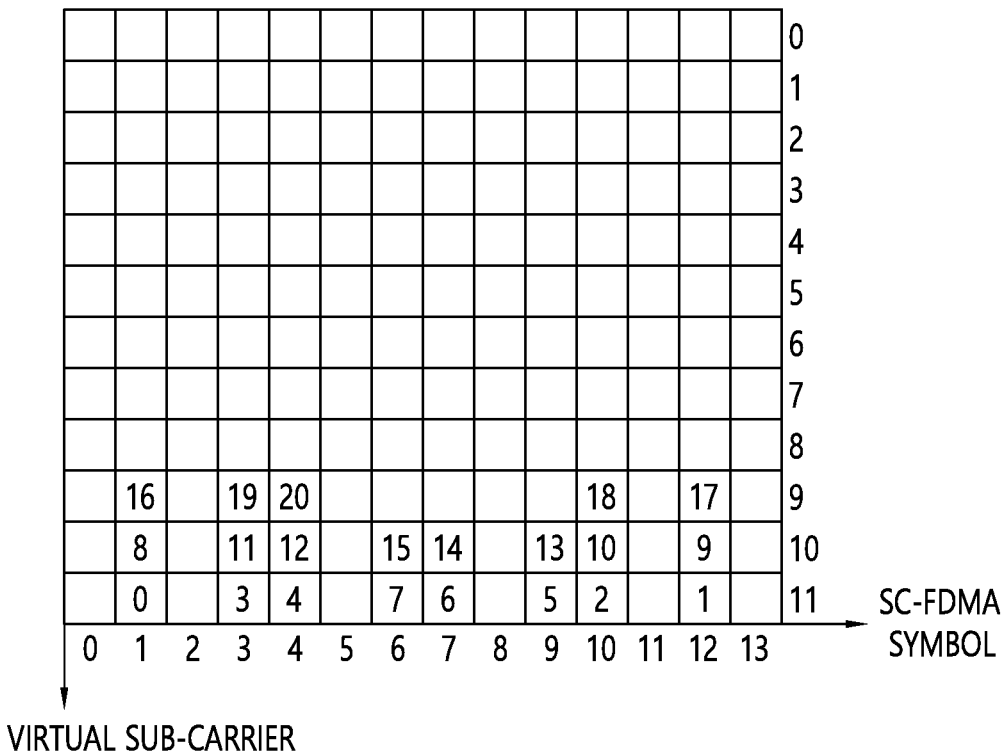
Figure 34:
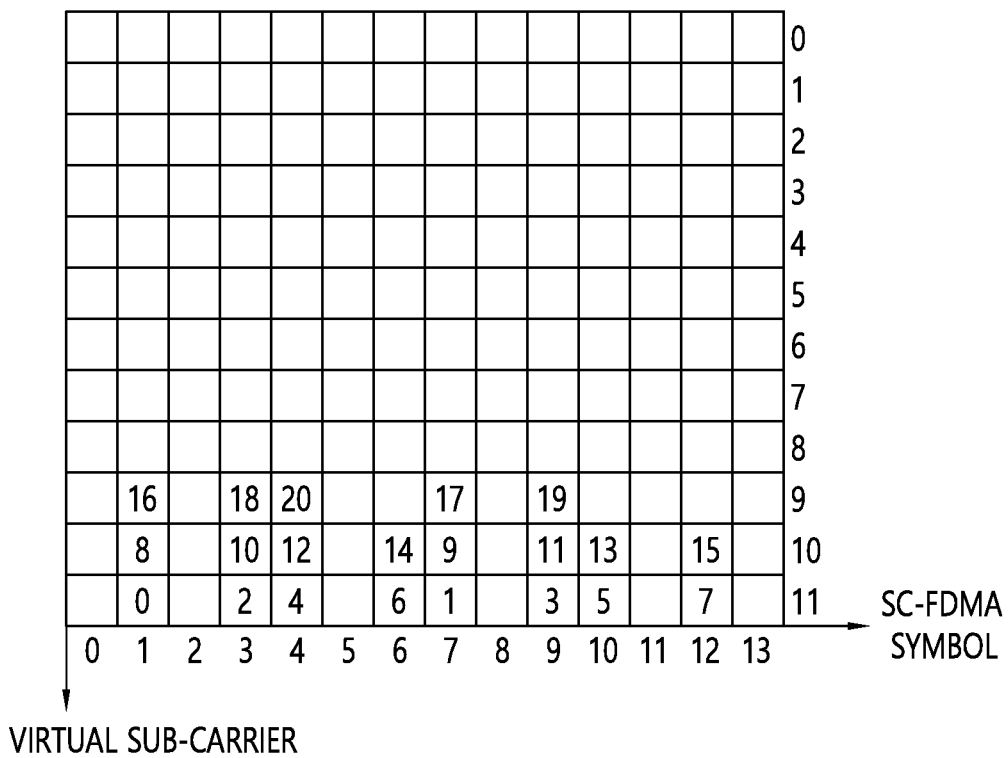

More specifically, FIG. 83 illustrates an example in which a rule of mapping control(/scheduling) information with relatively low priority to symbols on which "extra(/outer)-polation" based channel estimation is performed and mapping control(/scheduling) information with relatively high priority to symbols on which "interpolation" based channel estimation is performed is applied to the state of FIG. 28. Here, it is assumed that the number of "coded symbol(s)" related to control(/scheduling) information with relatively high priority is "22" and the number of "coded symbol(s)" related to control(/scheduling) information with relatively low priority is "8", for example.

Alternatively, a (pre-defined(/signaled)) "modulation order" different from that for "data" (or the same "modulation order" as that determined for "data") may be applied to "control/(scheduling) information (to be piggybacked)" transmitted over a specific channel (e.g., a "PSSCH") in the above-described proposed methods.

Alternatively, which one of the above-described proposed methods will be used to piggyback control(/scheduling) information may be signaled from a base station (e.g., through SIB/(dedicated) RRC signal) or pre-defined. Alternatively, which one of the above-described proposed methods will be used to piggyback specific control(/scheduling) information or symbol positions on which specific control (/scheduling) information will be piggybacked may be signaled from a base station or pre-defined. Here, when corresponding rules are applied, for example, different "piggyback method" or different "piggyback symbol positions" may be applied to different pieces of control(/scheduling) information.

Referring back to FIG. 14, the UE transmits the control information using the coded symbols (S1420). Here, the control information is piggybacked along with data and transmitted. Here, a detailed example in which the UE piggybacks the control information along with data has been described above.

Examples of the above-described proposed methods can be included as one of methods implemented by the present document and can be regarded as proposed methods. Further, while the above-described proposed methods can be independently implemented, some of the proposed methods may be combined (or aggregated). For example, although the proposed methods have been described based on 3GPP LTE for convenience of description in the present document, the range of the system to which the proposed methods are applied can be extended to systems other than 3GPP LTE. For example, the proposed methods of the present document can be extended and applied to D2D communication. Here, D2D communication refers to direct communication of a UE with another UE using a radio channel, for example. Here, although a UE refers to a user terminal, when network equipment such as a base station transmits/receives signals according to communication between UEs, the network equipment may be regarded as a kind of UE. For example, rules may be defined such that the above-described proposed methods are applied only to mode-2 (V2X(/D2D)) communication, type-1 (V2X(/D2D)) discovery (and/or mode-11 (V2X(/D2D)) communication and/or type-2 (V2X(/D2D)) discovery). Further, rules may be defined such that the above-described proposed methods are applied only to in-coverage D2D(/V2X) UEs (and/or out-coverage D2D(/V2X) UEs, RRC_CONNECTED D2D(/V2X) UEs, RRC_IDLE D2D(/V2X) UEs, relay D2D(/V2X) UEs and/or remote (D2D(/V2X)) UEs participating in relay communication), for example. Alternatively, rules may be defined such that the above-described proposed methods are applied only to "periodic V2X message transmission operation" (and/or "event-triggered V2X message transmission operation").

Figure 84:
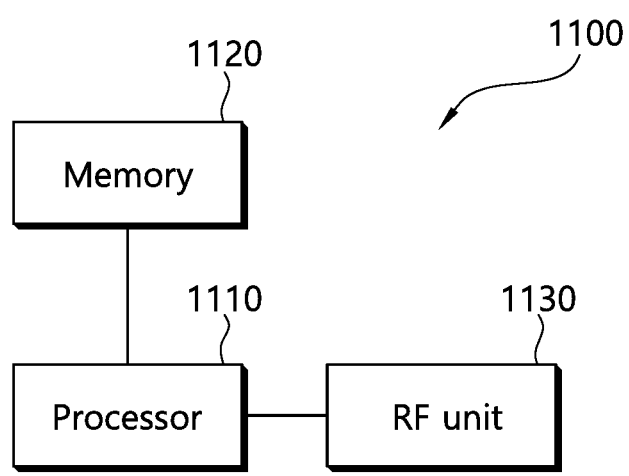
FIG. 84 is a block diagram illustrating a UE for which an embodiment of the present document is implemented.

FIG. 84 is a block diagram illustrating a UE for which an embodiment of the present document is implemented.

Referring to FIG. 84 a UE 1100 includes a processor 1110, a memory 1120 and a radio frequency (RF) unit 1130.

According to an embodiment, the processor 1110 can implement functions/operations/methods described in the present document. For example, the processor 1110 can map coded symbols related to control information on subframes. Further, the processor 1110 piggybacks the control information along with data and transmits the control information using the mapped coded symbols.

The transceiver 1130 is connected to the processor 1110 and transmits/receives RF signals.

The processor may include an application-specific integrated circuit (ASIC), other chipsets, logic circuits and/or a data processing device. The memory may include a read-only memory (ROM), a random access memory (RAM), a flash memory, a memory card, a storage medium and/or other storage devices. The Transceiver may include a baseband circuit for processing RF signals. When embodiments are implemented by software, the above-described methods may be implemented as modules (processes, functions, and the like) performing the above-described functions. Modules may be stored in the memory and executed by the processor. The memory may be provided inside or outside the processor and connected to the processor through various known means.

What is claimed is:

1. A method for selecting vehicle-to-everything (V2X) transmission resources by a UE in a wireless communication system, the method comprising:
    mapping coded symbols related to control information on a physical sidelink shared channel (PSSCH),
    wherein the PSSCH is a channel used for data transmission between UEs; and
    transmitting the control information using the mapped coded symbols,
    wherein the control information is piggybacked along with data and transmitted based on the PSSCH, and the coded symbols related to the control information are mapped prior to the data,
    wherein resource elements of the coded symbols related to the control information are different from resource elements of the data in the PSSCH, and
    wherein at least one of the coded symbols related to the control information is allocated in a symbol carrying a first reference signal.

2. The method of claim 1, wherein the coded symbols related to the control information are mapped to regions adjacent to reference signal symbols.

3. The method of claim 1, wherein the coded symbols related to the control information are not mapped on symbols before the first reference signal symbol and symbols after a last reference signal symbol on the PSSCH.

4. The method of claim 1, wherein a spacing between the coded symbols related to the control information which are consecutively mapped on the same frequency of the PSSCH is maximized.

5. The method of claim 1, wherein the PSSCH includes a plurality of reference signal symbols.

6. The method of claim 5, wherein the reference signal symbols are demodulation reference signal (DMRS) symbols.

7. The method of claim 1, wherein the control information is a modulation and coding scheme (MCS) index.

8. The method of claim 1, wherein resources in which the control information is transmitted are fixed.

9. A user equipment (UE) comprising:
    a transceiver for transmitting and receiving signals; and
    a processor operating in connection with the transceiver,
    wherein, in a method for selecting vehicle-to-everything (V2X) transmission resources by the UE in a wireless communication system, the processor is configured:
    to map coded symbols related to control information on a physical sidelink shared channel (PSSCH),
    wherein the PSSCH is a channel used for data transmission between UEs; and
    to transmit the control information using the mapped coded symbols,
    wherein the control information is piggybacked along with data and transmitted based on the PSSCH, and the coded symbols related to the control information are mapped prior to the data,
    wherein resource elements of the coded symbols related to the control information are different from resource elements of the data in the PSSCH, and
    wherein at least one of the coded symbols related to the control information is allocated in a symbol carrying a first reference signal.

\* \* \* \* \*